(12) United States Patent
Sugita et al.

(10) Patent No.: US 9,335,854 B2
(45) Date of Patent: May 10, 2016

(54) DISPLAY DEVICE

(75) Inventors: Yasuhiro Sugita, Osaka (JP); Kohhei Tanaka, Osaka (JP); Kaoru Yamamoto, Osaka (JP); Hiromi Katoh, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 34 days.

(21) Appl. No.: 13/497,354

(22) PCT Filed: Jun. 8, 2010

(86) PCT No.: PCT/JP2010/059684
§ 371 (c)(1),
(2), (4) Date: Mar. 21, 2012

(87) PCT Pub. No.: WO2011/040092
PCT Pub. Date: Apr. 7, 2011

(65) Prior Publication Data
US 2012/0176355 A1  Jul. 12, 2012

(30) Foreign Application Priority Data

Sep. 30, 2009  (JP) .................................. 2009-226565

(51) Int. Cl.
*G06F 3/038* (2013.01)
*G09G 5/00* (2006.01)
(Continued)

(52) U.S. Cl.
CPC .............. *G06F 3/0412* (2013.01); *G06F 3/042* (2013.01); *G06F 3/0416* (2013.01); *G09G 3/3406* (2013.01); *G09G 2360/144* (2013.01); *G09G 2360/148* (2013.01)

(58) Field of Classification Search
CPC ..... G06F 3/0412; G06F 3/0416; G06F 3/042; G09G 2360/144; G09G 2360/148; G09G 3/3406

USPC ........... 345/102, 156, 173–184; 349/115, 116
See application file for complete search history.

(56) References Cited

U.S. PATENT DOCUMENTS 5,376,782 A   12/1994  Ikeda et al.
6,144,366 A   11/2000  Numazaki et al.
(Continued)

FOREIGN PATENT DOCUMENTS

EP   2073055 A1   6/2009
JP   11143633 A   5/1999
(Continued)

OTHER PUBLICATIONS

Office Action issued copending U.S. Appl. No. 13/497,365 on Nov. 6, 2013.
(Continued)

*Primary Examiner* — Amare Mengistu
*Assistant Examiner* — Insa Sadio
(74) *Attorney, Agent, or Firm* — Harness, Dickey & Pierce, P.L.C.

(57) ABSTRACT

A plurality of first sensor pixel circuits each sensing light during a sensing period when a backlight is turned on and retaining the amount of sensed light otherwise in accordance with a clock signal and a plurality of second sensor pixel circuits each sensing light during a sensing period when the backlight is turned off and retaining the amount of sensed light otherwise in accordance with a clock signal are arranged in a pixel region. The sensor pixel circuits of two types are connected to different output lines, so that a difference between two output signals is obtained at the outside of the sensor pixel circuit. The sensor pixel circuits described above are used for detecting a difference between an amount of light to be incident when the backlight is turned on and an amount of light to be incident when the backlight is turned off.

2 Claims, 43 Drawing Sheets

(51) Int. Cl.
*G06F 3/041* (2006.01)
*G09G 3/34* (2006.01)
*G06F 3/042* (2006.01)

(56) References Cited

U.S. PATENT DOCUMENTS

| | | | |
|---|---|---|---|
| 6,545,502 | B1 | 4/2003 | Dasgupta et al. |
| 6,731,335 | B1* | 5/2004 | Kim et al. ............ 348/308 |
| 7,531,776 | B2 | 5/2009 | Koide |
| 8,183,518 | B2 | 5/2012 | Ahn et al. |
| 8,446,390 | B2 | 5/2013 | Hattori |
| 8,552,967 | B2 | 10/2013 | Nakanishi |
| 2005/0045881 | A1 | 3/2005 | Nakamura et al. |
| 2005/0062853 | A1* | 3/2005 | Yagi et al. ............ 348/222.1 |
| 2005/0205921 | A1* | 9/2005 | Ishii et al. ............ 257/314 |
| 2005/0275616 | A1* | 12/2005 | Park et al. ............ 345/102 |
| 2006/0027843 | A1* | 2/2006 | Ogura et al. ............ 257/291 |
| 2006/0077167 | A1* | 4/2006 | Kim et al. ............ 345/98 |
| 2006/0103637 | A1 | 5/2006 | Yamaguchi et al. |
| 2006/0214892 | A1 | 9/2006 | Harada et al. |
| 2006/0256093 | A1 | 11/2006 | Furukawa et al. |
| 2007/0013646 | A1 | 1/2007 | Harada |
| 2007/0126697 | A1* | 6/2007 | Sato et al. ............ 345/156 |
| 2007/0215969 | A1 | 9/2007 | Koide et al. |
| 2007/0216789 | A1 | 9/2007 | Cernasov et al. |
| 2007/0268206 | A1 | 11/2007 | Kinoshita et al. |
| 2008/0035966 | A1* | 2/2008 | Hwang et al. ............ 257/292 |
| 2008/0157682 | A1 | 7/2008 | Kwon |
| 2008/0211787 | A1 | 9/2008 | Nakao et al. |
| 2008/0218619 | A1 | 9/2008 | Egawa |
| 2008/0246715 | A1 | 10/2008 | Nagase et al. |
| 2009/0085854 | A1* | 4/2009 | Kunimori ............ G09G 3/3406 345/92 |
| 2009/0146992 | A1* | 6/2009 | Fukunaga et al. ............ 345/214 |
| 2009/0161051 | A1* | 6/2009 | Fukunaga et al. ............ 349/115 |
| 2009/0213095 | A1* | 8/2009 | Harada et al. ............ 345/175 |
| 2009/0225088 | A1 | 9/2009 | Aoki |
| 2009/0289910 | A1 | 11/2009 | Hattori |
| 2010/0013813 | A1 | 1/2010 | Katoh et al. |
| 2010/0085339 | A1 | 4/2010 | Tanaka et al. |
| 2010/0128004 | A1 | 5/2010 | Harada et al. |
| 2010/0193804 | A1 | 8/2010 | Brown et al. |
| 2010/0295754 | A1 | 11/2010 | Cernasov et al. |
| 2011/0043471 | A1 | 2/2011 | Senda et al. |
| 2012/0176355 | A1 | 7/2012 | Sugita et al. |
| 2012/0176356 | A1 | 7/2012 | Usukura et al. |

FOREIGN PATENT DOCUMENTS

| | | |
|---|---|---|
| JP | 3521187 B | 2/2004 |
| JP | 2005352490 A | 12/2005 |
| JP | 2006317682 A | 11/2006 |
| JP | 2007-025796 A | 2/2007 |
| JP | 2007065508 A | 3/2007 |
| JP | 4072732 A | 2/2008 |
| JP | 2008203561 A | 9/2008 |
| JP | 2009064074 A | 3/2009 |
| JP | 2009205423 A | 9/2009 |
| JP | 2009217461 A | 9/2009 |
| WO | WO-2008156023 A1 | 12/2008 |
| WO | WO-2009025223 A1 | 2/2009 |
| WO | WO-2009060700 A1 | 5/2009 |

OTHER PUBLICATIONS

International Search Report.
Office Action issued in copending U.S. Appl. No. 13/497,383 on Oct. 9, 2012.
Office Action dated Aug. 25, 2014 in copending U.S. Appl. No. 13/497,358.
Office Action dated Jan. 30, 2014 in corresponding U.S. Appl. No. 13/497,268.
Office Action dated Feb. 7, 2014 in corresponding U.S. Appl. No. 13/497,358.

* cited by examiner

DISPLAY DEVICE

TECHNICAL FIELD

The present invention relates to display devices, and more particularly to a display device in which a plurality of optical sensors are arranged in a pixel region.

BACKGROUND ART

With regard to display devices, heretofore, there have been known methods of providing input functions such as touch panels, pen input and scanners in such a manner that a plurality of optical sensors are provided on a display panel. In order to adapt such a method to a mobile appliance to be used under various light environments, it is necessary to eliminate an influence of the light environment. Therefore, there has also been known a method of removing a component depending on a light environment from a signal sensed by an optical sensor to obtain a signal to be input intrinsically.

Patent Document 1 describes an input/output device in which light receiving elements are provided corresponding to individual displaying elements. In the input/output device, a backlight is turned on and off once in a one-frame period, and reset for and read from the light receiving elements are performed in a line sequential manner so that an amount of light during a backlight turn-on period and an amount of light during a backlight turn-off period are obtained from all the light receiving elements in the one-frame period.

FIG. 42 is a diagram showing turn-on and turn-off timings of the backlight as well as reset and read timings of the light receiving elements, in Patent Document 1. As shown in FIG. 42, in the one-frame period, the backlight is turned on in the former half and is turned off in the latter half. During the backlight turn-on period, the reset for the light receiving elements is performed in a line sequential manner (a solid line arrow), and then the read from the light receiving elements is performed in a line sequential manner (a broken line arrow). Also during the backlight turn-off period, the reset for and read from the light receiving elements are performed in the similar manner.

Patent Document 2 describes a solid-state imaging device including a unit light receiving section shown in FIG. 43. As shown in FIG. 43, the unit light receiving section includes one photoelectric converting part PD, and two charge accumulating parts C1 and C2. In the case of receiving both external light and light which is emitted from light emitting means and then is reflected from a physical object, a first sample gate SG1 turns on, and charge generated by the photoelectric converting part PD is accumulated in the first charge accumulating part C1. In the case of receiving only external light, a second sample gate SG2 turns on, and the charge generated by the photoelectric converting part PD is accumulated in the second charge accumulating part C2. It is possible to obtain a difference between the amounts of charge accumulated in the two charge accumulating parts C1 and C2, thereby obtaining an amount of light which is emitted from the light emitting means and then is reflected from the physical object.

PRIOR ART DOCUMENTS

Patent Documents

Patent Document 1: Japanese Patent No. 4072732
Patent Document 2: Japanese Patent No. 3521187

SUMMARY OF THE INVENTION

Problems to be Solved by the Invention

In a typical display device in which a plurality of optical sensors are provided on a display panel, read from the optical sensors is performed in a line sequential manner. Moreover, backlights for a mobile appliance are turned on simultaneously and are turned off simultaneously as an entire screen.

In the input/output device described in Patent Document 1, the backlight is turned on and off once in the one-frame period. During the backlight turn-on period, a period for the reset does not overlap with a period for the read. Also during the backlight turn-off period, a period for the reset does not overlap with a period for the read. Consequently, the read from the light receiving elements needs to be performed within a ¼-frame period (for example, within 1/240 seconds in the case where a frame rate is 60 frames per second). In an actual fact, however, it is considerably difficult to perform the high-speed read described above.

Moreover, there is a deviation corresponding to a ½-frame period between a period (B1 shown in FIG. 42) during which the light receiving element senses light in the backlight turn-on period and a period (B2 shown in FIG. 42) during which the light receiving element senses light in the backlight turn-off period. Consequently, followability to motion input varies in accordance with a direction of the input. Moreover, this input/output device starts to perform the read immediately after completion of the reset, and starts to perform the reset immediately after completion of the read. Consequently, it is impossible to freely set a length and an interval with regard to the backlight turn-on period and the backlight turn-off period.

Moreover, in this input/output device, an amount of light during the backlight turn-on period and an amount of light during the backlight turn-off period are detected by the same light receiving element. Consequently, in the case where a certain light receiving element detects an amount of light during the backlight turn-on period, this light receiving element fails to start to detect an amount of light during the backlight turn-off period until the detected amount of light is read from this light receiving element.

Hence, it is an object of the present invention to provide a display device that solves the problems described above, and has an input function which does not depend on light environments.

Means for Solving the Problems

According to a first aspect of the present invention, there is provided a display device in which a plurality of optical sensors are arranged in a pixel region, the display device including: a display panel that includes a plurality of display pixel circuits and a plurality of sensor pixel circuits; and a drive circuit that outputs, to the sensor pixel circuits, a control signal indicating a sensing period when a light source is turned on and a sensing period when the light source is turned off, wherein the sensor pixel circuits include: a first sensor pixel circuit that senses light during the sensing period when the light source is turned on and retains the amount of sensed light otherwise, in accordance with the control signal; and a second sensor pixel circuit that senses light during the sensing period when the light source is turned off and retains the amount of sensed light otherwise, in accordance with the control signal.

According to a second aspect of the present invention, in the first aspect of the present invention, each of the first and second sensor pixel circuits includes: one optical sensor; one accumulation node accumulating charge corresponding to the amount of sensed light; a read transistor having a control terminal being electrically connectable to the accumulation node; and a retention switching element that is provided on a path for a current flowing through the optical sensor and turns on or off in accordance with the control signal, the retention switching element included in the first sensor pixel circuit turns on during the sensing period when the light source is turned on, and the retention switching element included in the second sensor pixel circuit turns on during the sensing period when the light source is turned off.

According to a third aspect of the present invention, in the second aspect of the present invention, in each of the first and second sensor pixel circuits, the retention switching element is provided between the accumulation node and one of ends of the optical sensor, and the other end of the optical sensor is connected to a reset line.

According to a fourth aspect of the present invention, in the second aspect of the present invention, each of the first and second sensor pixel circuits includes, as the retention switching element, a first retention switching element provided between the accumulation node and one of ends of the optical sensor; and a second retention switching element provided between a reset line and the other end of the optical sensor.

According to a fifth aspect of the present invention, in the third aspect of the present invention, the first and second sensor pixel circuits share one optical sensor between two types of circuits, and the shared optical sensor has one of ends connected to one of ends of the retention switching element included in each of the first and second sensor pixel circuits, and the other end connected to the reset line.

According to a sixth aspect of the present invention, in the fourth aspect of the present invention, the first and second sensor pixel circuits share one optical sensor between two types of circuits, and the shared optical sensor has one of ends connected to one of ends of the first retention switching element included in each of the first and second sensor pixel circuits, and the other end connected to one of ends of the second retention switching element included in each of the first and second sensor pixel circuits.

According to a seventh aspect of the present invention, in the fifth aspect of the present invention, the first and second sensor pixel circuits share one read transistor between two types of circuits, and the shared read transistor has a control terminal connected to one of ends of the shared optical sensor and one of ends of the retention switching element included in each of the first and second sensor pixel circuits.

According to an eighth aspect of the present invention, in the second aspect of the present invention, in each of the first and second sensor pixel circuits, the optical sensor is provided between the accumulation node and one of ends of the retention switching element, and the other end of the retention switching element is connected to a reset line.

According to a ninth aspect of the present invention, in the eighth aspect of the present invention, each of the first and second sensor pixel circuits further includes: a first switching element that has one of ends connected to a retention switching element side terminal of the optical sensor, and turns on or off in accordance with the control signal; and a second switching element supplying the other end of the first switching element with a potential corresponding to the potential at the accumulation node, and the first switching element included in the first sensor pixel circuit turns on during a period other than the sensing period when the light source is turned on, and the first switching element included in the second sensor pixel circuit turns on during a period other than the sensing period when the light source is turned off.

According to a tenth aspect of the present invention, in the second aspect of the present invention, the sensor pixel circuit further includes a capacitor provided between the accumulation node and a read line.

According to an eleventh aspect of the present invention, in the second aspect of the present invention, the display panel further includes a plurality of output lines for propagating output signals from the first and second sensor pixel circuits, and the first and second sensor pixel circuits are connected to the different output lines depending on the type.

According to a twelfth aspect of the present invention, in the eleventh aspect of the present invention, the display device further includes a difference circuit that obtains a difference between the output signal from the first sensor pixel circuit and the output signal from the second sensor pixel circuit.

According to a thirteenth aspect of the present invention, in the second aspect of the present invention, the drive circuit outputs, as the control signal, a signal indicating the sensing period when the light source is turned on once in a one-frame period and a signal indicating the sensing period when the light source is turned off once in the one-frame period, in a separate manner.

According to a fourteenth aspect of the present invention, in the second aspect of the present invention, the drive circuit outputs, as the control signal, a signal indicating the sensing period when the light source is turned on and the sensing period when the light source is turned off a plurality of times, respectively, in a one-frame period.

According to a fifteenth aspect of the present invention, there is provided a sensor pixel circuit to be arranged in a pixel region of a display device, the sensor pixel circuit including: one optical sensor; one accumulation node accumulating charge corresponding to an amount of sensed light; a read transistor having a control terminal being electrically connectable to the accumulation node; and a retention switching element that is provided on a path for a current flowing through the optical sensor and turns on in one of a sensing period when a light source is turned on and a sensing period when the light source is turned off.

Effects of the Invention

According to the first aspect of the present invention, it is possible to detect the amount of light when the light source is turned on and the amount of light when the light source is turned off separately by use of the sensor pixel circuits of two types, and to obtain the difference between the two amounts of light at the outside of the sensor pixel circuit. Thus, it is possible to provide an input function which does not depend on light environments. Moreover, as compared with the case of detecting two types of amounts of light sequentially by use of one sensor pixel circuit, it is possible to reduce a frequency of read from the sensor pixel circuits, to retard the read speed, and to reduce power consumption in the device. Moreover, it is possible to increase the degree of freedom for setting turn-on and turn-off timings of the light source as well as reset and read timings of the sensor pixel circuits. Moreover, in case of using a suitable driving method, it is possible to eliminate a deviation between the sensing period when the light source is turned on and the sensing period when the light source is turned off, and to prevent followability to motion input from varying in accordance with a direction of the input. Moreover, by obtaining a difference between dark currents at the outside of the sensor pixel circuit, it is possible to perform temperature compensation.

According to the second aspect of the present invention, the retention switching element turning on during the designated sensing period is provided on the path for the current flowing through the optical sensor. Thus, it is possible to constitute the first sensor pixel circuit that senses light during the sensing period when the light source is turned on and retains the amount of sensed light otherwise, and the second sensor pixel circuit that senses light during the sensing period when the light source is turned off and retains the amount of sensed light otherwise. It is possible to obtain the difference between the amount of light when the light source is turned on and the amount of light when the light source is turned off, at the outside of the sensor pixel circuits, based on the output signals from these sensor pixel circuits.

According to the third aspect of the present invention, the retention switching element is provided between the optical sensor and the accumulation node. Thus, it is possible to constitute the sensor pixel circuit that senses light during the designated sensing period and retains the amount of sensed light otherwise. By use of this, it is possible to constitute the first sensor pixel circuit that detects the amount of light when the light source is turned on and the second sensor pixel circuit that detects the amount of light when the light source is turned off.

According to the fourth aspect of the present invention, the retention switching elements are provided on the two sides of the optical sensor. Thus, it is possible to constitute the sensor pixel circuit that senses light during the designated sensing period and retains the amount of sensed light otherwise. By use of this, it is possible to constitute the first sensor pixel circuit that detects the amount of light when the light source is turned on and the second sensor pixel circuit that detects the amount of light when the light source is turned off. Moreover, during the period other than the sensing period, the second retention switching element provided between the optical sensor and the reset line turns off. Therefore, it is possible to reduce a variation in the potential at the terminal, which is on the side of the first retention switching element, of the optical sensor caused by a current flowing through the optical sensor, and to reduce a difference between potentials to be applied to the two ends of the first retention switching element. Thus, it is possible to reduce a leakage current flowing through the first retention switching element, to prevent a variation in the potential at the accumulation node, and to enhance detection accuracy.

According to the fifth or sixth aspect of the present invention, by causing the sensor pixel circuits of two types share the one optical sensor, it is possible to cancel an influence of a variation in sensitivity characteristics of the optical sensor, and to accurately obtain the differences between the amount of light when the light source is turned on and the amount of light when the light source is turned off. Moreover, it is possible to reduce the number of optical sensors, to increase an aperture ratio, and to enhance the sensitivity of the sensor pixel circuit.

According to the seventh aspect of the present invention, by causing the sensor pixel circuits of two types share the one read transistor, it is possible to cancel an influence of a variation in threshold value characteristics of the read transistor, and to accurately obtain the difference between the amount of light when the light source is turned on and the amount of light when the light source is turned off.

According to the eighth aspect of the present invention, the retention switching element is provided between the optical sensor and the reset line. Thus, it is possible to constitute the sensor pixel circuit that senses light during the designated sensing period and retains the amount of sensed light otherwise. By use of this, it is possible to constitute the first sensor pixel circuit that detects the amount of light when the light source is turned on and the second sensor pixel circuit that detects the amount of light when the light source is turned off.

According to the ninth aspect of the present invention, by applying the potential corresponding to the potential at the accumulation node to the terminal, which is opposed to the accumulation node, of the optical sensor upon change of the control signal, it is possible to immediately interrupt the current flowing through the optical sensor, and to enhance detection accuracy.

According to the tenth aspect of the present invention, by applying a potential for read to the read line, it is possible to change the potential at the accumulation node, and to read a signal corresponding to the amount of sensed light from the sensor pixel circuit.

According to the eleventh aspect of the present invention, by connecting the first and second sensor pixel circuits to the different output lines depending on the type, it is possible to perform the read from sensor pixel circuits of two types in parallel. Moreover, by performing the read in parallel, it is possible to retard the read speed, and to reduce power consumption in the device. Moreover, in case of reading the two types of amounts of light in parallel and then immediately obtaining the difference between the two amounts of light, it becomes unnecessary to provide a memory which is required in the case of detecting two types of amounts of light sequentially and is used for storing the amount of light sensed firstly.

According to the twelfth aspect of the present invention, by providing the difference circuit that obtains the difference between the output signal from the first sensor pixel circuit and the output signal from the second sensor pixel circuit, it is possible to immediately obtain the difference between the amount of light to be incident when the light source is turned on and the amount of light to be incident when the light source is turned off, and to eliminate the need for a memory that stores the amount of light sensed firstly.

According to the thirteenth aspect of the present invention, by performing the operation of sensing light when the light source is turned on and the operation of sensing light when the light source is turned off once, respectively, in the one-frame period, by use of the first and second sensor pixel circuits, it is possible to increase the degree of freedom for setting the turn-on and turn-off timings of the light source as well as the reset and read timings of the sensor pixel circuits. Moreover, in case of setting the sensing period when the light source is turned on and the sensing period when the light source is turned off in proximity to each other, it is possible to eliminate a deviation between the sensing period when the light source is turned on and the sensing period when the light source is turned off, and to prevent followability to motion input from varying in accordance with a direction of the input.

According to the fourteenth aspect of the present invention, by performing the operation of sensing light when the light source is turned on and the operation of sensing light when the light source is turned off a plurality of times, respectively, in the one-frame period, by use of the first and second sensor pixel circuits, it is possible to eliminate a deviation between the sensing period when the light source is turned on and the sensing period when the light source is turned off, and to prevent followability to motion input from varying in accordance with a direction of the input.

According to the fifteenth aspect of the present invention, it is possible to constitute the sensor pixel circuit to be included in the display device according to the first aspect, and to provide the display device having an input function which does not depend on light environments.

MODES FOR CARRYING OUT THE INVENTION

Figure 1:
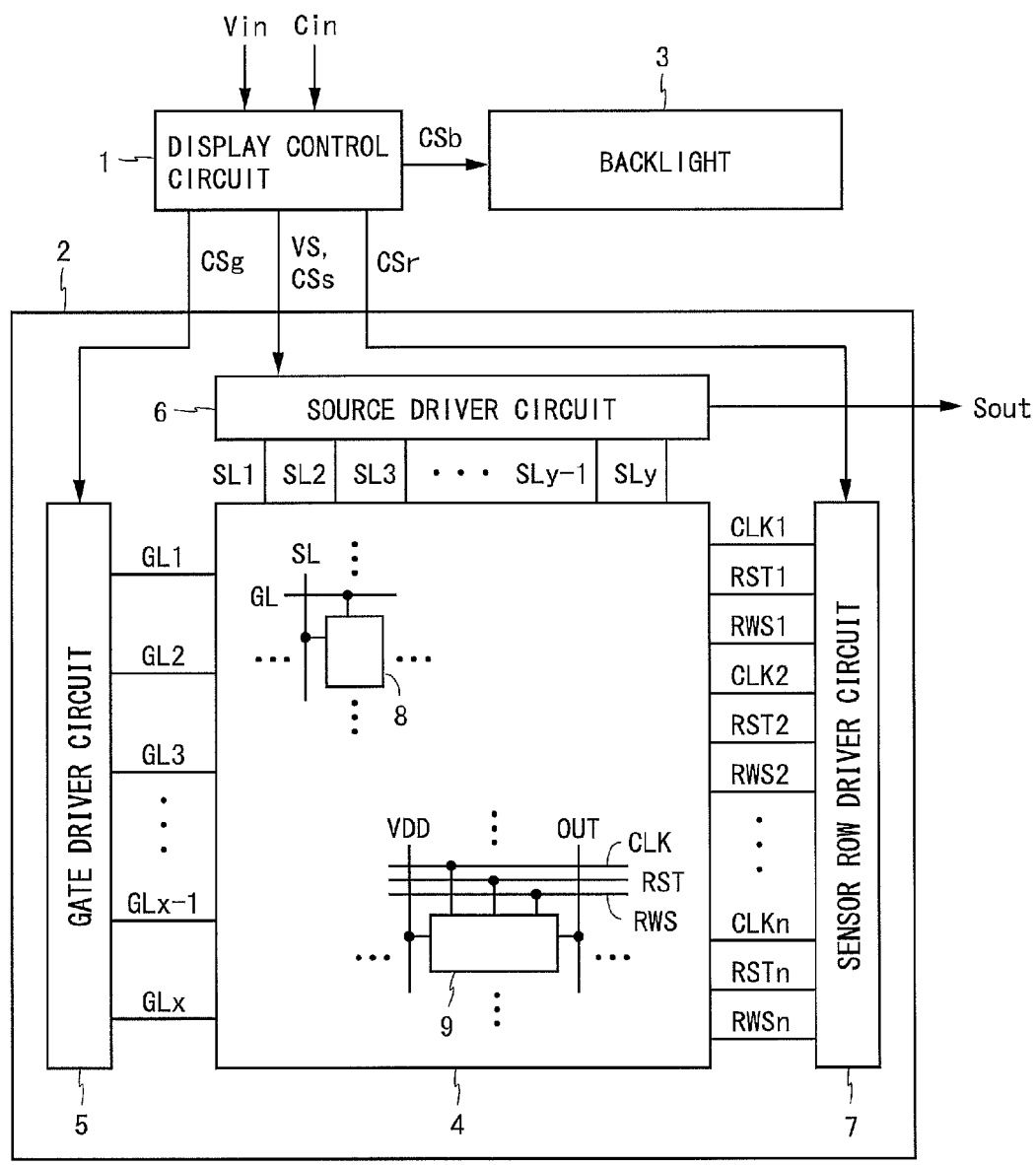
FIG. 1 is a block diagram showing a configuration of a display device according to one embodiment of the present invention.

FIG. 1 is a block diagram showing a configuration of a display device according to one embodiment of the present invention. As shown in FIG. 1, the display device includes a display control circuit 1, a display panel 2 and a backlight 3. The display panel 2 includes a pixel region 4, a gate driver circuit 5, a source driver circuit 6 and a sensor row driver circuit 7. The pixel region 4 includes a plurality of display pixel circuits 8 and a plurality of sensor pixel circuits 9. This display device has a function of displaying an image on the display panel 2, and a function of sensing light incident on the display panel 2. In the following definition, "x" represents an integer of not less than 2, "y" represents a multiple of 3, "m" and "n" each represent an even number, and a frame rate of the display device is 60 frames per second.

To the display device shown in FIG. 1, a video signal Vin and a timing control signal Cin are supplied from the outside. Based on these signals, the display control circuit 1 outputs a video signal VS and control signals CSg, CSs and CSr to the display panel 2, and outputs a control signal CSb to the backlight 3. The video signal VS may be equal to the video signal Vin, or may be a signal corresponding to the video signal Vin subjected to signal processing.

The backlight 3 is a light source for irradiating light to the display panel 2. More specifically, the backlight 3 is provided on a back side of the display panel 2, and irradiates light to the back of the display panel 2. The backlight 3 is turned on when the control signal CSb is in a HIGH level, and is turned off when the control signal CSb is in a LOW level.

In the pixel region 4 of the display panel 2, the (x×y) display pixel circuits 8 and the (n×m/2) sensor pixel circuits 9 are arranged in a two-dimensional array, respectively. More specifically, "x" gate lines GL1 to GLx and "y" source lines SL1 to SLy are formed in the pixel region 4. The gate lines GL1 to GLx are arranged in parallel to one another, and the source lines SL1 to SLy are arranged in parallel to one another so as to be orthogonal to the gate lines GL1 to GLx. The (x×y) display pixel circuits 8 are arranged in the vicinity of intersections between the gate lines GL1 to GLx and the source lines SL1 to SLy. Each display pixel circuit 8 is connected to one gate line GL and one source line SL. The display pixel circuits 8 are classified into those for red display, those for green display and those for blue display. These three types of display pixel circuits 8 are arranged and aligned in an extending direction of the gate lines GL1 to GLx to form one color pixel.

In the pixel region 4, "n" clock lines CLK1 to CLKn, "n" reset lines RST1 to RSTn and "n" read lines RWS1 to RWSn are formed in parallel to the gate lines GL1 to GLx. Moreover, in the pixel region 4, other signal lines and power supply lines (not shown) are formed in parallel to the gate lines GL1 to GLx in some cases. In the case where read from the sensor pixel circuits 9 is performed, "m" source lines selected from among the source lines SL1 to SLy are used as power supply lines VDD1 to VDDm, and different "m" source lines are used as output lines OUT1 to OUTm.

Figure 2:
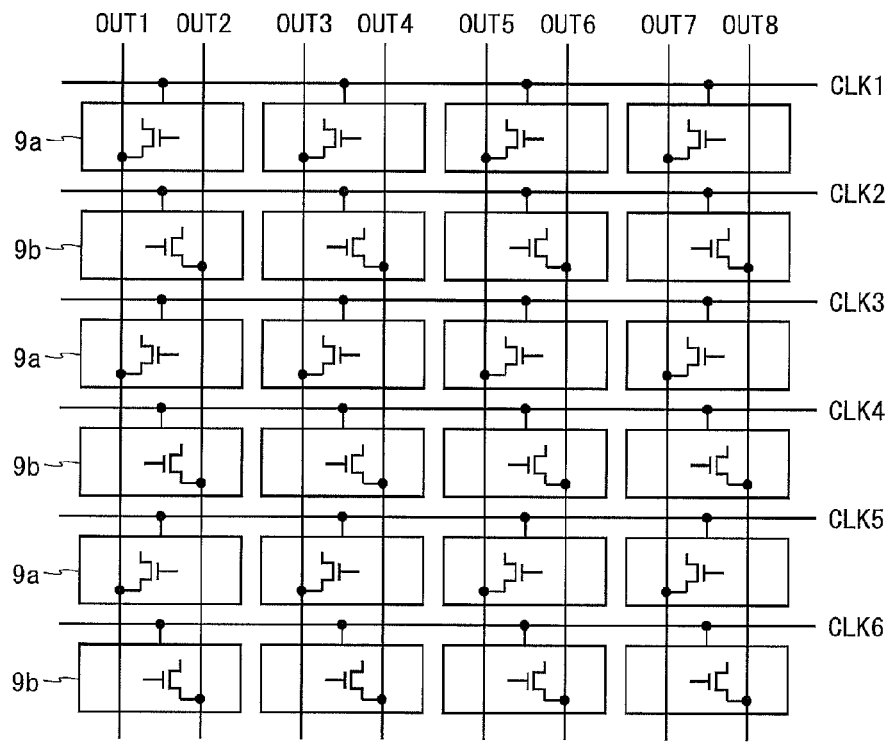
FIG. 2 is a diagram showing an arrangement of sensor pixel circuits on a display panel included in the display device shown in FIG. 1.

FIG. 2 is a diagram showing an arrangement of the sensor pixel circuits 9 in the pixel region 4. The (n×m/2) sensor pixel circuits 9 include first sensor pixel circuits 9a each sensing light to be incident during a turn-on period of the backlight 3 and second sensor pixel circuits 9b each sensing light to be incident during a turn-off period of the backlight 3. The first sensor pixel circuits 9a are equal in number to the second sensor pixel circuits 9b. In FIG. 2, the (n×m/4) first sensor pixel circuits 9a are arranged in the vicinity of intersections between the odd-numbered clock lines CLK1 to CLKn−1 and the odd-numbered output lines OUT1 to OUTm−1. The (n×m/4) second sensor pixel circuits 9b are arranged in the vicinity of intersections between the even-numbered clock lines CLK2 to CLKn and the even-numbered output lines OUT2 to OUTm. As described above, the display panel 2 includes the plurality of output lines OUT1 to OUTm for propagating output signals from the first sensor pixel circuits 9a and output signals from the second sensor pixel circuits 9b, and the first sensor pixel circuit 9a and the second sensor pixel circuit 9b are connected to the different output lines depending on the type.

The gate driver circuit 5 drives the gate lines GL1 to GLx. More specifically, based on the control signal CSg, the gate driver circuit 5 selects one gate line sequentially from among the gate lines GL1 to GLx, applies a HIGH-level potential to the selected gate line, and applies a LOW-level potential to the remaining gate lines. Thus, the "y" display pixel circuits 8 connected to the selected gate line are selected collectively.

The source driver circuit 6 drives the source lines SL1 to SLy. More specifically, based on the control signal CSs, the source driver circuit 6 applies potentials corresponding to the video signal VS to the source lines SL1 to SLy. Herein, the source driver circuit 6 may perform line sequential drive, or may perform dot sequential drive. The potentials applied to the source lines SL1 to SLy are written to the "y" display pixel circuits 8 selected by the gate driver circuit 5. As described above, it is possible to write the potentials corresponding to the video signal VS to all the display pixel circuits 8 by use of the gate driver circuit 5 and the source driver circuit 6, thereby displaying a desired image on the display panel 2.

The sensor row driver circuit 7 drives the clock lines CLK1 to CLKn, the reset lines RST1 to RSTn, the read lines RWS1 to RWSn, and the like. More specifically, based on the control signal CSr, the sensor row driver circuit 7 applies a HIGH-level potential and a LOW-level potential to the clock lines CLK1 to CLKn at timings shown in FIG. 4 or FIG. 6 (the details will be described later). Moreover, based on the control signal CSr, the sensor row driver circuit 7 selects (n/2) or two reset lines from among the reset lines RST1 to RSTn, applies a HIGH-level potential for reset to the selected reset lines, and applies a LOW-level potential to the remaining reset lines. Thus, the (n×m/4) or "m" sensor pixel circuits 9 connected to the reset lines applied with the HIGH-level potential are reset collectively.

Moreover, based on the control signal CSr, the sensor row driver circuit 7 selects adjacent two read lines sequentially from among the read lines RWS1 to RWSn, applies a HIGH-level potential for read to the selected read lines, and applies a LOW-level potential to the remaining read lines. Thus, the "m" sensor pixel circuits 9 connected to the selected two read lines turn to a readable state collectively. Herein, the source driver circuit 6 applies a HIGH-level potential to the power supply lines VDD1 to VDDm. Thus, the "m" sensor pixel circuits 9 in the readable state output signals corresponding to amounts of light sensed in the respective sensor pixel circuits 9 (hereinafter, referred to as sensor signals) to the output lines OUT1 to OUTm.

The source driver circuit 6 includes a difference circuit (not shown) that obtains a difference between the output signal from the first sensor pixel circuit 9a and the output signal from the second sensor pixel circuit 9b. The source driver circuit 6 amplifies the differences between amounts of light obtained by the difference circuit, and outputs the amplified signals as a sensor output Sout to the outside of the display panel 2. As described above, by reading the sensor signals from all the sensor pixel circuits 9 by use of the source driver circuit 6 and the sensor row driver circuit 7, it is possible to sense light incident on the display panel 2. The display device shown in FIG. 1 performs one of one-time drive and consecutive drive each described below, in order to sense light incident on the display panel 2.

Figure 3:
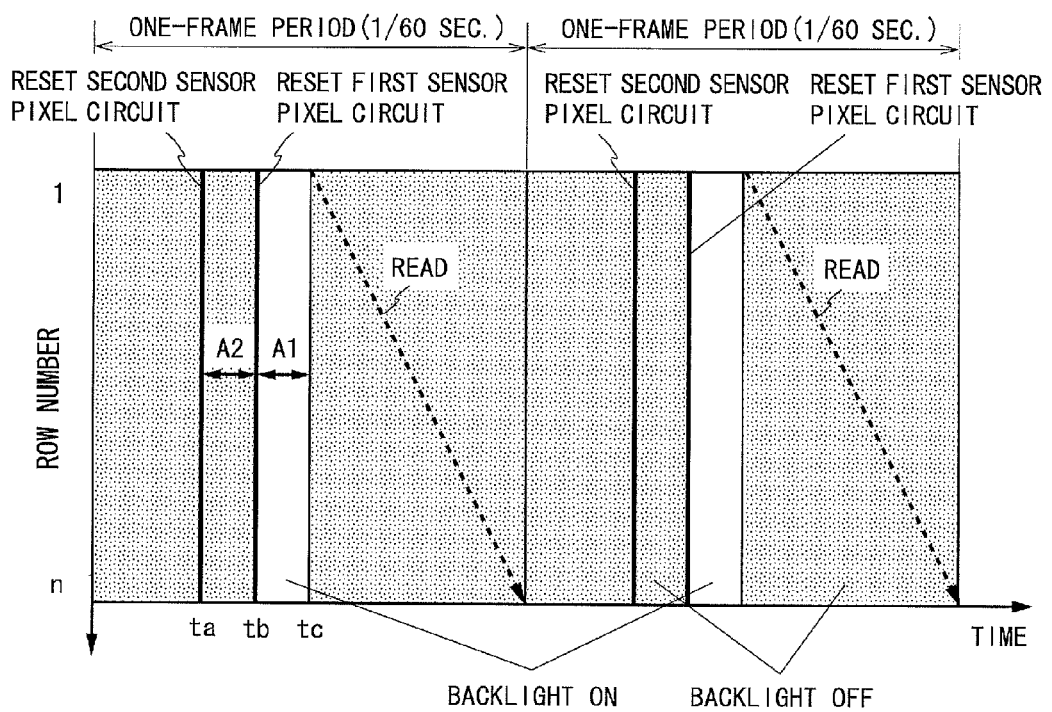
FIG. 3 is a diagram showing turn-on and turn-off timings of a backlight as well as reset and read timings of the sensor pixel circuits, in the case where the display device shown in FIG. 1 performs one-time drive.

FIG. 3 is a diagram showing turn-on and turn-off timings of the backlight 3 as well as reset and read timings of the sensor pixel circuits 9 in the case of performing the one-time drive. In the case of performing the one-time drive, the backlight 3 is turned on once for a predetermined time in a one-frame period and is turned off during the remaining period. More specifically, the backlight 3 is turned on at a time tb and is turned off at a time tc in the one-frame period. Moreover, reset for all the first sensor pixel circuits 9a is performed at the time tb, and reset for all the second sensor pixel circuits 9b is performed at a time ta.

The first sensor pixel circuit 9a senses light to be incident during a period A1 from the time tb to the time tc (a turn-on period of the backlight 3). The second sensor pixel circuit 9b senses light to be incident during a period A2 from the time ta to the time tb (a turn-off period of the backlight 3). The period A1 is equal in length to the period A2. Read from the first sensor pixel circuits 9a and read from the second sensor pixel circuits 9b are performed in parallel in a line sequential manner after the time tc. It is to be noted that, in FIG. 3, the read from the sensor pixel circuits 9 is completed within the one-frame period; however, the read may be completed until the reset for the second sensor pixel circuits 9b is started in a next frame period.

Figure 4:
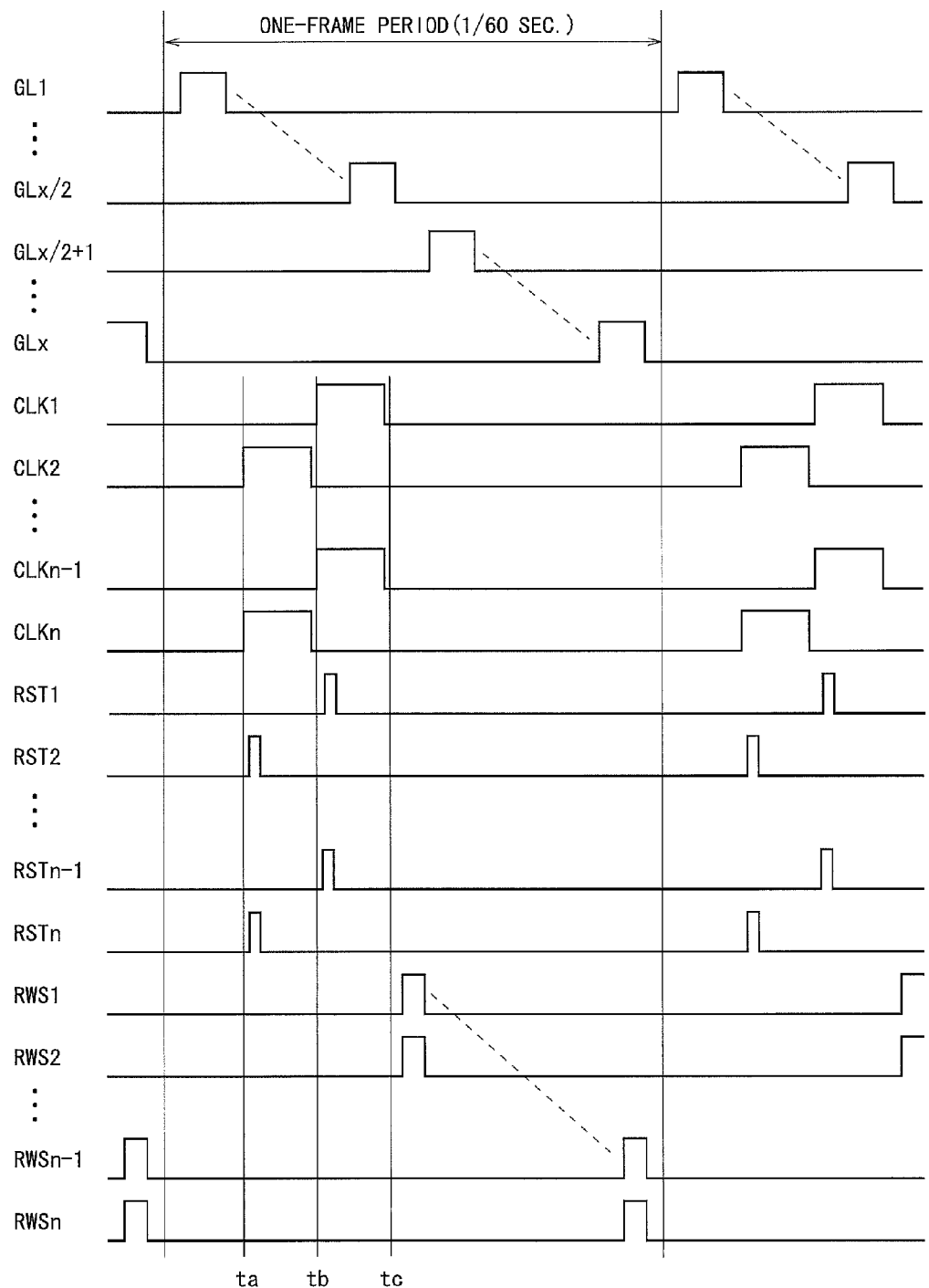
FIG. 4 is a signal waveform diagram of the display panel in the case where the display device shown in FIG. 1 performs the one-time drive.

FIG. 4 is a signal waveform diagram of the display panel 2 in the case of performing the one-time drive. As shown in FIG. 4, potentials at the gate lines GL1 to GLx sequentially turn to the HIGH level once for a predetermined time in a one-frame period. Potentials at the odd-numbered clock lines CLK1 to CLKn−1 turn to the HIGH level once during the period A1 (more specifically, from the time tb to a time which is slightly before the time tc) in the one-frame period. Potentials at the even-numbered clock lines CLK2 to CLKn turn to the HIGH level once during the period A2 (more specifically, from the time ta to a time which is slightly before the time tb) in the one-frame period. Potentials at the odd-numbered reset lines RST1 to RSTn−1 turn to the HIGH level once for a predetermined time in the beginning of the period A1 in the one-frame period. Potentials at the even-numbered reset lines RST2 to RSTn turn to the HIGH level once for a predetermined time in the beginning of the period A2 in the one-frame period. The read lines RWS1 to RWSn are provided in twos, and potentials at the (n/2) pairs of read lines sequentially turn to the HIGH level for a predetermined time after the time tc.

Figure 5:
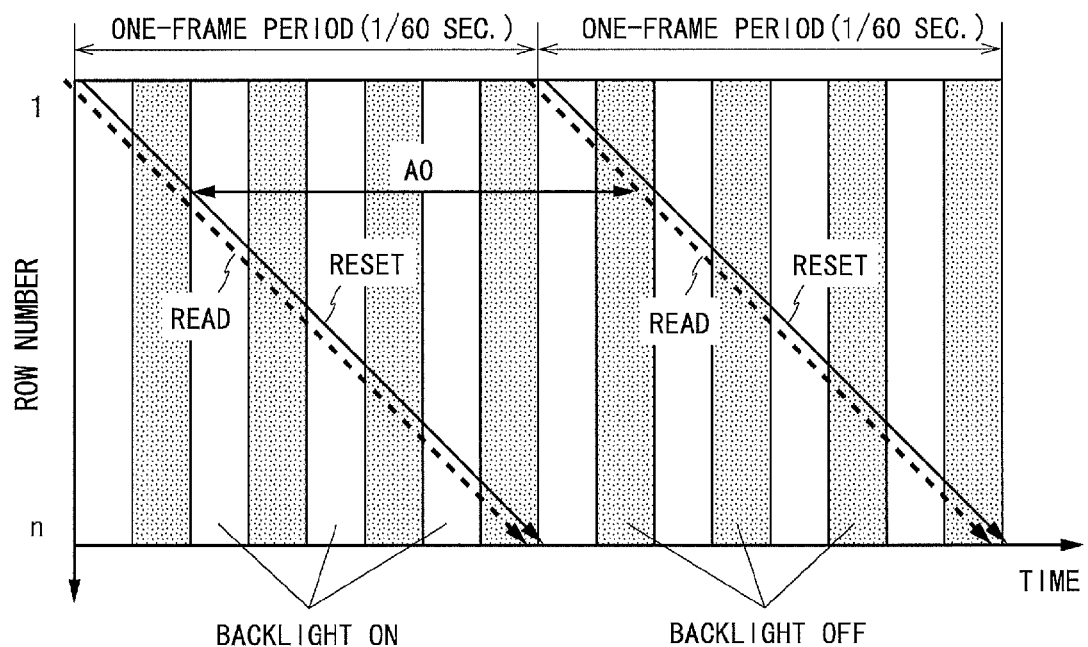
FIG. 5 is a diagram showing turn-on and turn-off timings of the backlight as well as reset and read timings of the sensor pixel circuits, in the case where the display device shown in FIG. 1 performs consecutive drive.

FIG. 5 is a diagram showing turn-on and turn-off timings of the backlight 3 as well as reset and read timings of the sensor pixel circuits 9 in the case of performing the consecutive drive. As shown in FIG. 5, the backlight 3 is turned on a plurality of times and is turned off a plurality of times in a one-frame period. It is assumed in the following description that the backlight 3 is turned on four times and is turned off four times in a one-frame period. A turn-on period is equal in length to a turn-off period. The reset for the sensor pixel circuits 9 is performed in a line sequential manner over a one-frame period (a solid line arrow). The read from the sensor pixel circuits 9 is performed after a lapse of almost the one-frame period from the reset (more specifically, after a lapse of a time which is slightly shorter than the one-frame period) (a broken line arrow).

Figure 6:
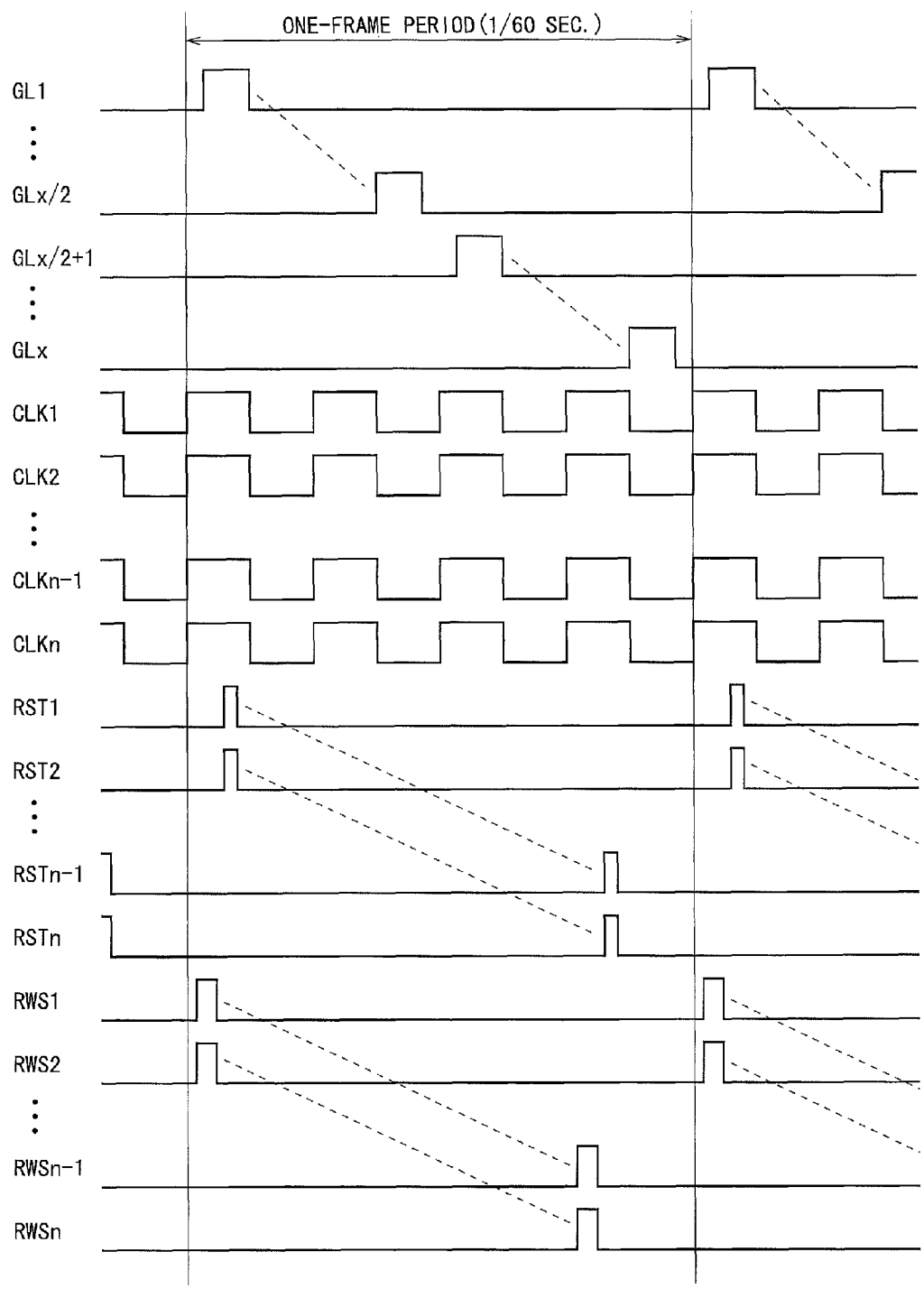
FIG. 6 is a signal waveform diagram of the display panel in the case where the display device shown in FIG. 1 performs the consecutive drive.

FIG. 6 is a signal waveform diagram of the display panel 2 in the case of performing the consecutive drive. As shown in FIG. 6, the potentials at the gate lines GL1 to GLx change as in the case of the one-time drive. The potentials at the clock lines CLK1 to CLKn change at the same timing, and turn to the HIGH level and the LOW level four times, respectively, in the one-frame period. With regard to the potentials at the clock lines CLK1 to CLKn, the HIGH-level period is equal in length to the LOW-level period. The reset lines RST1 to RSTn are provided in twos, and the potentials at the (n/2) pairs of reset lines sequentially turn to the HIGH level once for a predetermined time in the one-frame period. The read lines RWS1 to RWSn are also provided in twos, and the potentials at the (n/2) pairs of read lines sequentially turn to the HIGH level for a predetermined time in the one-frame period. Immediately after the potential at the read line RWS1 changes from the HIGH level to the LOW level, the potential at the reset line RST1 changes from the LOW level to the HIGH level. Similar things hold true for the potentials at the reset lines RST2 to RSTn. Therefore, a period during which the sensor pixel circuit 9 senses light (a period from the reset to the read: A0 shown in FIG. 5) becomes almost equal in length to the one-frame period.

Figure 7:
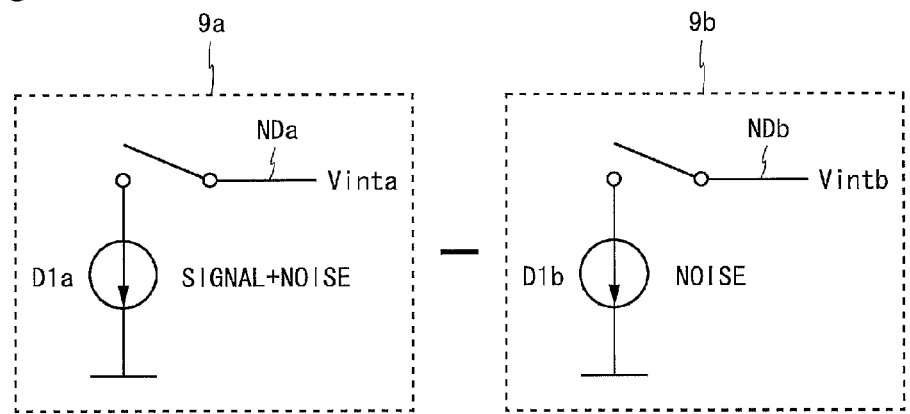
FIG. 7 is a diagram showing schematic configurations of the sensor pixel circuits included in the display device shown in FIG. 1.

FIG. 7 is a diagram showing schematic configurations of the sensor pixel circuits 9. As shown in FIG. 7, the first sensor pixel circuit 9a includes one photodiode D1a and one accumulation node NDa. The photodiode D1a pulls out, of the accumulation node NDa, charge corresponding to an amount of light to be incident while the backlight 3 is turned on (which corresponds to (signal+noise)). As in the first sensor pixel circuit 9a, the second sensor pixel circuit 9b includes one photodiode D1b and one accumulation node NDb. The photodiode D1b pulls out, of the accumulation node NDb, charge corresponding to an amount of light to be incident while the backlight 3 is turned off (which corresponds to noise). A sensor signal corresponding to the amount of light to be incident during the sensing period when the backlight 3 is turned on is read from the first sensor pixel circuit 9a. A sensor signal corresponding to the amount of light to be incident during the sensing period when the backlight 3 is turned off is read from the second sensor pixel circuit 9b. By obtaining the difference between the output signal from the first sensor pixel circuit 9a and the output signal from the second sensor pixel circuit 9b, using the difference circuit included in the source driver circuit 6, it is possible to obtain the difference between the amount of light when the backlight is turned on and the amount of light when the backlight is turned off.

It is to be noted that the number of sensor pixel circuits 9 to be provided in the pixel region 4 may be arbitrary. However, it is preferable that the first sensor pixel circuits 9a and the second sensor pixel circuits 9b are connected to the different output lines. For example, in the case where the (n×m) sensor pixel circuits 9 are provided in the pixel region 4, the "n" first sensor pixel circuits 9a may be connected to the odd-numbered output lines OUT1 to OUTm−1, and the "n" second sensor pixel circuits 9b may be connected to the even-numbered output lines OUT2 to OUTm. In this case, the read from the sensor pixel circuits 9 is performed for each row. Alternatively, the sensor pixel circuits 9 the number of which is equal to that of color pixels (that is, (x×y/3)) may be provided in the pixel region 4. Alternatively, the sensor pixel circuits 9 the number of which is smaller than that of color pixels (for example, one severalth to one several tenth of color pixels) may be provided in the pixel region 4.

As described above, the display device according to the embodiment of the present invention is the display device in which the plurality of photodiodes (optical sensors) are arranged in the pixel region 4. The display device includes the display panel 2 that includes the plurality of display pixel circuits 8 and the plurality of sensor pixel circuits 9, and the sensor row driver circuit 7 (drive circuit) that outputs, to the sensor pixel circuits 9, the clock signals CLK (control signals) indicating the sensing period when the backlight is turned on and the sensing period when the backlight is turned off. Hereinafter, description will be given of the details of the sensor pixel circuit 9 included in this display device. In the following description, a sensor pixel circuit is simply referred to as a pixel circuit, and a signal on a signal line is designated using the designation of the signal line for the sake of identification (for example, a signal on a clock line CLKa is referred to as a clock signal CLKa).

In first, second, sixth and seventh embodiments, the first sensor pixel circuit 9a is connected to a clock line CLKa, a reset line RSTa, a read line RWSa, a power supply line VDDa and an output line OUTa. The second sensor pixel circuit 9b is connected to a clock line CLKb, a reset line RSTb, a read line RWSb, a power supply line VDDb and an output line OUTb. In these embodiments, the second sensor pixel circuit 9b has a configuration which is equal to that of the first sensor pixel circuit 9a and operates as in the first sensor pixel circuit 9a; therefore the description about the second sensor pixel circuit 9b is omitted appropriately. In third to fifth embodiments, the first sensor pixel circuit 9a and the second sensor pixel circuit 9b share a part of constituent elements so as to be configured as one pixel circuit. The pixel circuit according to each of the third and fourth embodiments is connected to a reset line RST and a read line RWS each formed in common. The pixel circuit according to the fifth embodiment is connected to a reset line RST, a read line RWS, a power supply line VDD and an output line OUT each formed in common.

The display device according to the embodiment of the present invention may perform the one-time drive shown in FIGS. 3 and 4 or may perform the consecutive drive shown in FIGS. 5 and 6. It is assumed in the following description that the display device according to each of the first to fifth embodiments performs the one-time drive and the display device according to each of the sixth and seventh embodiments performs the consecutive drive.

First Embodiment

Figure 8:
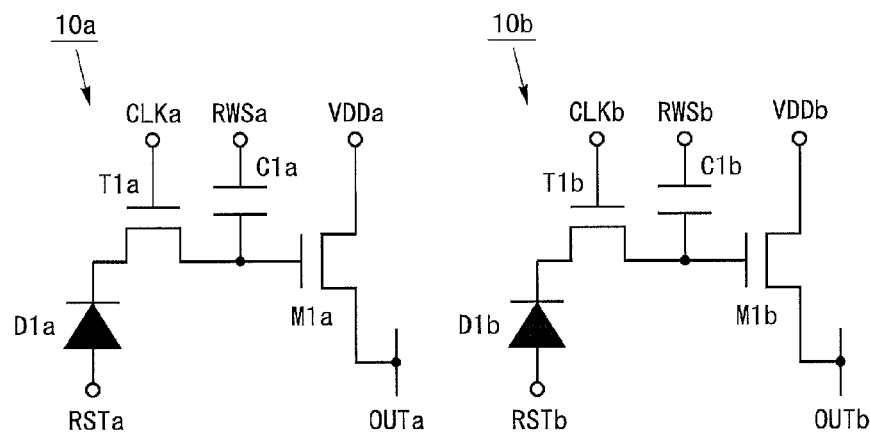
FIG. 8 is a circuit diagram of sensor pixel circuits according to a first embodiment of the present invention.

FIG. 8 is a circuit diagram of pixel circuits according to a first embodiment of the present invention. As shown in FIG. 8, a first pixel circuit 10a includes transistors T1a and M1a, a photodiode D1a, and a capacitor C1a. A second pixel circuit 10b includes transistors T1b and M1b, a photodiode D1b, and a capacitor C1b. Each of the transistors T1a, M1a, T1b and M1b is an N-type TFT (Thin Film Transistor).

With regard to the first pixel circuit 10a, in the photodiode D1a, an anode is connected to a reset line RSTa, and a cathode is connected to a source of the transistor T1a. In the transistor T1a, a gate is connected to a clock line CLKa, and a drain is connected to a gate of the transistor M1a. In the transistor M1a, a drain is connected to a power supply line VDDa, and a source is connected to an output line OUTa. The capacitor C1a is provided between the gate of the transistor M1a and a read line RWSa. In the first pixel circuit 10a, a node connected to the gate of the transistor M1a serves as an accumulation node that accumulates charge corresponding to an amount of sensed light, and the transistor M1a functions as a read transistor. The second pixel circuit 10b has a configuration which is equal to that of the first pixel circuit 10a.

Figure 9:
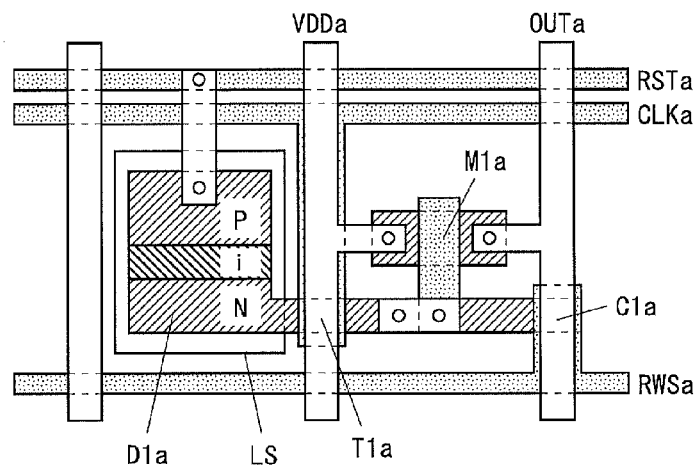
FIG. 9 is a layout diagram of the sensor pixel circuit shown in FIG. 8.

FIG. 9 is a layout diagram of the first pixel circuit 10a. As shown in FIG. 9, the first pixel circuit 10a has a configuration that a light shielding film LS, a semiconductor layer (hatch pattern portion), a gate wiring layer (dot pattern portions) and a source wiring layer (white portion) are formed sequentially on a glass substrate. A contact (shown with a white circle) is provided at a place where the semiconductor layer and the source wiring layer are connected, and a place where the gate wiring layer and the source wiring layer are connected. The transistors T1a and M1a are formed by arranging the semiconductor layer and the gate wiring layer so that these two layers cross one another. The photodiode D1a is formed by arranging a P layer, an I layer and an N layer included in the semiconductor layers so that these three layers are aligned. The capacitor C1a is formed by arranging the semiconductor layer and the gate wiring layer so that these two layers overlap. The light shielding film LS is made of metal, and prevents light entering through the back of the substrate from being incident on the photodiode D1a. The second pixel circuit 10b has a layout which is similar to that of the first pixel circuit 10a. It is to be noted that the layout of each of the first and second pixel circuits 10a and 10b may be changed in a form other than those described above.

Figure 10:
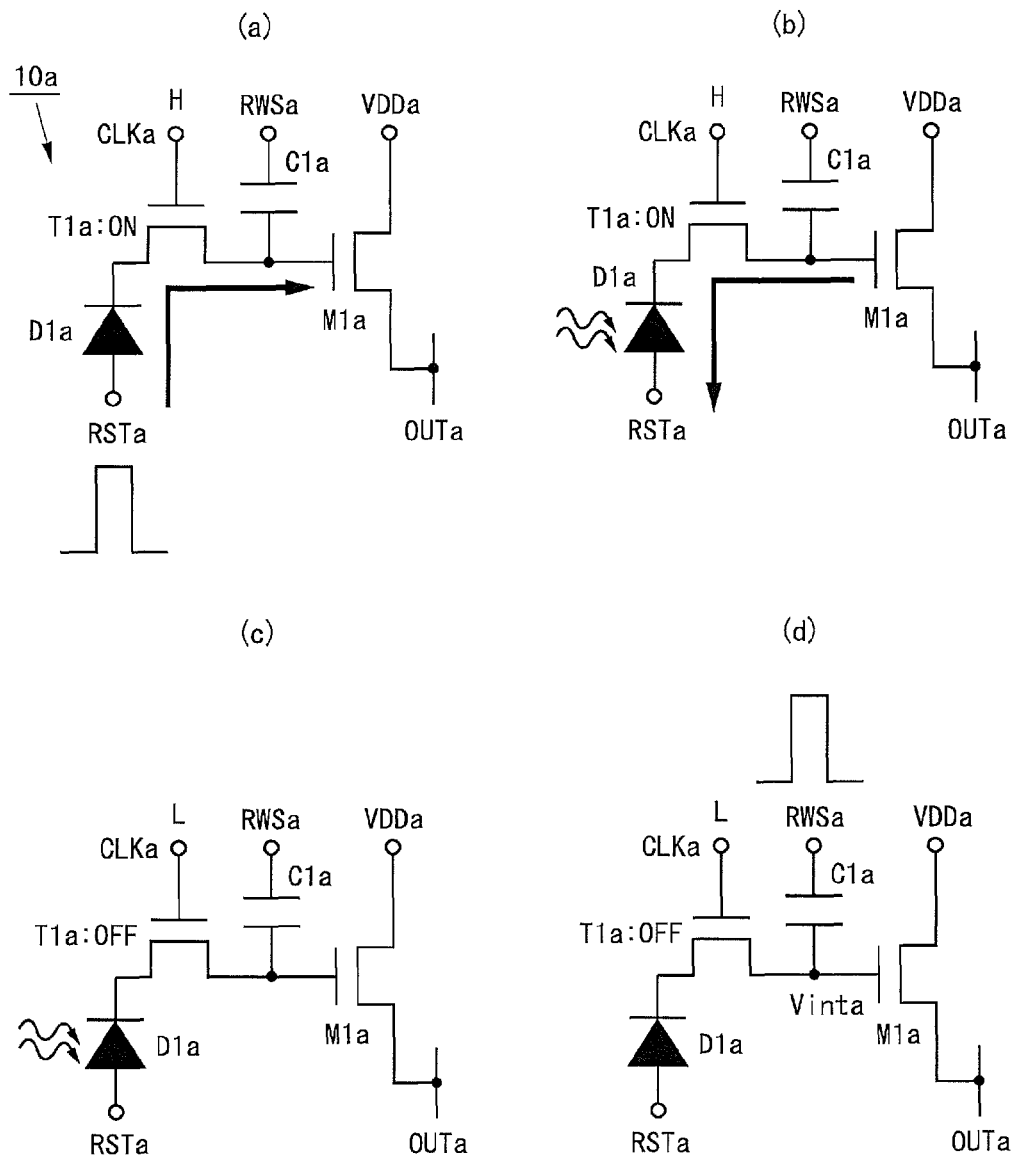
FIG. 10 is a diagram showing operations of the sensor pixel circuit shown in FIG. 8.

FIG. 10 is a diagram showing operations of the first pixel circuit 10a in the case of performing one-time drive. In the case of performing the one-time drive, the first pixel circuit 10a performs (a) reset, (b) accumulation, (c) retention, and (d) read, in a one-frame period.

Figure 11:
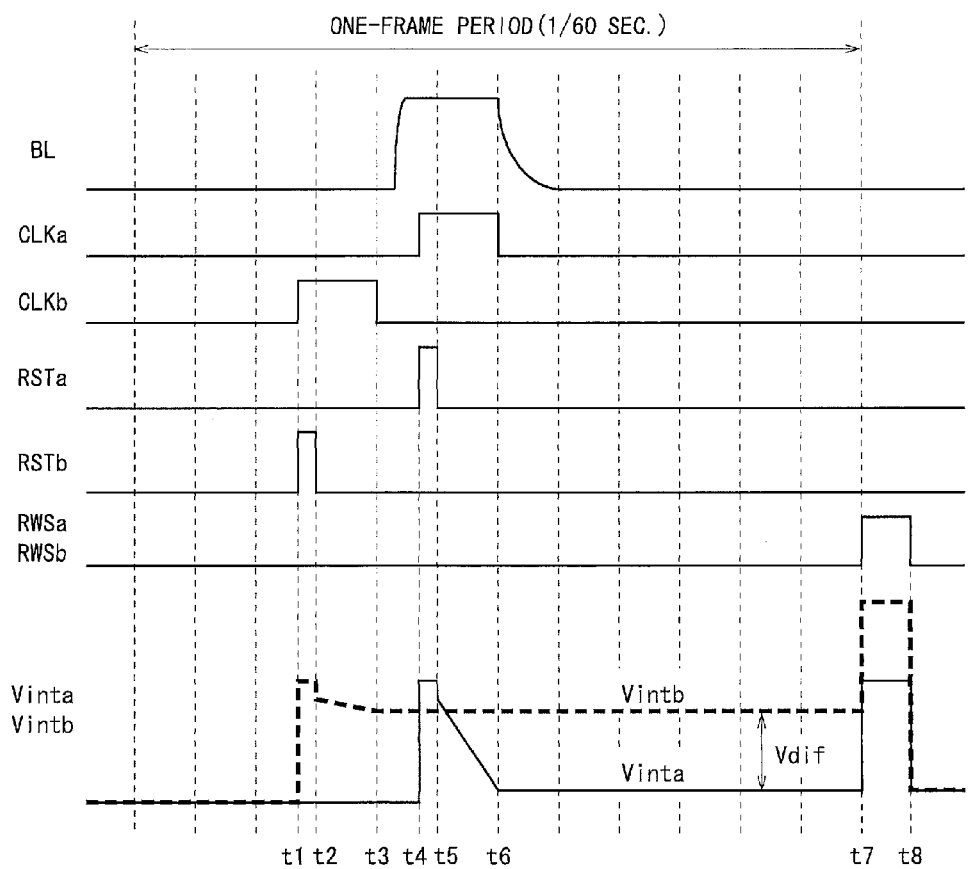
FIG. 11 is a signal waveform diagram of the sensor pixel circuits shown in FIG. 8.

FIG. 11 is a signal waveform diagram of the first pixel circuit 10a and the second pixel circuit 10b in the case of performing the one-time drive. In FIG. 11, BL represents a brightness of the backlight 3, Vinta represents a potential at the accumulation node in the first pixel circuit 10a (a gate potential at the transistor M1a), and Vintb represents a potential at the accumulation node in the second pixel circuit 10b (a gate potential at the transistor M1b). With regard to the first pixel circuit 10a, a reset period corresponds to a range from a time t4 to a time t5, an accumulation period corresponds to a range from the time t5 to a time t6, a retention period corresponds to a range from the time t6 to a time t7, and a read period corresponds to a range from the time t7 to a time t8. With regard to the second pixel circuit 10b, the reset period corresponds to a range from a time t1 to a time t2, the accumulation period corresponds to a range from the time t2 to a time t3, the retention period corresponds to a range from the time t3 to the time t7, and the read period corresponds to a range from the time t7 to the time t8.

In the reset period of the first pixel circuit 10a, a clock signal CLKa turns to a HIGH level, a read signal RWSa turns to a LOW level, and a reset signal RSTa turns to a HIGH level for reset. Herein, the transistor T1a turns on. Accordingly, a current (a forward current in the photodiode D1a) flows from the reset line RSTa into the accumulation node via the photodiode D1a and the transistor T1a (FIG. 10 (a)), and the potential Vinta is reset to a predetermined level.

In the accumulation period of the first pixel circuit 10a, the clock signal CLKa turns to the HIGH level, and the reset signal RSTa and the read signal RWSa turn to the LOW level. Herein, the transistor T1a turns on. Herein, when light is incident on the photodiode D1a, a current (a photocurrent in the photodiode D1a) flows from the accumulation node into the reset line RSTa via the transistor T1a and the photodiode D1a, and charge is pulled out of the accumulation node (FIG. 10 (b)). Accordingly, the potential Vinta drops in accordance with an amount of light to be incident during the period that the clock signal CLKa is in the HIGH level (a turn-on period of the backlight 3).

In the retention period of the first pixel circuit 10a, the clock signal CLKa, the reset signal RSTa and the read signal RWSa turn to the LOW level. Herein, the transistor T1a turns off. Herein, even when light is incident on the photodiode D1a, the transistor T1a is in the OFF state, and the photodiode D1a is disconnected electrically from the gate of the transistor M1, so that the potential Vinta does not change (FIG. 10 (c)).

In the read period of the first pixel circuit 10a, the clock signal CLKa and the reset signal RSTa turn to the LOW level, and the read signal RWSa turns to a HIGH level for read. Herein, the transistor T1a turns off. Herein, the potential Vinta rises by an amount which is (Cqa/Cpa) times (Cpa: a capacitance value of the entire first pixel circuit 10a, Cqa: a capacitance value of the capacitor C1a) as large as a rise amount of the potential at the read signal RWSa. The transistor M1a constitutes a source follower amplification circuit having, as a load, a transistor (not shown) included in the source driver circuit 6, and drives the output line OUTa in accordance with the potential Vinta (FIG. 10 (d)).

The second pixel circuit 10b operates as in the first pixel circuit 10a. The potential Vintb is reset to a predetermined level in the reset period, drops in accordance with an amount of light to be incident during the period that the clock signal CLKb is in the HIGH level (a turn-off period of the backlight 3) in the accumulation period, and does not change in the retention period. In the read period, the potential Vintb rises by an amount which is (Cqb/Cpb) times (Cpb: a capacitance value of the entire second pixel circuit 10b, Cqb: a capacitance value of the capacitor C1b) as large as a rise amount of the potential at the read signal RWSb, and the transistor M1b drives the output line OUTb in accordance with the potential Vintb.

As described above, the first pixel circuit 10a according to this embodiment includes the one photodiode D1a (optical sensor), the one accumulation node which accumulates the charge corresponding to the amount of sensed light, the transistor M1a (read transistor) which has the control terminal connected to the accumulation node, and the transistor T1a (retention switching element) which is provided on the path for the current flowing through the photodiode D1a and turns on or off in accordance with the clock signal CLK. The transistor T1a is provided between the accumulation node and one of the ends of the photodiode D1a, and the other end of the photodiode D1a is connected to the reset line RSTa. The transistor T1a turns on during the sensing period when the backlight is turned on, in accordance with the clock signal CLKa. The second pixel circuit 10b has the configuration which is similar to that of the first pixel circuit 10a, and the transistor T1b included in the second pixel circuit 10b turns on during the sensing period when the backlight is turned off.

As described above, the transistor T1a that turns on during the sensing period when the backlight is turned on is provided on the path for the current flowing through the photodiode D1a, and the transistor T1b that turns on during the sensing period when the backlight is turned off is provided on the path for the current flowing through the photodiode D1b. Thus, it is possible to constitute the first pixel circuit 10a that senses light during the sensing period when the backlight is turned on and retains the amount of sensed light otherwise, and the second pixel circuit 10b that senses light during the sensing period when the backlight is turned off and retains the amount of sensed light otherwise.

Accordingly, it is possible to detect the amount of light when the backlight is turned on and the amount of light when the backlight is turned off separately by use of the first and second pixel circuits 10a and 10b, and to obtain the difference between the two amounts of light at the outside of the pixel circuit. Thus, it is possible to give an input function which does not depend on light environments. Moreover, as compared with the case of detecting two types of amounts of light sequentially by use of one sensor pixel circuit, it is possible to reduce a frequency of the read from the sensor pixel circuits, to retard the read speed, and to reduce power consumption in the device. Moreover, the operation of sensing light when the backlight is turned on and the operation of sensing light when the backlight is turned are performed off once, respectively, in the one-frame period. Therefore, it is possible to increase the degree of freedom for setting the turn-on and turn-off timings of the backlight as well as the reset and read timings of the sensor pixel circuits. Moreover, by setting the sensing period when the backlight is turned on and the sensing period when the backlight is turned off in proximity to each other, it is possible eliminate a deviation between the sensing period when the backlight is turned on and the sensing period when the backlight is turned off, and to prevent followability to motion input from varying in accordance with a direction of the input. Moreover, by obtaining a difference between dark currents at the outside of the sensor pixel circuit, it is possible to perform temperature compensation.

Moreover, the first and second pixel circuits 10a and 10b further include capacitors C1a and C1b which are provided between the accumulation nodes and the read lines RWSa and RWSb, respectively. Accordingly, by applying a potential for read to the read lines RWSa and RWSb, it is possible to change the potentials at the accumulation nodes, and to read signals corresponding to the amounts of sensed light from the first and second pixel circuits 10a and 10b.

Moreover, the display panel 4 further includes the plurality of output lines OUT1 to OUTm for propagating output signals from the first and second pixel circuits 10a and 10b, and the first pixel circuit 10a and the second pixel circuit 10b are connected to the different output lines depending on the type. Accordingly, by performing the read from the first and second pixel circuits 10a and 10b in parallel, it is possible to retard the read speed, and to reduce power consumption in the device. Moreover, the source driver circuit 6 includes a difference circuit which obtains a difference between the output signal from the first pixel circuit 10a and the output signal from the second pixel circuit 10b. Accordingly, it is possible to immediately obtain the difference between the two types of amounts of light read in parallel, and to eliminate the need for a memory which is required in the case of sequentially detecting the two types of amounts of light and is used for storing the amount of light sensed firstly.

Second Embodiment

Figure 12:
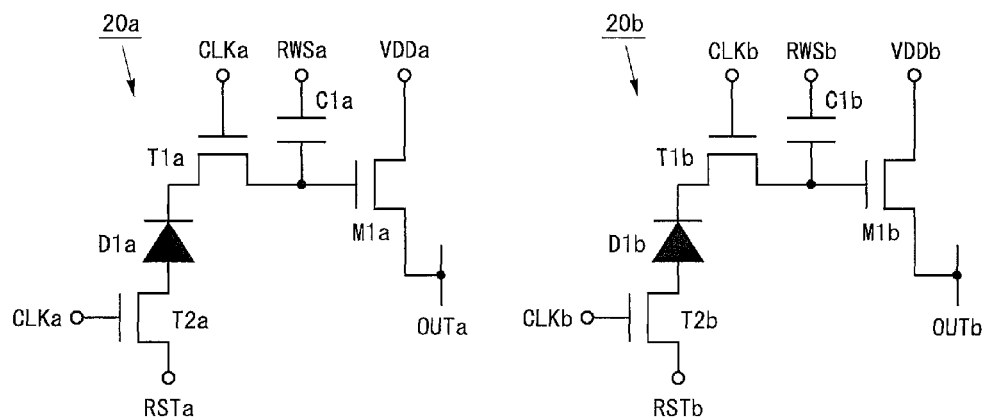
FIG. 12 is a circuit diagram of sensor pixel circuits according to a second embodiment of the present invention.

FIG. 12 is a circuit diagram of pixel circuits according to a second embodiment of the present invention. As shown in FIG. 12, a first pixel circuit 20a includes transistors T1a, T2a and M1a, a photodiode D1a, and a capacitor C1a. A second pixel circuit 20b includes transistors T1b, T2b and M1b, a photodiode D1b, and a capacitor C1b. Each of the transistors T1a, T2a, M1a, T1b, T2b and M1b is an N-type TFT.

Figure 13:
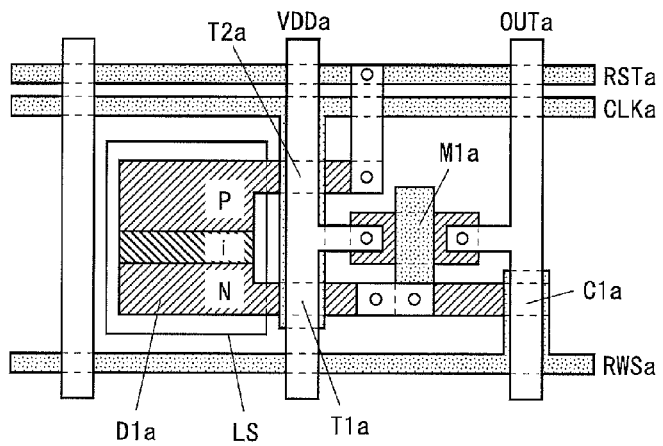
FIG. 13 is a layout diagram of the sensor pixel circuit shown in FIG. 12.

With regard to the first pixel circuit 20a, gates of the transistors T1a and T2a are connected to a clock line CLKa. In the transistor T2a, a source is connected to a reset line RSTa, and a drain is connected to an anode of the photodiode D1a. A cathode of the photodiode D1a is connected to a source of the transistor T1a. A drain of the transistor T1a is connected to a gate of the transistor M1a. In the transistor M1a, a drain is connected to a power supply line VDDa, and a source is connected to an output line OUTa. The capacitor C1a is provided between the gate of the transistor M1a and a read line RWSa. In the first pixel circuit 20a, a node connected to the gate of the transistor M1a serves as an accumulation node, and the transistor M1a functions as a read transistor. The second pixel circuit 20b has a configuration which is similar to that of the first pixel circuit 20a. FIG. 13 is a layout diagram of the first pixel circuit 20a. The description about FIG. 13 is similar to that in the first embodiment.

Figure 14:
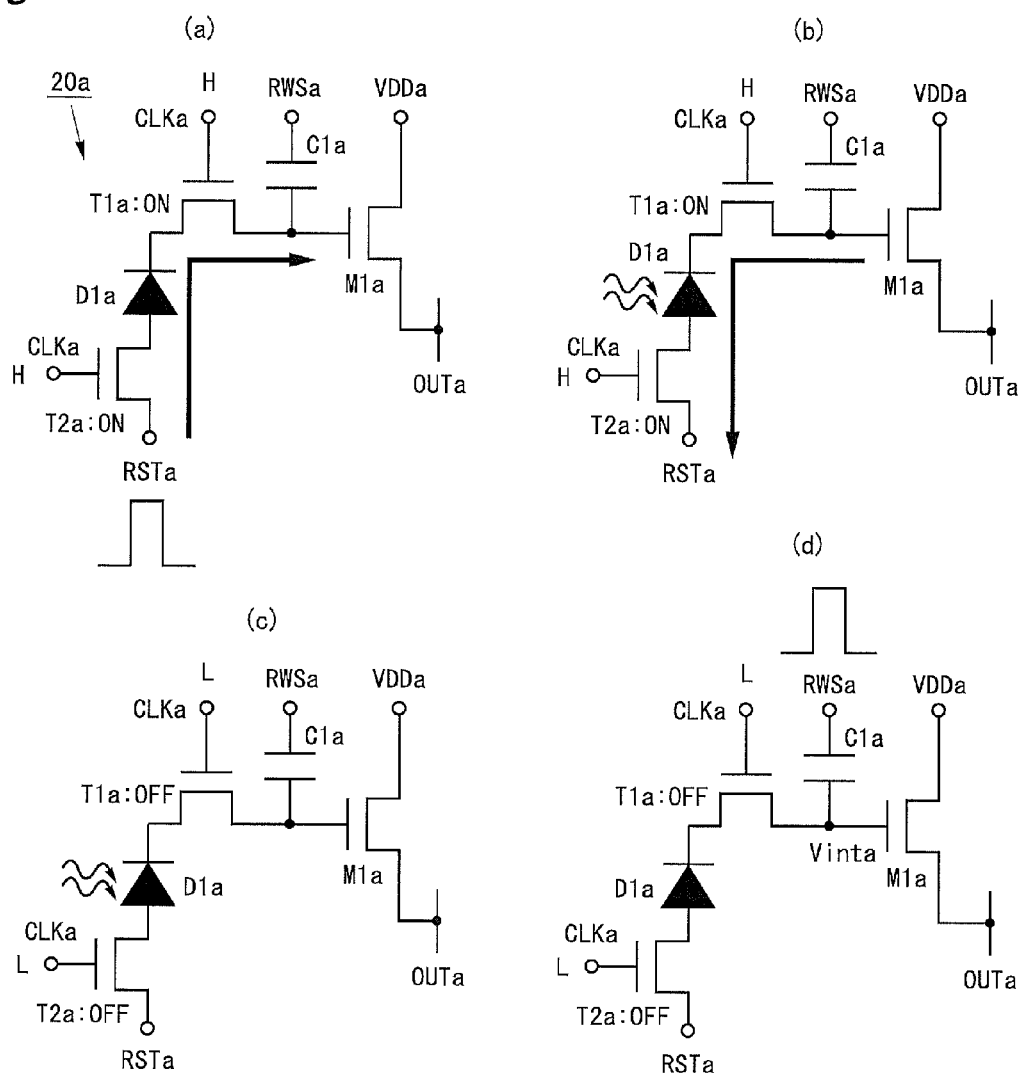
FIG. 14 is a diagram showing operations of the sensor pixel circuit shown in FIG. 12.

FIG. 14 is a diagram showing operations of the first pixel circuit 20a in the case of performing one-time drive. In the case of performing the one-time drive, the first pixel circuit 20a performs (a) reset, (b) accumulation, (c) retention, and (d) read, in a one-frame period. A signal waveform diagram of the first and second pixel circuits 20a and 20b in the case of performing the one-time drive is equal to that in the first embodiment (FIG. 11). The first pixel circuit 20a operates as in the first pixel circuit 10a according to the first embodiment, except that the transistor T2a turns on or off at a timing which is equal to that of the transistor T1a. Similar things hold true for the second pixel circuit 20b.

As described above, the first pixel circuit 20a according to this embodiment includes the one photodiode D1a (optical sensor), the one accumulation node which accumulates charge corresponding to an amount of sensed light, the transistor M1a (read transistor) which has the control terminal connected to the accumulation node, and the transistors T1a and T2a (two retention switching elements). The transistor T1a is provided between the accumulation node and one of the ends of the photodiode D1a, and the transistor T2a is provided between the reset line RSTa and the other end of the photodiode D1a. The transistors T1a and T2a turn on during a sensing period when a backlight is turned on, in accordance with a clock signal CLKa. The second pixel circuit 20b has the configuration which is similar to that of the first pixel circuit 20a, and the transistors T1b and T2b included in the second pixel circuit 20b turn on during a sensing period when the backlight is turned off.

As described above, the transistors T1a and T2a that turn on during the sensing period when the backlight is turned on are provided on the two sides of the photodiode D1a, and the transistors T1b and T2b that turn on during the sensing period when the backlight is turned off are provided on the two sides of the photodiode D1b. Thus, it is possible to constitute the first pixel circuit 20a that senses light during the sensing period when the backlight is turned on and retains the amount of sensed light otherwise, and the second pixel circuit 20b that senses light during the sensing period when the backlight is turned off and retains an amount of sensed light otherwise. Thus, it is possible to attain effects which are similar to those in the first embodiment.

Moreover, in the first pixel circuit 20a, the transistor T2a provided between the photodiode D1a and the reset line RSTa turns off during the period other than the sensing period when the backlight is turned on. Therefore, it becomes possible to reduce a variation in a cathode potential at the photodiode D1a because of a current flowing through the photodiode D1a, and to reduce a difference between potentials to be applied to the two ends of the transistor T1a. Thus, it is possible to reduce a leakage current flowing through the transistor T1a, to prevent a variation of a potential at the accumulation node, and to enhance detection accuracy. Also in the second pixel circuit 20b, it is possible to attain similar effects.

Third Embodiment

Figure 15:
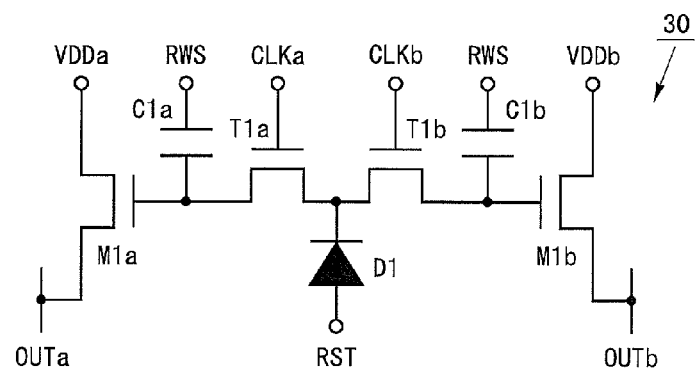
FIG. 15 is a circuit diagram of a sensor pixel circuit according to a third embodiment of the present invention.

FIG. 15 is a circuit diagram of a pixel circuit according to a third embodiment of the present invention. A pixel circuit 30 shown in FIG. 15 includes transistors T1a, T1b, M1a and M1b, a photodiode D1, and capacitors C1a and C1b. Each of the transistors T1a, T1b, M1a and M1b is an N-type TFT. In FIG. 15, the left half corresponds to a first pixel circuit and the right half corresponds to a second pixel circuit. The pixel circuit 30 is connected to clock lines CLKa and CLKb, a reset line RST, a read line RWS, power supply lines VDDa and VDDb, and output lines OUTa and OUTb.

Figure 16:
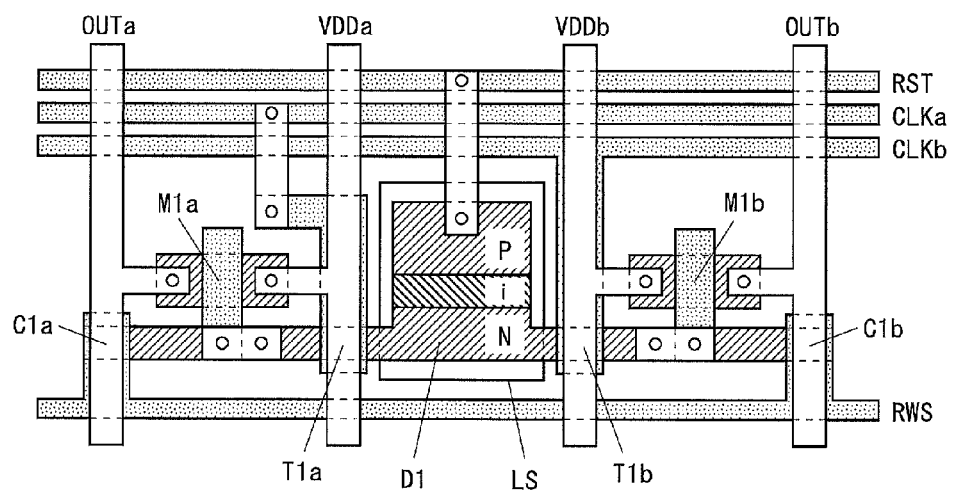
FIG. 16 is a layout diagram of the sensor pixel circuit shown in FIG. 15.

As shown in FIG. 15, in the photodiode D1, an anode is connected to the reset line RST, and a cathode is connected to sources of the transistors T1a and T1b. In the transistor T1a, a gate is connected to the clock line CLKa, and a drain is connected to a gate of the transistor M1a. In the transistor M1a, a drain is connected to the power supply line VDDa, and a source is connected to the output line OUTa. The capacitor C1a is provided between the gate of the transistor M1a and the read line RWS. In the transistor T1b, a gate is connected to the clock line CLKb and a drain is connected to a gate of the transistor M1b. In the transistor M1b, a drain is connected to the power supply line VDDb, and a source is connected to the output line OUTb. The capacitor C1b is provided between the gate of the transistor M1b and the read line RWS. In the pixel circuit 30, a node connected to the gate of the transistor M1a serves as a first accumulation node, a node connected to the gate of the transistor M1b serves as a second accumulation node, and each of the transistors M1a and M1b functions as a read transistor. FIG. 16 is a layout diagram of the pixel circuit 30. The description about FIG. 16 is equal to that in the first embodiment.

Figure 17:
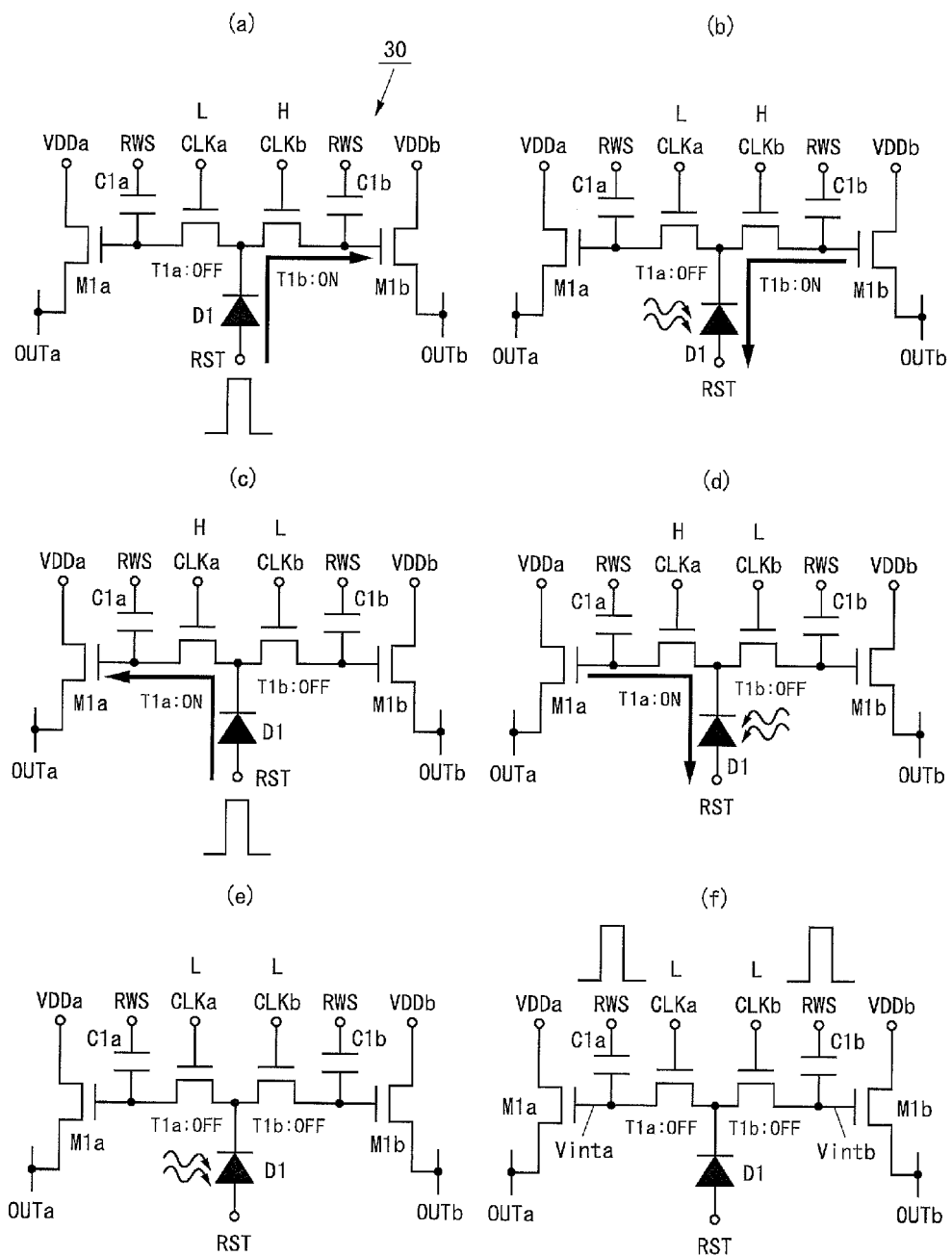
FIG. 17 is a diagram showing operations of the sensor pixel circuit shown in FIG. 15.

FIG. 17 is a diagram showing operations of the pixel circuit 30 in the case of performing one-time drive. In the case of performing the one-time drive, the pixel circuit 30 performs (a) reset when a backlight is turned off, (b) accumulation when the backlight is turned off, (c) reset when the backlight is turned on, (d) accumulation when the backlight is turned on, (e) retention, and (f) read, in a one-frame period.

Figure 18:
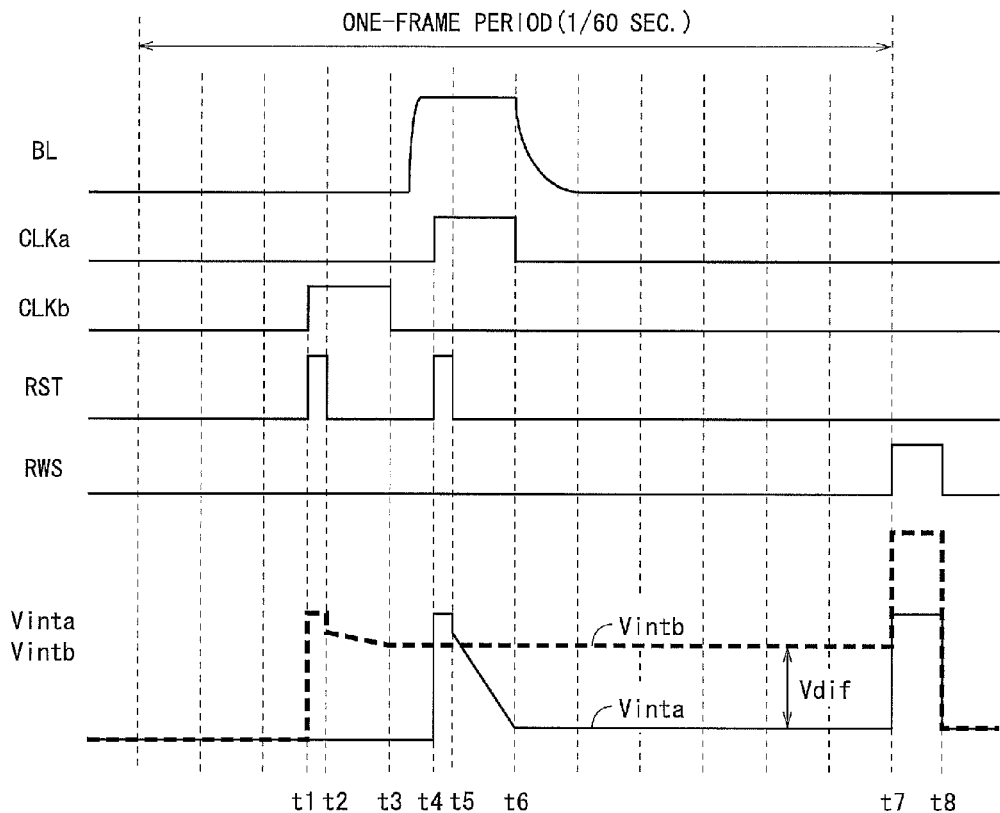
FIG. 18 is a signal waveform diagram of the sensor pixel circuit shown in FIG. 15.

FIG. 18 is a signal waveform diagram of the pixel circuit 30 in the case of performing the one-time drive. In FIG. 18, Vinta represents a potential at the first accumulation node (a gate potential at the transistor M1a), and Vintb represents a potential at the second accumulation node (a gate potential at the transistor M1b). In FIG. 18, a reset period when the backlight is turned off corresponds to a range from a time t1 to a time t2, an accumulation period when the backlight is turned off corresponds to a range from the time t2 to a time t3, a reset period when the backlight is turned on corresponds to a range from a time t4 to a time t5, an accumulation period when the backlight is turned on corresponds to a range from the time t5 to a time t6, retention periods correspond to a range from the time t3 to the time t4 and a range from the time t6 to a time t7, and a read period corresponds to a range from the time t7 to a time t8.

In the reset period when the backlight is turned off, a clock signal CLKb turns to a HIGH level, a clock signal CLKa and a read signal RWS turn to a LOW level, and a reset signal RST turns to a HIGH level for reset. Herein, the transistor T1a turns off, and the transistor T1b turns on. Accordingly, a current (a forward current in the photodiode D1) flows from the reset line RST into the second accumulation node via the photodiode D1 and the transistor T1b (FIG. 17 (a)), and the potential Vintb is reset to a predetermined level.

In the accumulation period when the backlight is turned off, the clock signal CLKb turns to the HIGH level, and the clock signal CLKa, the reset signal RST and the read signal RWS turn to the LOW level. Herein, the transistor T1a turns off, and the transistor T1b turns on. Herein, when light is incident on the photodiode D1, a current (a photocurrent in the photodiode D1) flows from the second accumulation node into the reset line RST via the transistor T1b and the photodiode D1, and charge is pulled out of the second accumulation node (FIG. 17 (b)). Accordingly, the potential Vintb drops in accordance with an amount of light to be incident during this period (a turn-off period of the backlight 3). It is to be noted that the potential Vinta does not change during this period.

In the reset period when the backlight is turned on, the clock signal CLKa turns to the HIGH level, the clock signal CLKb and the read signal RWS turn to the LOW level, and the reset signal RST turns to a HIGH level for reset. Herein, the transistor T1a turns on, and the transistor T1b turns off. Accordingly, a current (a forward current in the photodiode D1) flows from the reset line RST into the first accumulation node via the photodiode D1 and the transistor T1a (FIG. 17 (c)), and the potential Vinta is reset to a predetermined level.

In the accumulation period when the backlight is turned on, the clock signal CLKa turns to the HIGH level, and the clock signal CLKb, the reset signal RST and the read signal RWS turn to the LOW level. Herein, the transistor T1a turns on, and the transistor T1b turns off. Herein, when light is incident on the photodiode D1, a current (a photocurrent in the photodiode D1) flows from the first accumulation node into the reset line RST via the transistor T1a and the photodiode D1, and charge is pulled out of the first accumulation node (FIG. 17 (d)). Accordingly, the potential Vinta drops in accordance with an amount of light to be incident during this period (a turn-on period of the backlight 3). It is to be noted that the potential Vintb does not change during this period.

In the retention period, the clock signals CLKa and CLKb, the reset signal RST and the read signal RWS turn to the LOW level. Herein, the transistors T1a and T1b turn off. Herein, even when light is incident on the photodiode D1, the transistors T1a and T1b are in the Off state, and the photodiode D1 is disconnected electrically from the gates of the transistors M1a and M1b, so that the potentials Vinta and Vintb do not change (FIG. 17 (e)).

In the read period, the clock signals CLKa and CLKb and the reset signal RST turn to the LOW level, and the read signal RWS turns to a HIGH level for read. Herein, the transistors T1a and T1b turn off. Herein, the potentials Vinta and Vintb rise by an amount corresponding to a rise amount of a potential at the read signal RWS, a current Ia in an amount corresponding to the potential Vinta flows between the drain and the source of the transistor M1a, and a current Ib in an amount corresponding to the potential Vintb flows between the drain and the source of the transistor M1b (FIG. 17 (f)). The current Ia is input to the source driver circuit 6 via the output line OUTa, and the current Ib is input to the source driver circuit 6 via the output line OUTb.

As described above, the pixel circuit 30 according to this embodiment has the configuration that the first and second pixel circuits 10a and 10b according to the first embodiment share the one photodiode D1 (optical sensor). In the shared photodiode D1, the cathode is connected to the source of the transistor T1a included in the section corresponding to the first pixel circuit and the source of the transistor T1b included in the section corresponding to the second pixel circuit.

According to the pixel circuit 30, as in the first and second pixel circuits 10a and 10b according to the first embodiment, it is possible to detect the amount of light when the backlight is turned on and the amount of light when the backlight is turned off. Thus, it is possible to attain effects which are similar to those in the first embodiment. Moreover, by causing the two types of pixel circuits share the one photodiode D1, it is possible to cancel an influence of a variation in sensitivity characteristics of a photodiode, and to accurately obtain a difference between the amount of light when the backlight is turned on and the amount of light when the backlight is turned off. Moreover, it is possible to reduce the number of photodiodes, to increase an aperture ratio, and to enhance the sensitivity of the sensor pixel circuit.

Fourth Embodiment

Figure 19:
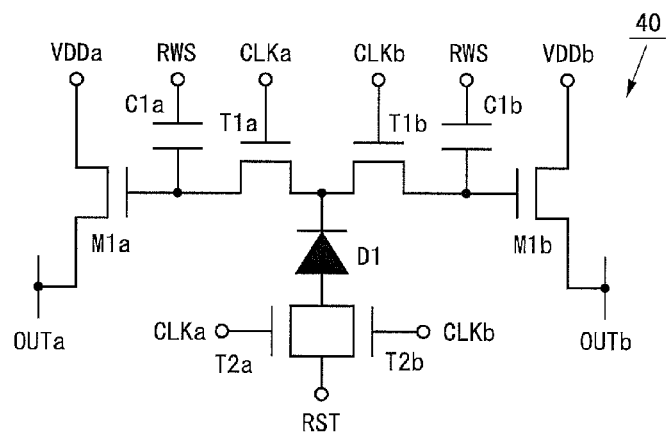
FIG. 19 is a circuit diagram of a sensor pixel circuit according to a fourth embodiment of the present invention.

FIG. 19 is a circuit diagram of a pixel circuit according to a fourth embodiment of the present invention. A pixel circuit 40 shown in FIG. 19 includes transistors T1a, T1b, T2a, T2a, M1a and M1b, a photodiode D1, and capacitors C1a and C1b. Each of the transistors T1a, T1b, T2a, T2b, M1a and M1b is an N-type TFT. In FIG. 19, the left half corresponds to a first pixel circuit and the right half corresponds to a second pixel circuit. The pixel circuit 40 is connected to clock lines CLKa and CLKb, a reset line RST, a read line RWS, power supply lines VDDa and VDDb, and output lines OUTa and OUTb.

As shown in FIG. 19, gates of the transistors T1a and T2a are connected to the clock line CLKa, and gates of the transistors T2a and T2b are connected to the clock line CLKb. In the transistors T2a and T2b, sources are connected to the reset line RST and drains are connected to an anode of the photodiode D1. A cathode of the photodiode D1 is connected to sources of the transistors T1a and T1b. In the transistor T1a, the gate is connected to the clock line CLKa, and a drain is connected to a gate of the transistor M1a. In the transistor M1a, a drain is connected to the power supply line VDDa, and a source is connected to the output line OUTa. The capacitor C1a is provided between the gate of the transistor M1a and the read line RWS. In the transistor T1b, a gate is connected to the clock line CLKb, and a drain is connected to a gate of the transistor M1b. In the transistor M1b, a drain is connected to the power supply line VDDb, and a source is connected to the output line OUTb. The capacitor C1b is provided between the gate of the transistor M1b and the read line RWS. In the pixel circuit 40, a node connected to the gate of the transistor M1a serves as a first accumulation node, a node connected to the gate of the transistor M1b serves as a second accumulation node, and each of the transistors M1a and M1b functions as a read transistor.

Figure 20:
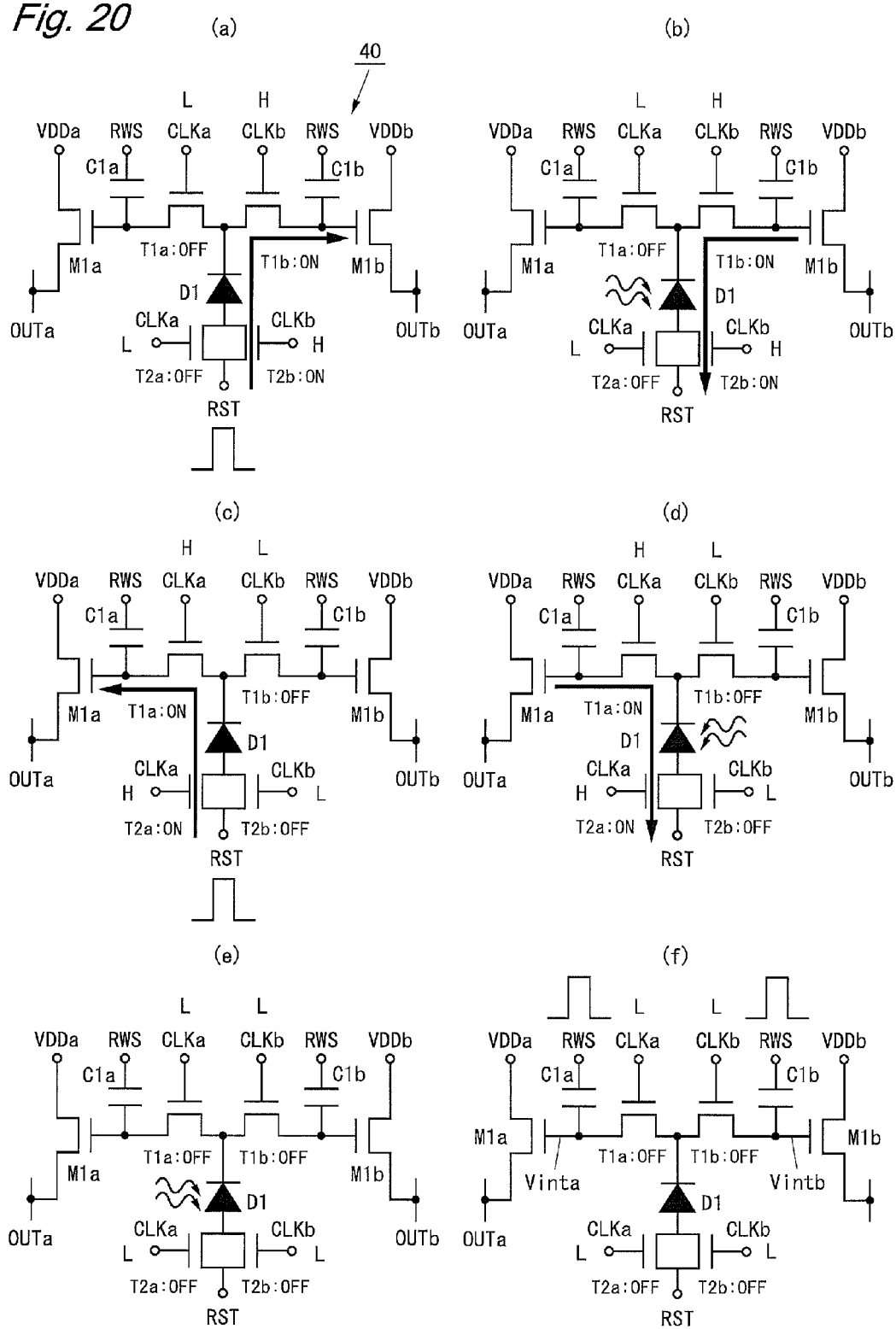
FIG. 20 is a diagram showing operations of the sensor pixel circuit shown in FIG. 19.

FIG. 20 is a diagram showing operations of the pixel circuit 40 in the case of performing one-time drive. In the case of performing the one-time drive, the pixel circuit 40 performs (a) reset when a backlight is turned off, (b) accumulation when the backlight is turned off, (c) reset when the backlight is turned on, (d) accumulation when the backlight is turned on, (e) retention, and (f) read, in a one-frame period. A signal waveform diagram of the pixel circuit 40 in the case of performing the one-time drive is equal to that in the third embodiment (FIG. 18). The pixel circuit 40 operates as in the pixel circuit 30 according to the third embodiment, except that the transistors T2a and T2b turn on or off at a timing which is equal to that of the transistors T1a and T2a, respectively.

As described above, the pixel circuit 40 according to this embodiment has the configuration that the first and second pixel circuits 20a and 20b according to the second embodiment share the one photodiode D1 (optical sensor). In the shared photodiode D1, the cathode is connected to the source of the transistor T1a included in the section corresponding to the first pixel circuit and the source of the transistor T1b included in the section corresponding to the second pixel circuit. The anode of the photodiode D1 is connected to the drain of the transistor T2a included in the section corresponding to the first pixel circuit and the drain of the transistor T2b included in the section corresponding to the second pixel circuit.

According to the pixel circuit 40, as in the first and second pixel circuits 20a and 20b according to the second embodiment, it is possible to detect an amount of light when the backlight is turned on and an amount of light when the backlight is turned off. Thus, it is possible to attain effects which are similar to those in the first embodiment. Moreover, as in the second embodiment, it is possible to reduce leakage currents flowing through the transistors T1a and T1b, to prevent variations of potentials at the first and second accumulation nodes, and to enhance detection accuracy. Moreover, by causing the two types of pixel circuits share the one photodiode D1, it is possible to cancel an influence of a variation in sensitivity characteristics of the photodiode, and to accurately obtain a difference between the amount of light when the backlight is turned on and the amount of light when the backlight is turned off. Moreover, it is possible to reduce the number of photodiodes, to increase an aperture ratio, and to enhance the sensitivity of the sensor pixel circuit.

Fifth Embodiment

Figure 21:
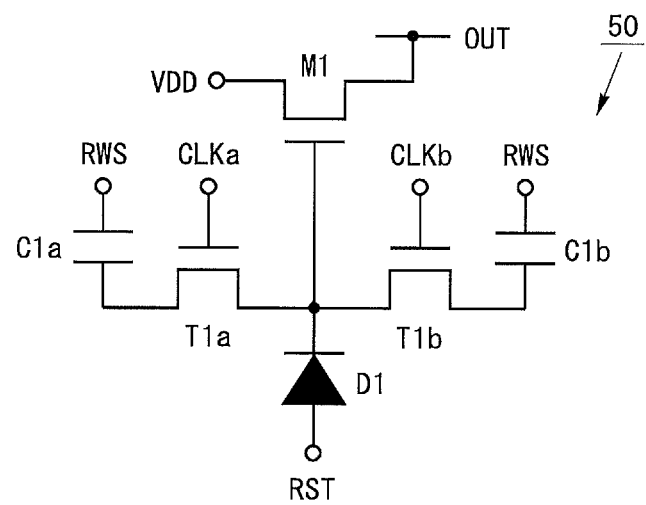
FIG. 21 is a circuit diagram of a sensor pixel circuit according to a fifth embodiment of the present invention.

FIG. 21 is a circuit diagram of a pixel circuit according to a fifth embodiment of the present invention. A pixel circuit 50 shown in FIG. 21 includes transistors T1*a*, T1*b* and M1, a photodiode D1, and capacitors C1*a* and C1*b*. Each of the transistors T1*a*, T1*b* and M1 is an N-type TFT. In FIG. 21, the left half corresponds to a first pixel circuit and the right half corresponds to a second pixel circuit. The pixel circuit 50 is connected to clock lines CLKa and CLKb, a reset line RST, a read line RWS, a power supply line VDD, and an output line OUT.

As shown in FIG. 21, in the photodiode D1, an anode is connected to the reset line RST, and a cathode is connected to sources of the transistors T1*a* and T1*b* and a gate of the transistor M1. A gate of the transistor T1*a* is connected to the clock line CLKa, and a gate of the transistor T1*b* is connected to the clock line CLKb. The capacitor C1*a* is provided between a drain of the transistor T1*a* and the read line RWS. The capacitor C1*b* is provided between a drain of the transistor T1*b* and the read line RWS. In the transistor M1, a drain is connected to the power supply line VDD, and a source is connected to the output line OUT. In the pixel circuit 50, a node connected to the drain of the transistor T1*a* serves as a first accumulation node, a node connected to the drain of the transistor T1*b* serves as a second accumulation node, and the transistor M1 functions as a read transistor.

Figure 22:
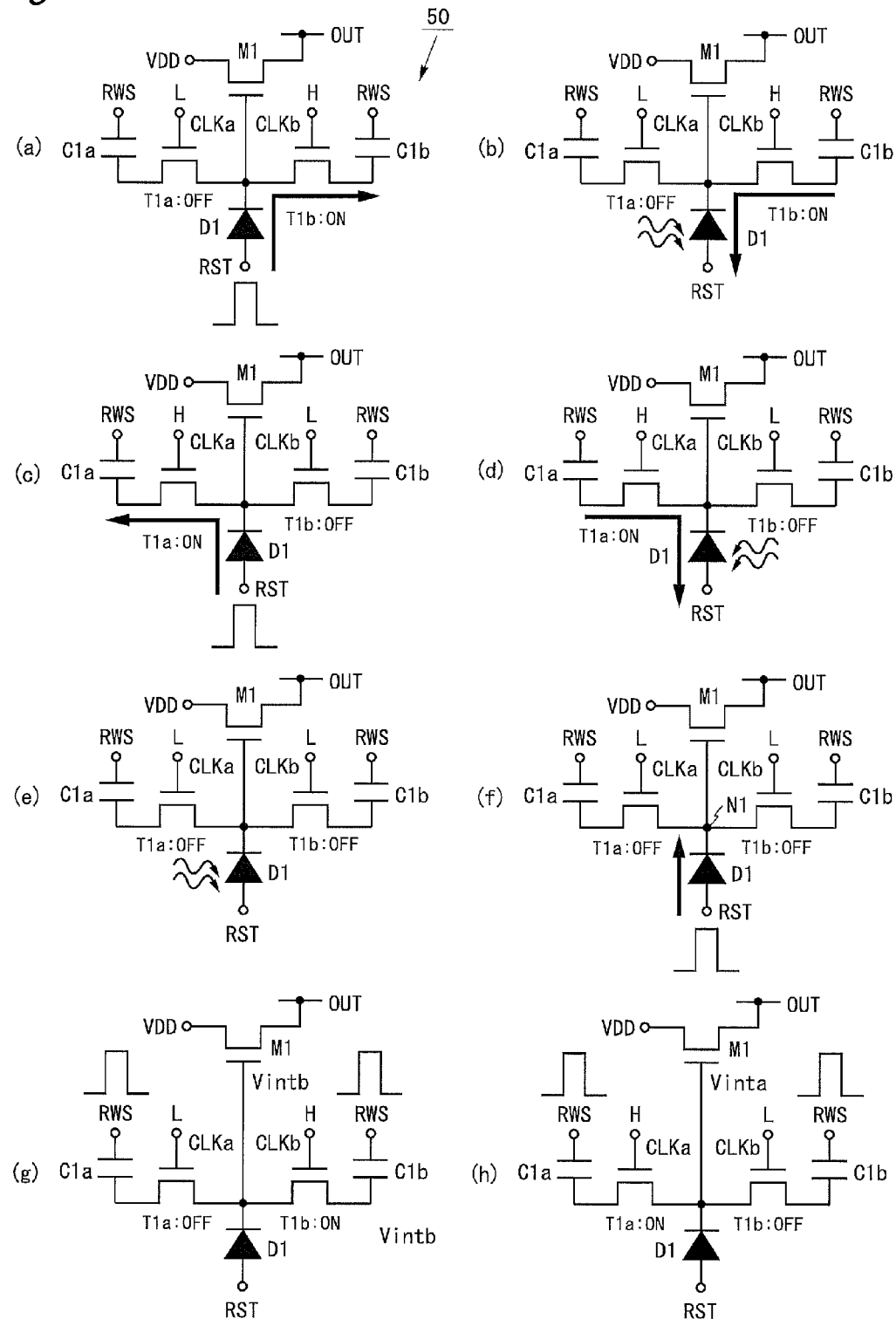
FIG. 22 is a diagram showing operations of the sensor pixel circuit shown in FIG. 21.

FIG. 22 is a diagram showing operations of the pixel circuit 50 in the case of performing one-time drive. In the case of performing the one-time drive, the pixel circuit 50 performs (a) reset when a backlight is turned off, (b) accumulation when the backlight is turned off, (c) reset when the backlight is turned on, (d) accumulation when the backlight is turned on, (e) retention, (f) initialization immediately before read, (g) read of an amount of light when the backlight is turned off, and (h) read of an amount of light when the backlight is turned on, in a one-frame period. The initialization immediately before read is performed twice, that is, before the read of the amount of light when the backlight is turned off and before the read of the amount of light when the backlight is turned on.

Figure 23:
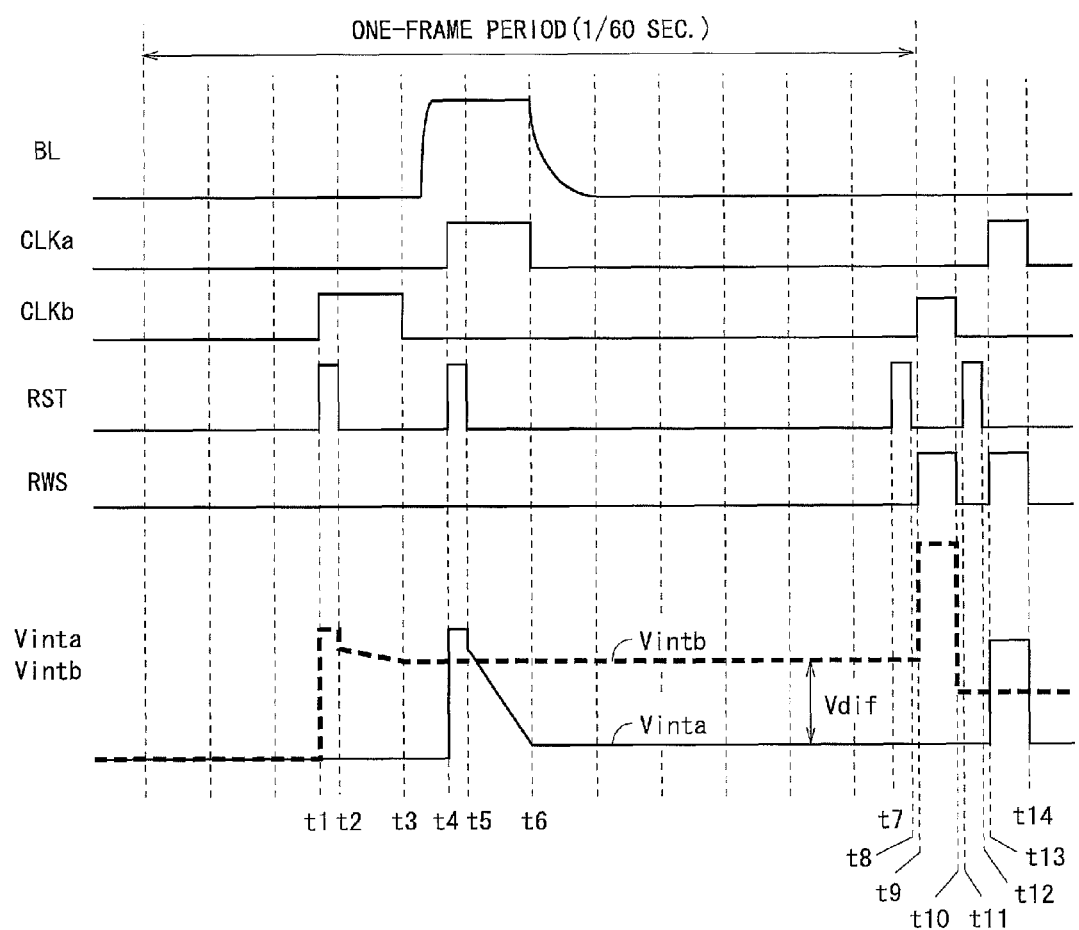
FIG. 23 is a signal waveform diagram of the sensor pixel circuit shown in FIG. 21.

FIG. 23 is a signal waveform diagram of the pixel circuit 50 in the case of performing the one-time drive. In FIG. 23, Vinta represents a potential at the first accumulation node (a drain potential at the transistor T1*a*), and Vintb represents a potential at the second accumulation node (a drain potential at the transistor T1*b*). In FIG. 23, a reset period when the backlight is turned off corresponds to a range from a time t1 to a time t2, an accumulation period when the backlight is turned off corresponds to a range from the time t2 to a time t3, a reset period when the backlight is turned on corresponds to a range from a time t4 to a time t5, an accumulation period when the backlight is turned on corresponds to a range from the time t5 to a time t6, retention periods correspond to a range from the time t3 to the time t4 and a range from the time t6 to a time t7, initialization periods immediately before read correspond to a range from the time t7 to a time t8 and a range from a time t11 to a time t12, a read period for the amount of light when the backlight is turned off corresponds to a range from a time t9 to a time t10, and a read period for the amount of light when the backlight is turned on corresponds to a range from a time t13 to a time t14.

In the reset period when the backlight is turned off, the accumulation period when the backlight is turned off, the reset period when the backlight is turned on, the accumulation period when the backlight is turned on, and the retention period, the pixel circuit 50 operates as in the pixel circuit 30 according to the third embodiment (FIG. 22 (*a*) to (*e*)).

In the initialization period immediately before read, clock signals CLKa and CLKb and a read signal RWS turn to a LOW level, and a reset signal RST turns to a HIGH level for reset. Herein, the transistors T1*a* and T1*b* turn off. Accordingly, a current (a forward current in the photodiode D1) flows from the reset line RST via the photodiode D1 into a node N1 connected to the cathode of the photodiode D1 (FIG. 22 (*f*)), and a potential at the node N1 is reset to a predetermined level.

In the read period for the amount of light when the backlight is turned off, the clock signal CLKb turns to a HIGH level, the clock signal CLKa and the reset signal RST turn to the LOW level, and the read signal RWS turns to a HIGH level for read. Herein, the transistor T1*a* turns off, and the transistor T1*b* turns on. Herein, the potential Vintb rises by an amount which is (Cqb/Cpb) times (Cpb: a capacitance value of the section corresponding to the second pixel circuit, Cqb: a capacitance value of the capacitor C1*b*) as large as a rise amount of a potential at the read signal RWS, and the transistor M1*b* drives the output line OUT in accordance with the potential Vintb (FIG. 22 (*g*)).

In the read period for the amount of light when the backlight is turned on, the clock signal CLKa turns to the HIGH level, the clock signal CLKb and the reset signal RST turn to the LOW level, and the read signal RWS turns to a HIGH level for read. Herein, the transistor T1*a* turns on, and the transistor T1*b* turns off. Herein, the potential Vinta rises by an amount which is (Cqa/Cpa) times (Cpa: a capacitance value of the section corresponding to the first pixel circuit, Cqa: a capacitance value of the capacitor C1*a*) as large as the rise amount of the potential at the read signal RWS, and the transistor M1*a* drives the output line OUT in accordance with the potential Vinta (FIG. 22 (*h*)).

As described above, the pixel circuit 50 according to this embodiment has the configuration that the first and second pixel circuits 10*a* and 10*b* according to the first embodiment share the photodiode D1 and the transistor M1 (read transistor). The gate (control terminal) of the shared transistor M1 is connected to one of the ends of the shared photodiode D1, one of the ends of the transistor T1*a* included in the section corresponding to the first pixel circuit, and one of the ends of the transistor T1*b* included in the section corresponding to the second pixel circuit. As described above, the gate of the transistor M1 is configured to be electrically connectable to the first and second accumulation nodes via the transistors T1*a* and T1*b*.

According to the pixel circuit 50, as in the pixel circuit 30 according to the third embodiment, it is possible to detect the amount of light when the backlight is turned on and the amount of light when the backlight is turned off. Thus, it is possible to attain effects which are similar to those in the first embodiment. Moreover, by causing the two types of pixel circuits share the one photodiode D1, it is possible to attain effects which are similar to those in the third embodiment. Moreover, by causing the two types of pixel circuits share the transistor M1, it is possible to cancel an influence of a variation in threshold value characteristics of the transistor M1, and to accurately obtain a difference between the amount of light when the backlight is turned on and the amount of light when the backlight is turned off.

Sixth Embodiment

Figure 24:
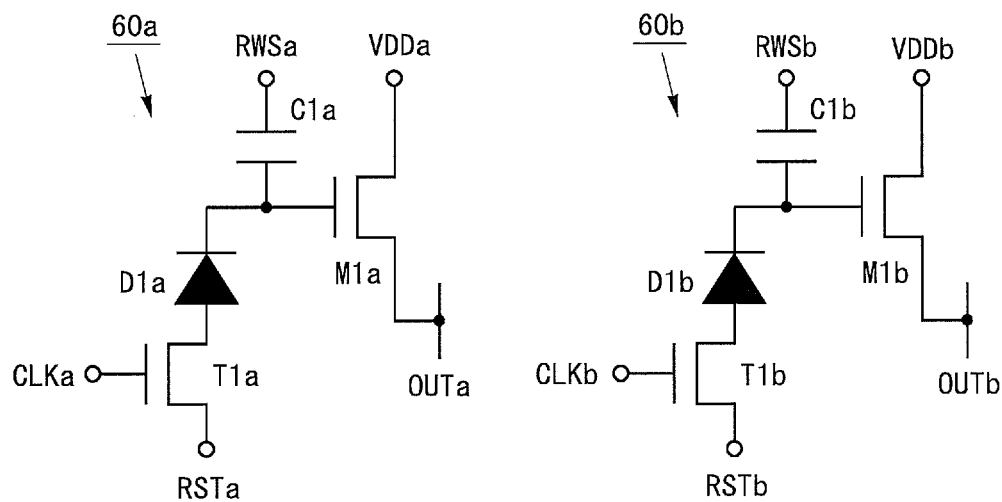
FIG. 24 is a circuit diagram of sensor pixel circuits according to a sixth embodiment of the present invention.

FIG. 24 is a circuit diagram of pixel circuits according to a sixth embodiment of the present invention. As shown in FIG. 24, a first pixel circuit 60a includes transistors T1a and M1a, a photodiode D1a, and a capacitor C1a. A second pixel circuit 60b includes transistors T1b and M1b, a photodiode D1b, and a capacitor C1b. Each of the transistors T1a, M1a, T1b and M1b is an N-type TFT.

Figure 25:
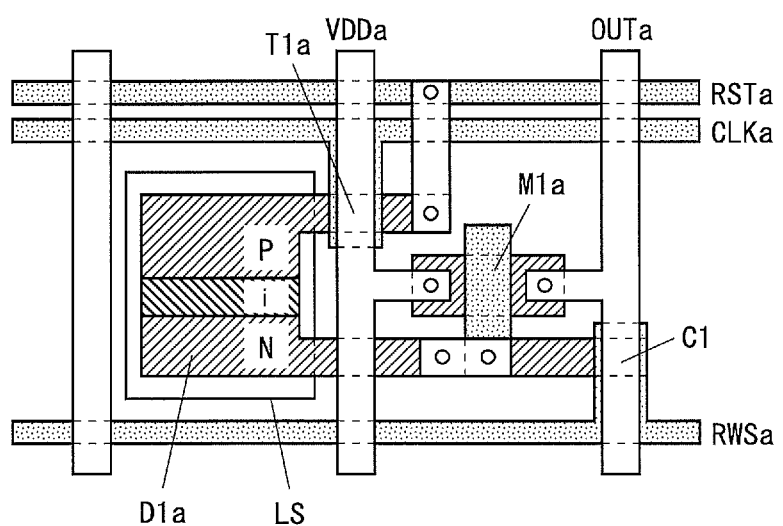
FIG. 25 is a layout diagram of the sensor pixel circuit shown in FIG. 24.

With regard to the first pixel circuit 60a, in the transistor T1a, a source is connected to a reset line RSTa, a gate is connected to a clock line CLKa, and a drain is connected to an anode of the photodiode D1a. A cathode of the photodiode D1a is connected to a gate of the transistor M1a. In the transistor M1a, a drain is connected to a power supply line VDDa, and a source is connected to an output line OUTa. The capacitor C1a is provided between the gate of the transistor M1a and a read line RWSa. In the first pixel circuit 60a, a node connected to the gate of the transistor M1a serves as an accumulation node, and the transistor M1a functions as a read transistor. The second pixel circuit 60b has a configuration which is equal to that of the first pixel circuit 60a. FIG. 25 is a layout diagram of the first pixel circuit 60a. The description about FIG. 25 is equal to that in the first embodiment.

Figure 26:
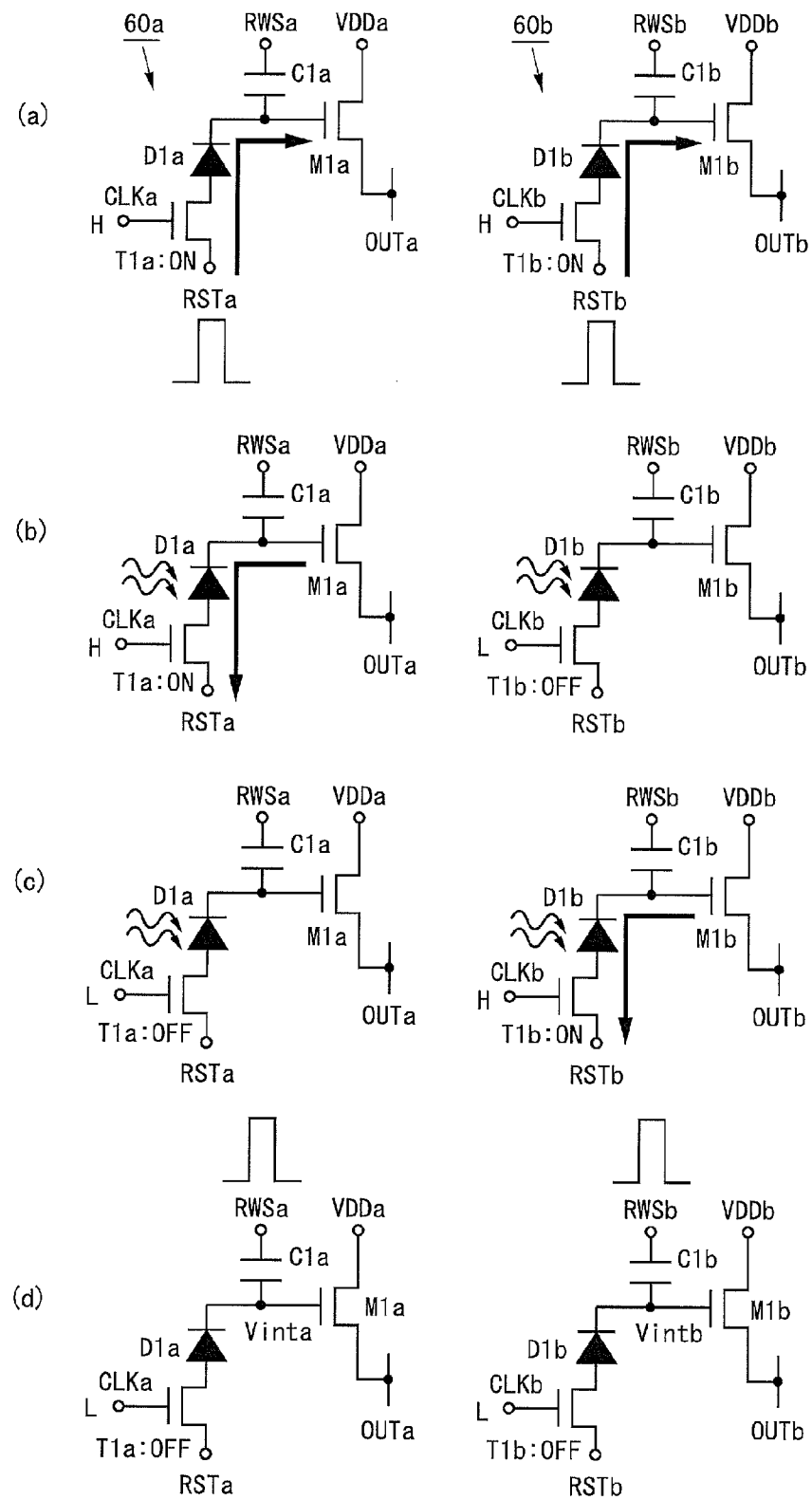
FIG. 26 is a diagram showing operations of the sensor pixel circuits shown in FIG. 24.

FIG. 26 is a diagram showing operations of the first and second pixel circuits 60a and 60b in the case of performing consecutive drive. In the case of performing the consecutive drive, the first and second pixel circuits 60a and 60b perform (a) reset, (b) accumulation and retention when a backlight is turned on, (c) accumulation and retention when the backlight is turned off, and (d) read, in a one-frame period. The accumulation and retention when the backlight is turned on and the accumulation and retention when the backlight is turned off are performed four times, respectively, in the one-frame period.

Figure 27:
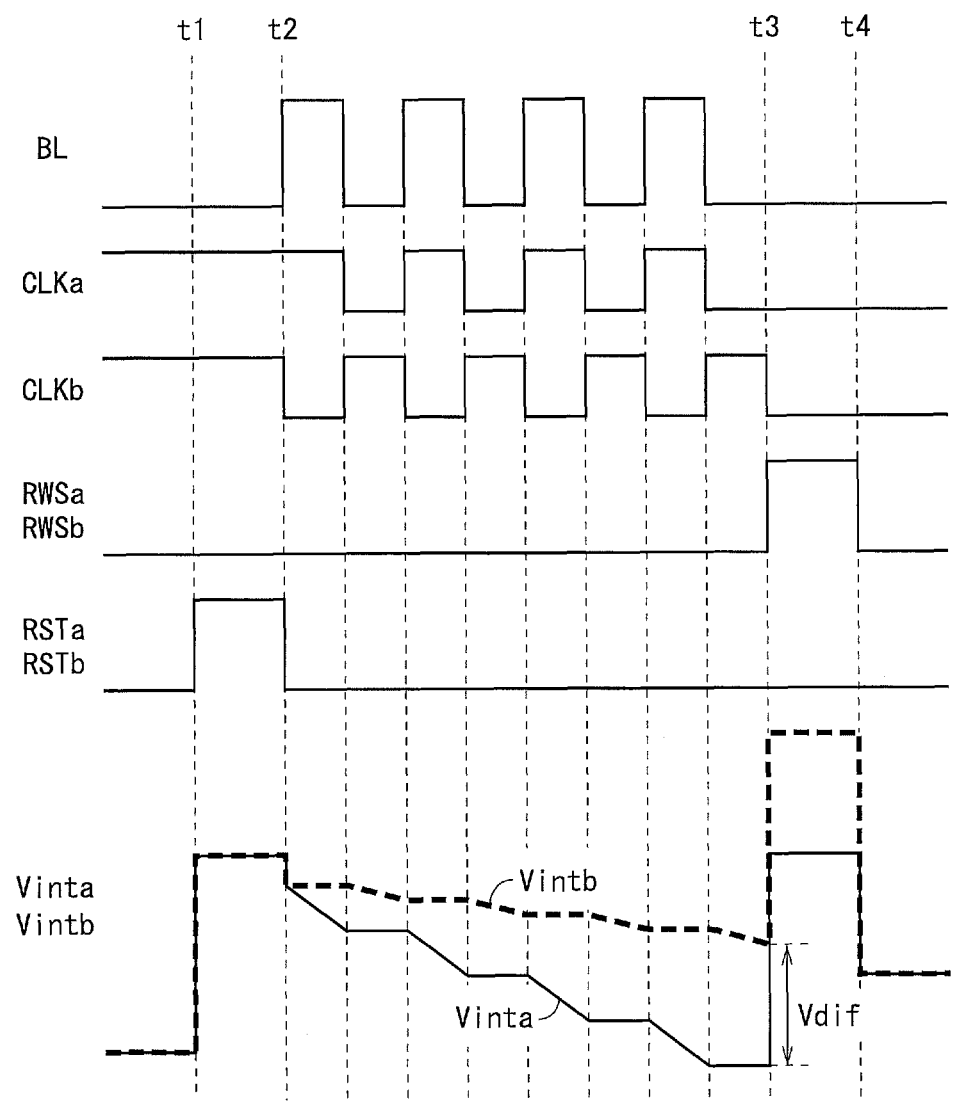
FIG. 27 is a signal waveform diagram of the sensor pixel circuits shown in FIG. 24.

FIG. 27 is a signal waveform diagram of the first and second pixel circuits 60a and 60b in the case of performing the consecutive drive. In FIG. 27, Vinta represents a potential at the accumulation node in the first pixel circuit 60a (a gate potential at the transistor M1a), and Vintb represents a potential at the accumulation node in the second pixel circuit 60b (a gate potential at the transistor M1b). In FIG. 27, a reset period corresponds to a range from a time t1 to a time t2, an accumulation and retention period corresponds to a range from the time t2 to a time t3, and a read period corresponds to a range from the time t3 to a time t4.

In the reset period, clock signals CLKa and CLKb turn to a HIGH level, read signals RWSa and RWSb turn to a LOW level, and reset signals RSTa and RSTb turn to a HIGH level for reset. Herein, the transistors T1a and T1b turn on. Accordingly, in the first pixel circuit 60a, a current (a forward current in the photodiode D1a) flows from the reset line RSTa into the accumulation node via the transistor T1a and the photodiode D1a, and in the second pixel circuit 60b, a current (a forward current in the photodiode D1b) flows from the reset line RSTb into the accumulation node via the transistor T1b and the photodiode D1b (FIG. 26 (a)). Thus, the potentials Vinta and Vintb are reset to a predetermined level.

In the accumulation and retention period, the reset signals RSTa and RSTb and the read signals RWSa and RWSb turn to the LOW level, and the clock signals CLKa and CLKb turn to the HIGH level and the LOW level four times, respectively. While the clock signal CLKa is in the HIGH level and the clock signal CLKb is in the LOW level, the transistor T1a turns on and the transistor T1b turns off. Herein, when light is incident on the photodiode D1a, a current (a photocurrent in the photodiode D1a) flows from the accumulation node of the first pixel circuit 60a into the reset line RSTa via the photodiode D1a and the transistor T1a, and charge is pulled out of the accumulation node. Moreover, even when light is incident on the photodiode D1b, a photocurrent in the photodiode D1b does not flow in the second pixel circuit 60b (FIG. 26 (b)). Accordingly, the potential Vinta drops in accordance with an amount of light to be incident during this period (a turn-on period of the backlight 3), and the potential Vintb does not change.

On the other hand, while the clock signal CLKa is in the LOW level and the clock signal CLKb is in the HIGH level, the transistor T1a turns off and the transistor T1b turns on. Herein, when light is incident on the photodiode D1b, a current (a photocurrent in the photodiode D1b) flows from the accumulation node of the second pixel circuit 60b into the reset line RSTb via the photodiode D1b and the transistor T1b, and charge is pulled out of the accumulation node. Moreover, even when light is incident on the photodiode D1a, a photocurrent in the photodiode D1a does not flow in the first pixel circuit 60a (FIG. 26 (c)). Accordingly, the potential Vintb drops in accordance with an amount of light to be incident during this period (a turn-off period of the backlight 3), and the potential Vinta does not change.

In the read period, the clock signals CLKa and CLKb and the reset signals RSTa and RSTb turn to the LOW level, and the read signals RWSa and RWSb turn to a HIGH level for read. Herein, the transistors T1a and T1b turn off. Herein, the potential Vinta rises by an amount which is (Cqa/Cpa) times (Cpa: a capacitance value of the entire first pixel circuit 60a, Cqa: a capacitance value of the capacitor C1a) as large as a rise amount of a potential at the read signal RWSa, and the transistor M1a drives the output line OUTa in accordance with the potential Vinta. Likewise, the potential Vintb rises by an amount which is (Cqb/Cpb) times (Cpb: a capacitance value of the entire second pixel circuit 60b, Cqb: a capacitance value of the capacitor C1b) as large as a rise amount of a potential at the read signal RWSb, and the transistor M1b drives the output line OUTb in accordance with the potential Vintb (FIG. 26 (d)).

As described above, the first pixel circuit 60a according to this embodiment includes the constituent elements which are equal to those of the first pixel circuit 10a according to the first embodiment. However, in the first pixel circuit 60a, the photodiode D1a is provided between the accumulation node and one of the ends of the transistor T1a, and the other end of the transistor T1a is connected to the reset line RSTa. The transistor T1a turns on during a sensing period when the backlight is turned on, in accordance with the clock signal CLKa. The second pixel circuit 60b has the configuration which is similar to that of the first pixel circuit 60a, and the transistor T1b included in the second pixel circuit 60b turns on during a sensing period when the backlight is turned off.

As described above, the transistor T1a that turns on during the sensing period when the backlight is turned on is provided on the path for the current flowing through the photodiode D1a, and the transistor T1b that turns on during the sensing period when the backlight is turned off is provided on the path for the current flowing through the photodiode D1b. Thus, it is possible to constitute the first pixel circuit 60a that senses light during the sensing period when the backlight is turned on and retains the amount of sensed light otherwise, and the second pixel circuit 60b that senses light during the sensing period when the backlight is turned off and retains the amount of sensed light otherwise. Thus, it is possible to attain effects which are similar to those in the first embodiment.

Seventh Embodiment

Figure 28:
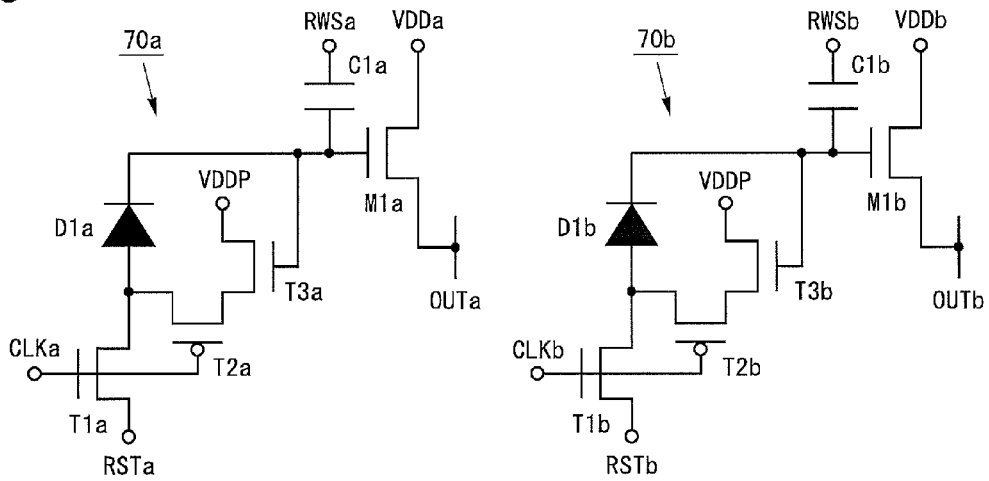
FIG. 28 is a circuit diagram of sensor pixel circuits according to a seventh embodiment of the present invention.

FIG. 28 is a circuit diagram of pixel circuits according to a seventh embodiment of the present invention. As shown in FIG. 28, a first pixel circuit 70a includes transistors T1a, T2a, T3a and M1a, a photodiode D1a, and a capacitor C1a. A second pixel circuit 70b includes transistors T1b, T2b, T3b and M1b, a photodiode D1b and a capacitor C1b. Each of the transistors T1a, T3a, M1a, T1b, T3b and M1b is an N-type TFT, and each of the transistors T2a and T2b is a P-type TFT. A HIGH-level potential VDDP is supplied to the first pixel circuit 70a and the second pixel circuit 70b.

With regard to the first pixel circuit 70a, gates of the transistors T1a and T2a are connected to a clock line CLKa. In the transistor T1a, a source is connected to a reset line RSTa, and a drain is connected to an anode of the photodiode D1a and a drain of the transistor T2a. A cathode of the photodiode D1a is connected to a gate of the transistor M1a. In the transistor M1a, a drain is connected to a power supply line VDDa, and a source is connected to an output line OUTa. The capacitor C1a is provided between the gate of the transistor M1a and a read line RWSa. In the transistor T3a, a drain is applied with a potential VDDP, a gate is connected to the gate of the transistor M1a, and a source is connected to a source of the transistor T2a. In the first pixel circuit 70a, a node connected to the gate of the transistor M1a serves as an accumulation node, and the transistor M1a functions as a read transistor. The second pixel circuit 70b has a configuration which is equal to that of the first pixel circuit 70a.

Figure 29A:
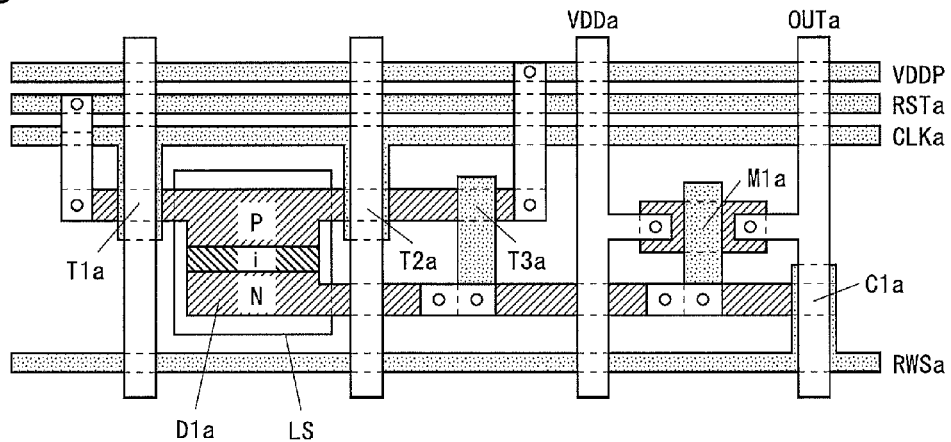
FIG. 29A is a layout diagram of the sensor pixel circuit shown in FIG. 28.
Figure 29B:
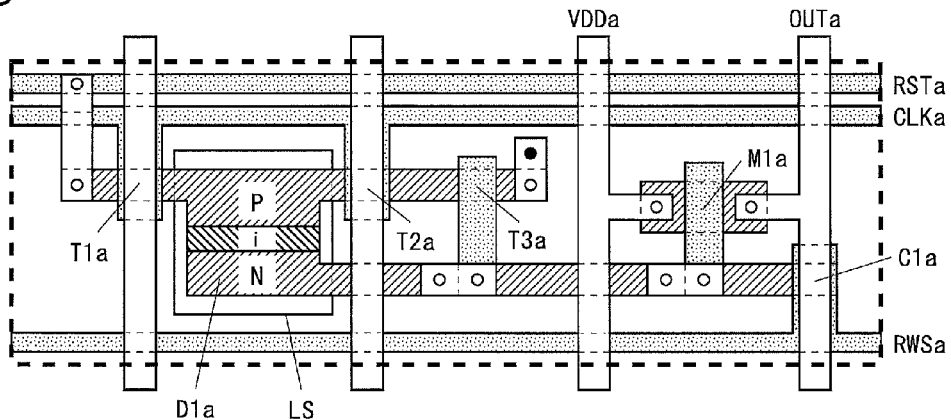
FIG. 29B is another layout diagram of the sensor pixel circuit shown in FIG. 28.

FIGS. 29A and 29B are layout diagrams of the first pixel circuit 70a. The description about these drawings is equal to that in the first embodiment, except for the following points. According to the layout shown in FIG. 29B, the potential VDDP is applied to a shield SH (a transparent electrode: shown with a bold broken line) for covering a layout surface, and a contact (shown with a black circle) is provided at a place where the shield SH and a source wiring layer are connected.

Figure 30:
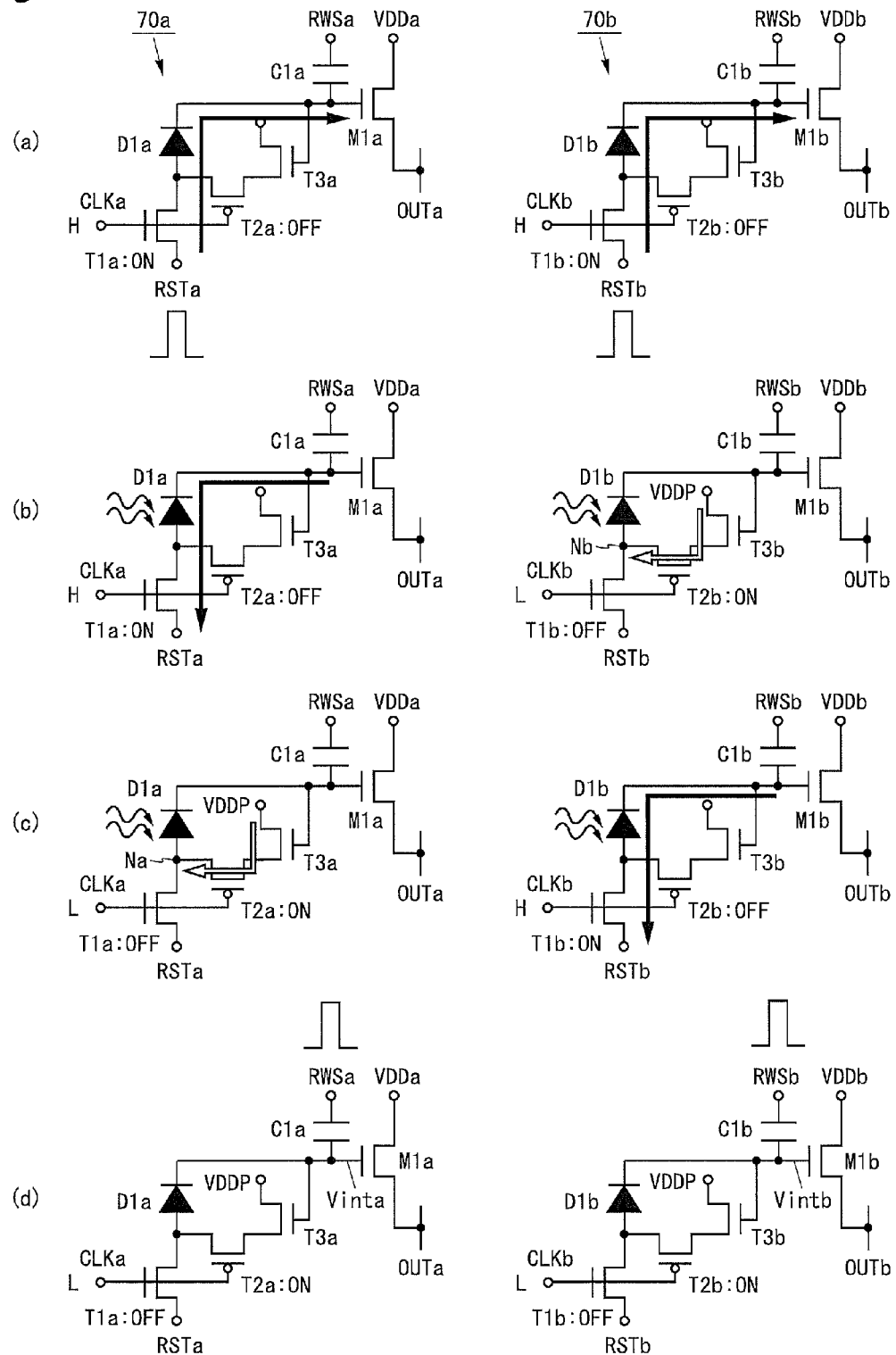
FIG. 30 is a diagram showing operations of the sensor pixel circuits shown in FIG. 28.

FIG. 30 is a diagram showing operations of the first and second pixel circuits 70a and 70b in the case of performing consecutive drive. In the case of performing the consecutive drive, the first and second pixel circuits 70a and 70b perform (a) reset, (b) accumulation and retention when a backlight is turned on, (c) accumulation and retention when the backlight is turned off, and (d) read, in a one-frame period. The accumulation and retention when the backlight is turned on and the accumulation and retention when the backlight is turned off are performed four times, respectively, in the one-frame period. A signal waveform diagram of the first and second pixel circuits 70a and 70b in the case of performing the consecutive drive is equal to that in the sixth embodiment (FIG. 27).

The first and second pixel circuits 70a and 70b operate as in the first and second pixel circuits 60a and 60b according to the sixth embodiment, except for the following points. The transistor T2a turns off when the clock signal CLKa is in a HIGH level, and turns on when the clock signal CLKa is in a LOW level. The transistor T2b turns off when the clock signal CLKb is in the HIGH level, and turns on when the clock signal CLKb is in the LOW level.

In an accumulation and retention period, when the clock signal CLKb changes from the HIGH level to the LOW level, the transistor T2b changes off to on. At this moment, a node Nb connected to the anode of the photodiode D1b is charged with a potential corresponding to a gate potential Vintb at the transistor M1b, via the transistors T2b and T3b (a white arrow in FIG. 30 (b)). Therefore, when the clock signal CLKb changes from the HIGH level to the LOW level, a current flowing through the photodiode D1b is interrupted immediately.

On the other hand, in the accumulation and retention period, when the clock signal CLKa changes from the HIGH level to the LOW level, the transistor T2a changes off to on. At this moment, a node Na connected to the anode of the photodiode D1a is charged with a potential corresponding to a gate potential Vinta at the transistor M1a, via the transistors T2a and T3a (a white arrow in FIG. 30 (c)). Therefore, when the clock signal CLKa changes from the HIGH level to the LOW level, a current flowing through the photodiode D1a is interrupted immediately.

As described above, the first pixel circuit 70a according to this embodiment corresponds to the first pixel circuit 60a according to the sixth embodiment additionally including the transistor T2a (first switching element) which has one of the ends connected to the anode (transistor T1a-side terminal) of the photodiode D1a and turns on or off in accordance with the clock signal CLKa, and the transistor T3a (second switching element) which feeds the potential corresponding to the potential at the accumulation node to the source of the transistor T2a. The transistor T2a turns on when the clock signal CLKa is in the LOW level (during a period other than the sensing period when the backlight is turned on). The second pixel circuit 60b has the configuration which is similar to that of the first pixel circuit 60a, and the transistor T2b included in the second pixel circuit 70b turns on when the clock signal CLKb is in the LOW level (during a period other than the sensing period when the backlight is turned off).

According to the first and second pixel circuits 70a and 70b, as in the first and second pixel circuits 60a and 60b according to the sixth embodiment, it is possible to detect an amount of light when the backlight is turned on and an amount of light when the backlight is turned off. Thus, it is possible to attain effects which are similar to those in the first embodiment. Moreover, by applying the potential corresponding to the potential at the accumulation node to the terminal, which is opposed to the accumulation node, of the photodiode D1a upon change of the clock signal CLKa, it is possible to immediately interrupt the current flowing through the photodiode D1a, and to enhance detection accuracy. With regard to the second pixel circuit 70b, it is also possible to attain similar effects.

Modification Examples of Embodiments

The respective embodiments of the present invention may employ the following modification examples. FIGS. 31A to 31H are circuit diagrams of pixel circuits according to first to eighth modification examples of the first embodiment. First pixel circuits 11a to 18a shown in FIGS. 31A to 31H are achieved in such a manner that the first pixel circuit 10a according to the first embodiment is subjected to the following modifications. Second pixel circuits 11b to 18b are achieved in such a manner that the second pixel circuit 10b according to the first embodiment is subjected to the same modifications.

Figure 31A:
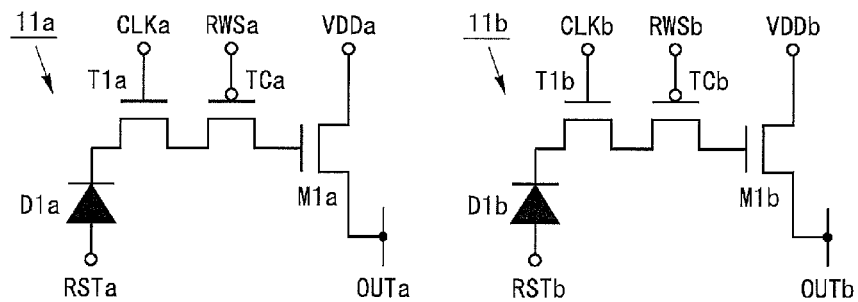
FIG. 31A is a circuit diagram of sensor pixel circuits according to a first modification example of the first embodiment.
Figure 36A:
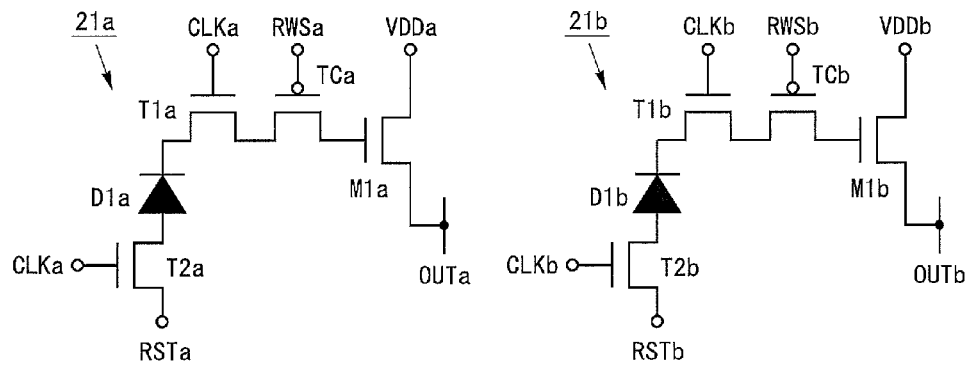
FIG. 36A is a circuit diagram of sensor pixel circuits according to a first modification example of the second embodiment.
Figure 37A:
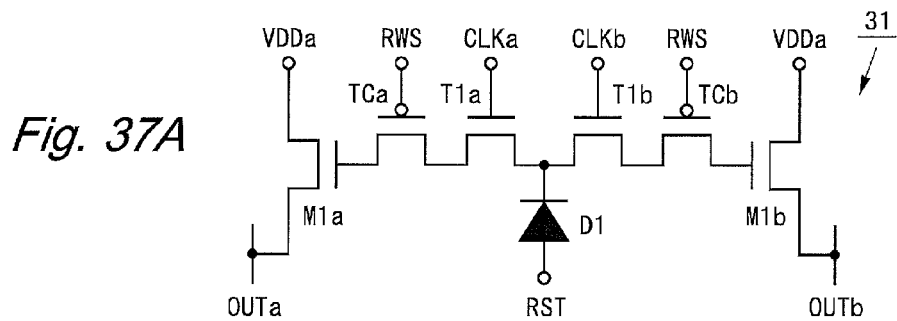
FIG. 37A is a circuit diagram of a sensor pixel circuit according to a first modification example of the third embodiment.
Figure 38A:
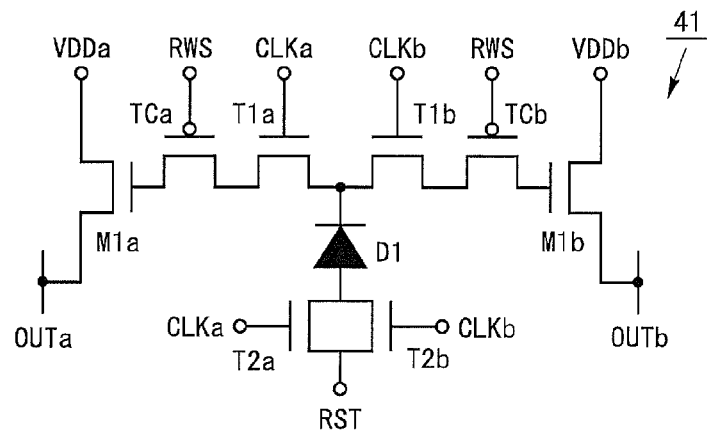
FIG. 38A is a circuit diagram of a sensor pixel circuit according to a first modification example of the fourth embodiment.
Figure 39A:
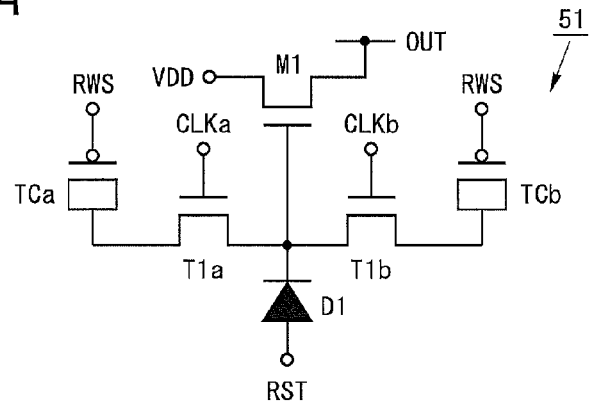
FIG. 39A is a circuit diagram of a sensor pixel circuit according to a first modification example of the fifth embodiment.
Figure 40A:
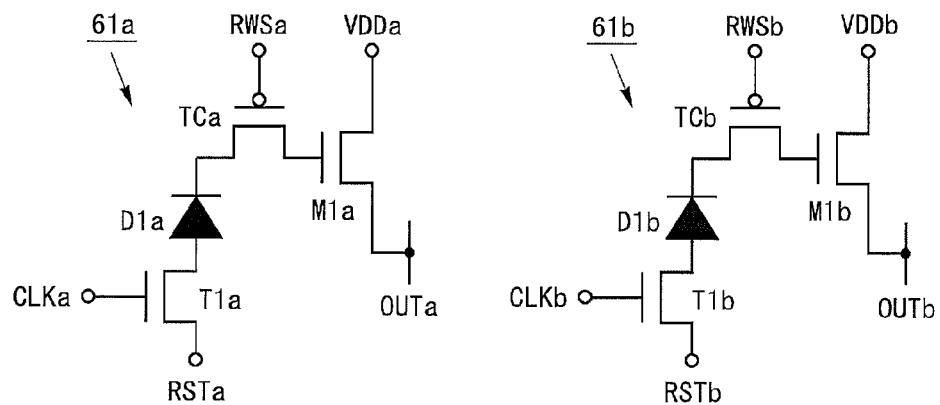
FIG. 40A is a circuit diagram of sensor pixel circuits according to a first modification example of the sixth embodiment.
Figure 41A:
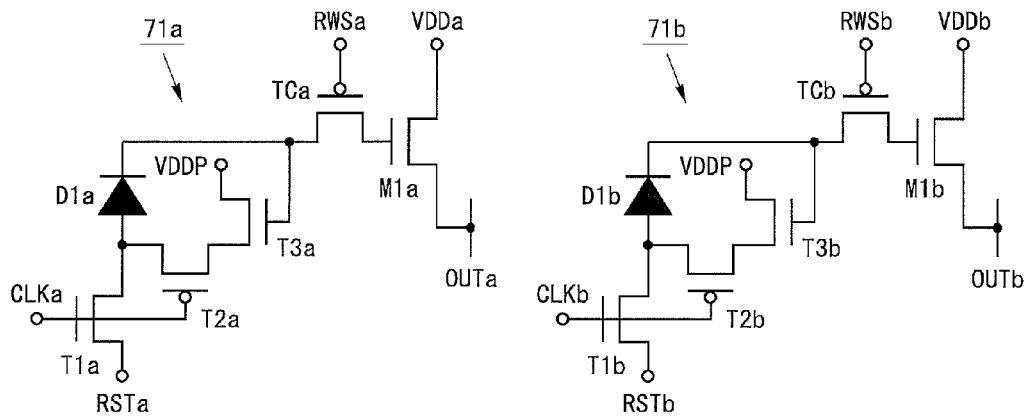
FIG. 41A is a circuit diagram of sensor pixel circuits according to a first modification example of the seventh embodiment.

The first pixel circuit 11a shown in FIG. 31A corresponds to the first pixel circuit 10a in which the capacitor C1 is substituted with a transistor TCa which is a P-type TFT. With regard to the first pixel circuit 11a, in the transistor TCa, a drain is connected to a drain of a transistor T1a, a source is connected to a gate of a transistor M1a, and a gate is connected to a read line RWSa. When a HIGH level for read is applied to the read line RWSa, the transistor TCa having the connection form described above causes a larger change in potential at an accumulation node, as compared with the original pixel circuit. Accordingly, it is possible to amplify a difference between a potential at the accumulation node in the case where incident light is strong and a potential at the accumulation node in the case where incident light is weak, thereby improving the sensitivity of the pixel circuit 11a. Pixel circuits 21a and 21b shown in FIG. 36A, a pixel circuit 31 shown in FIG. 37A, a pixel circuit 41 shown in FIG. 38A, a pixel circuit 51 shown in FIG. 39A, pixel circuits 61a and 61b shown in FIG. 40A, and pixel circuits 71a and 71b shown in FIG. 41A are achieved in such a manner that similar modifications are carried out on the second to seventh embodiments.

Figure 31B:
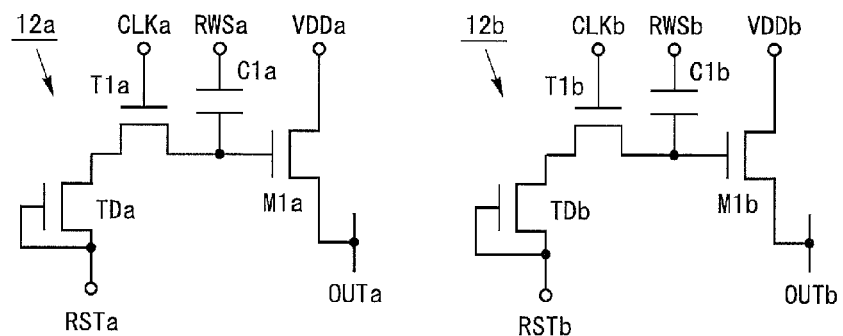
FIG. 31B is a circuit diagram of sensor pixel circuits according to a second modification example of the first embodiment.
Figure 36B:
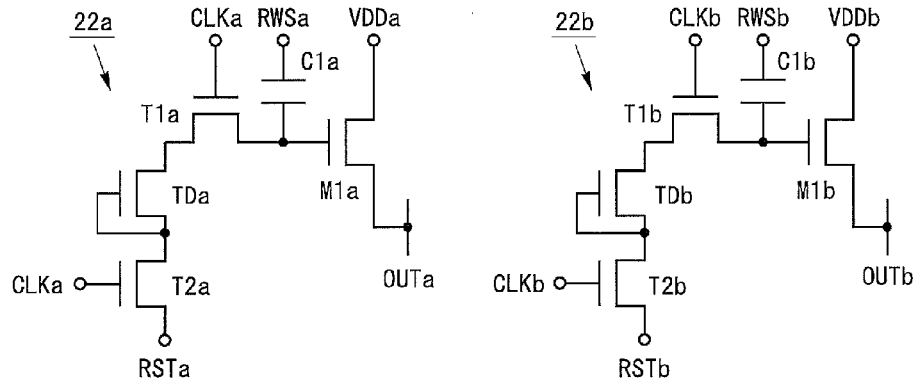
FIG. 36B is a circuit diagram of sensor pixel circuits according to a second modification example of the second embodiment.
Figure 37B:
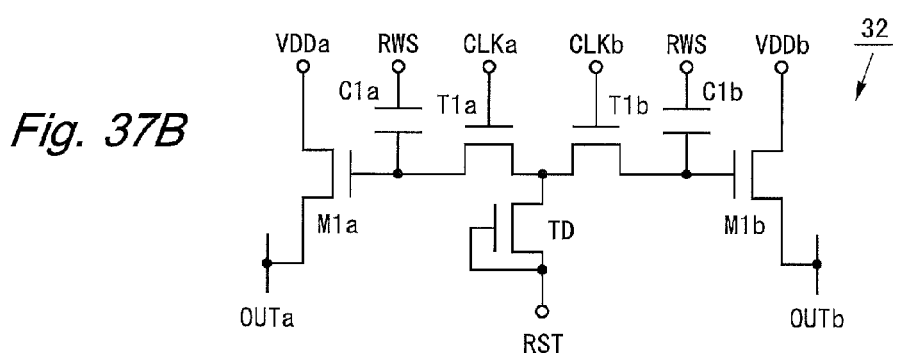
FIG. 37B is a circuit diagram of a sensor pixel circuit according to a second modification example of the third embodiment.
Figure 38B:
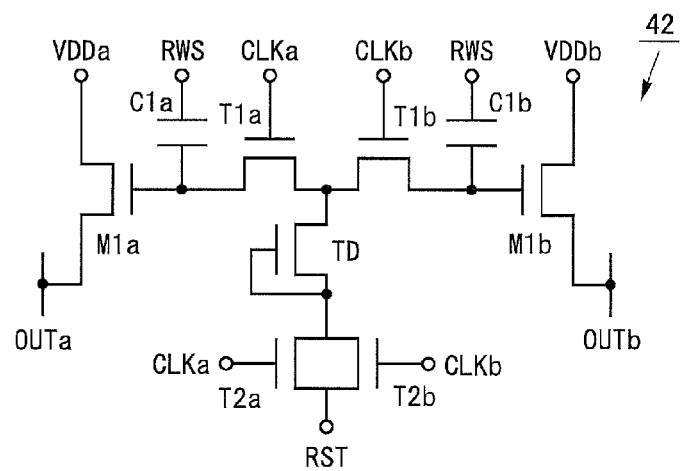
FIG. 38B is a circuit diagram of a sensor pixel circuit according to a second modification example of the fourth embodiment.
Figure 39B:
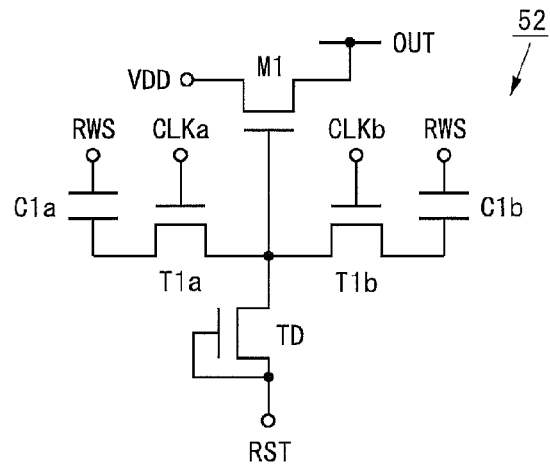
FIG. 39B is a circuit diagram of a sensor pixel circuit according to a second modification example of the fifth embodiment.
Figure 40B:
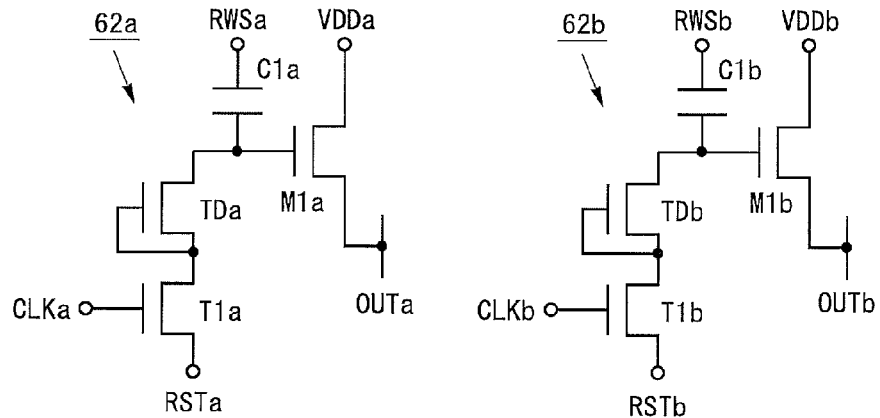
FIG. 40B is a circuit diagram of sensor pixel circuits according to a second modification example of the sixth embodiment.
Figure 41B:
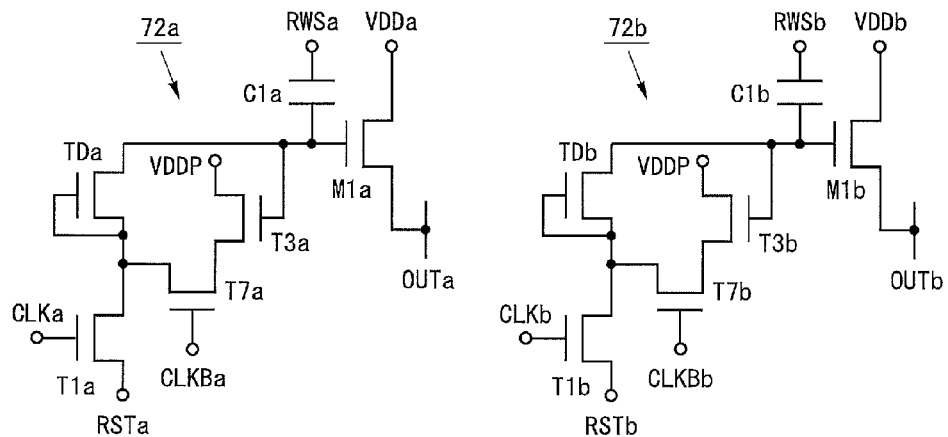
FIG. 41B is a circuit diagram of sensor pixel circuits according to a second modification example of the seventh embodiment.

The first pixel circuit 12a shown in FIG. 31B corresponds to the first pixel circuit 10a in which the photodiode D1 is substituted with a phototransistor TDa. Thus, all the transistors included in the first pixel circuit 12a are of an N-type. Accordingly, it is possible to manufacture the first pixel circuit 12a by use of a single channel process capable of manufacturing only N-type transistors. Pixel circuits 22a and 22b shown in FIG. 36B, a pixel circuit 32 shown in FIG. 37B, a pixel circuit 42 shown in FIG. 38B, a pixel circuit 52 shown in FIG. 39B, pixel circuits 62a and 62b shown in FIG. 40B, and pixel circuits 72a and 72b shown in FIG. 41B are achieved in such a manner that similar modifications are carried out on the second to seventh embodiments. It is to be noted that in the pixel circuit 72a shown in FIG. 41B, it is necessary to substitute the P-type transistor T2a with an N-type transistor T7a and to connect a gate of the transistor T7a to a clock line CLKBa for propagating an inverted signal of a clock signal CLKa.

Figure 31C:
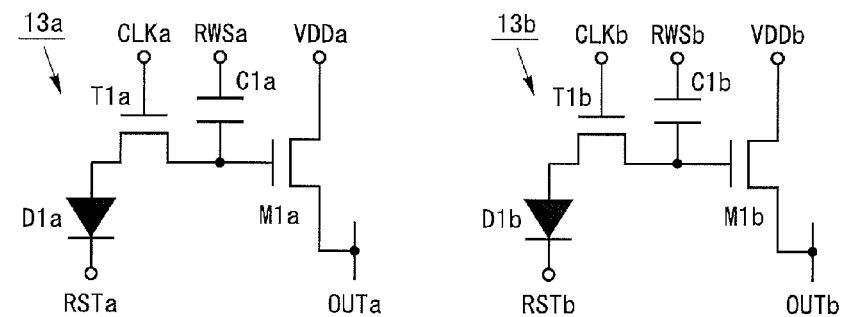
FIG. 31C is a circuit diagram of sensor pixel circuits according to a third modification example of the first embodiment.
Figure 36C:
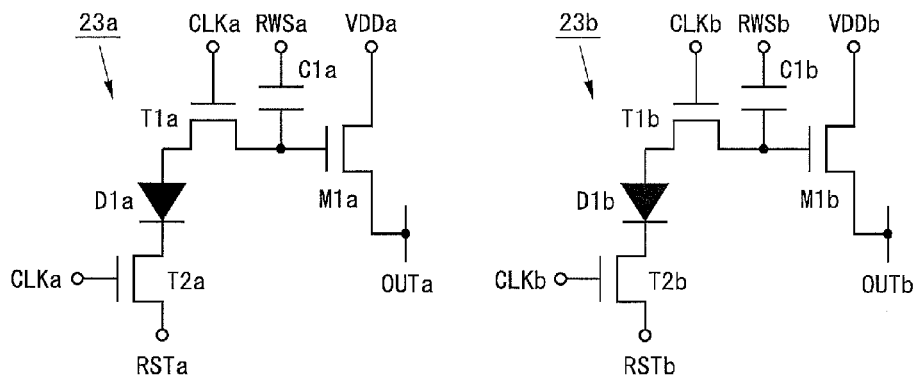
FIG. 36C is a circuit diagram of sensor pixel circuits according to a third modification example of the second embodiment.
Figure 37C:
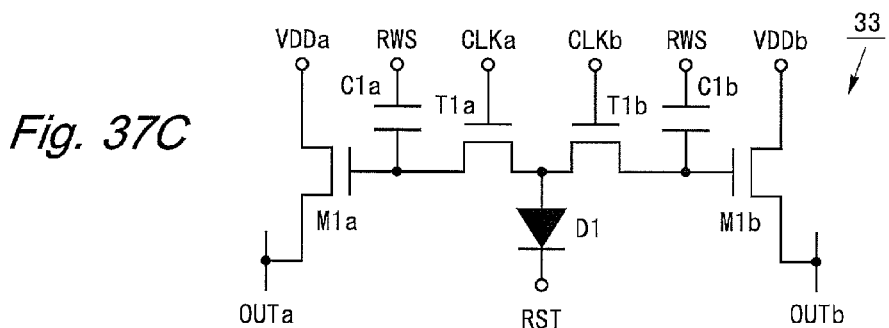
FIG. 37C is a circuit diagram of a sensor pixel circuit according to a third modification example of the third embodiment.
Figure 38C:
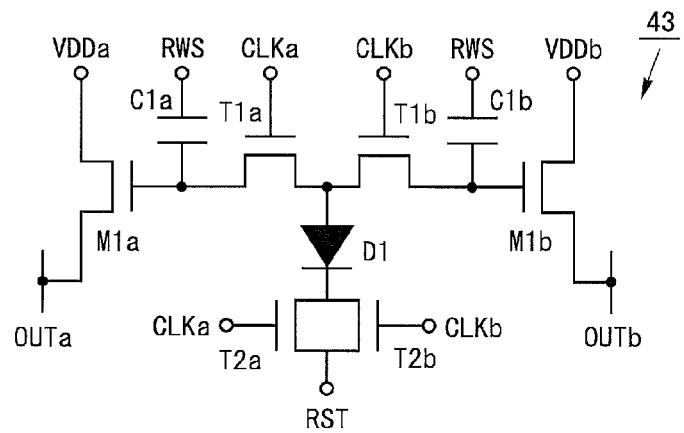
FIG. 38C is a circuit diagram of a sensor pixel circuit according to a third modification example of the fourth embodiment.
Figure 39C:
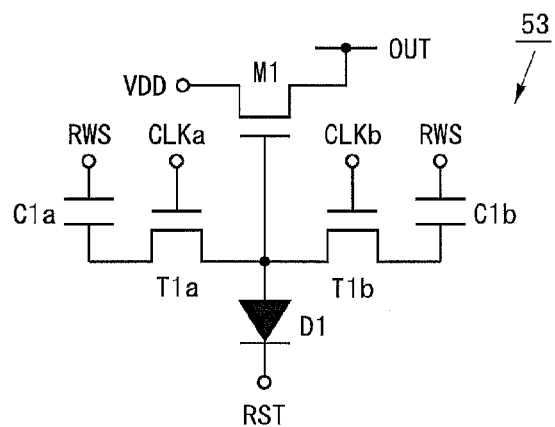
FIG. 39C is a circuit diagram of a sensor pixel circuit according to a third modification example of the fifth embodiment.
Figure 40C:
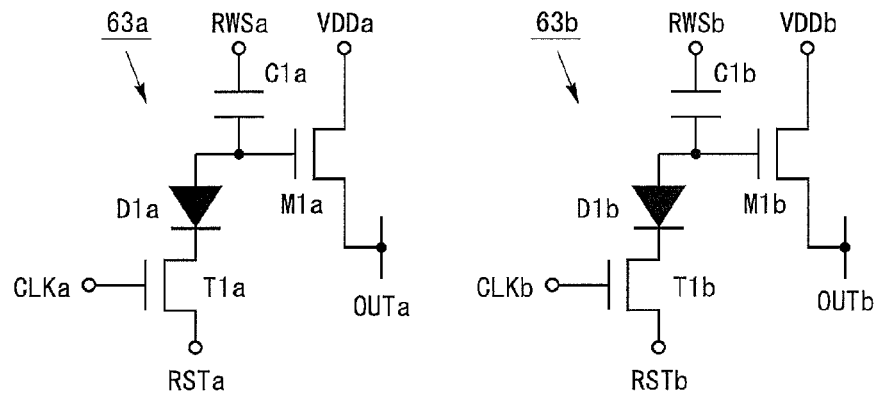
FIG. 40C is a circuit diagram of sensor pixel circuits according to a third modification example of the sixth embodiment.
Figure 41C:
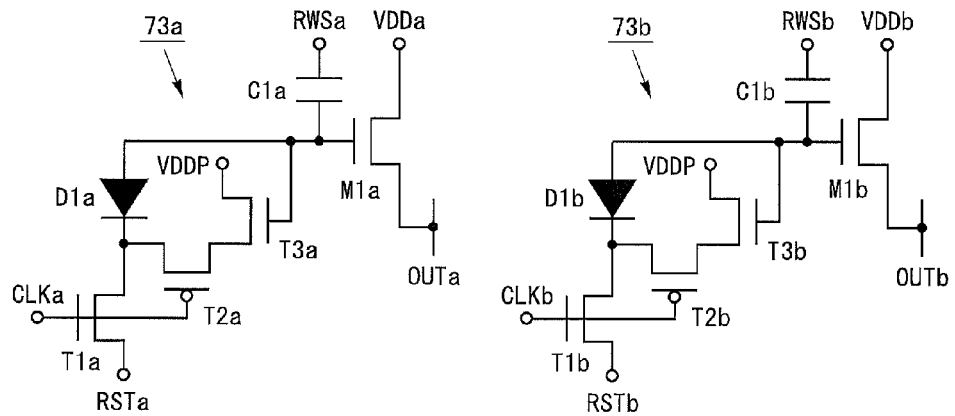
FIG. 41C is a circuit diagram of sensor pixel circuits according to a third modification example of the seventh embodiment.

The first pixel circuit 13a shown in FIG. 31C corresponds to the first pixel circuit 10a in which the photodiode D1a is connected in reverse. The first pixel circuit 13a is supplied with a reset signal RSTa which is in a HIGH level in a normal condition and turns to a LOW level for reset at the time of reset. In the photodiode D1a, a cathode is connected to a reset line RSTa, and an anode is connected to a drain of a transistor T1a. Thus, it is possible to achieve a variety of pixel circuits. Pixel circuits 23a and 23b shown in FIG. 36C, a pixel circuit 33 shown in FIG. 37C, a pixel circuit 43 shown in FIG. 38C, a pixel circuit 53 shown in FIG. 39C, pixel circuits 63a and 63b shown in FIG. 40C, and pixel circuits 73a and 73b shown in FIG. 41C are achieved in such a manner that similar modifications are carried out on the second to seventh embodiments.

Figure 31D:
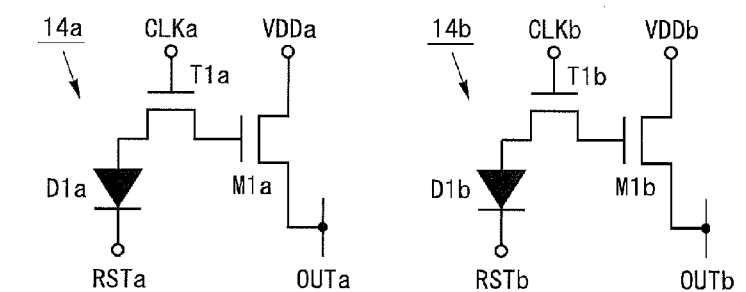
FIG. 31D is a circuit diagram of sensor pixel circuits according to a fourth modification example of the first embodiment.
Figure 36D:
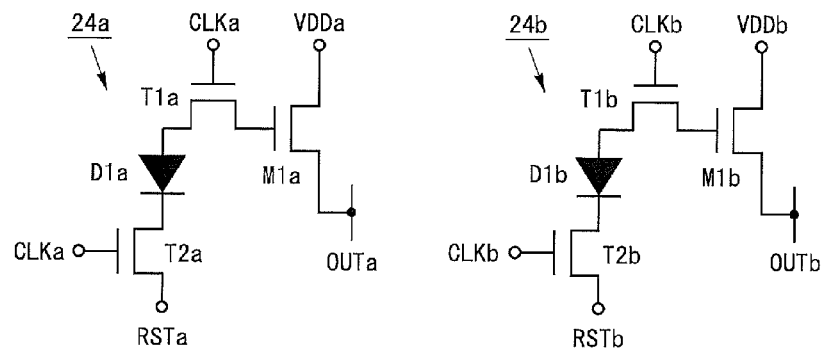
FIG. 36D is a circuit diagram of sensor pixel circuits according to a fourth modification example of the second embodiment.
Figure 37D:
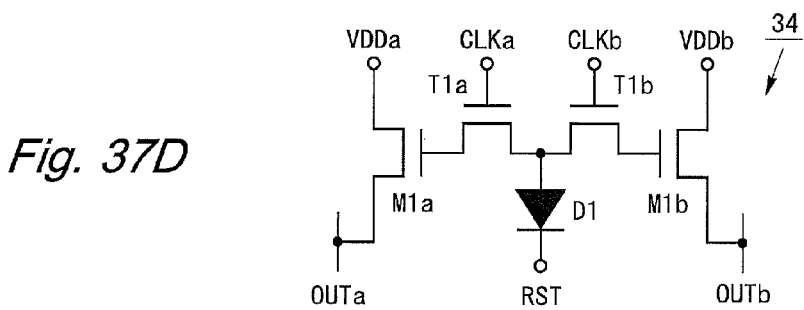
FIG. 37D is a circuit diagram of a sensor pixel circuit according to a fourth modification example of the third embodiment.
Figure 38D:
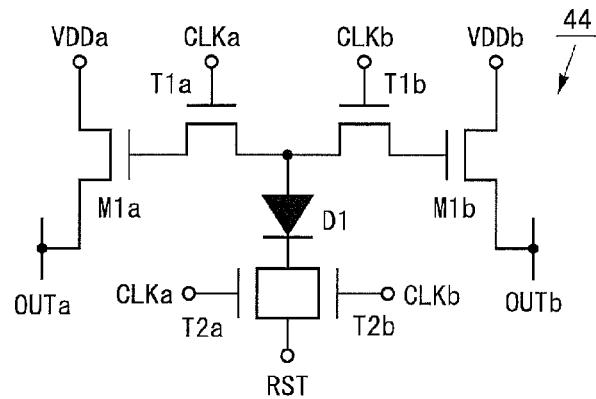
FIG. 38D is a circuit diagram of a sensor pixel circuit according to a fourth modification example of the fourth embodiment.
Figure 39D:
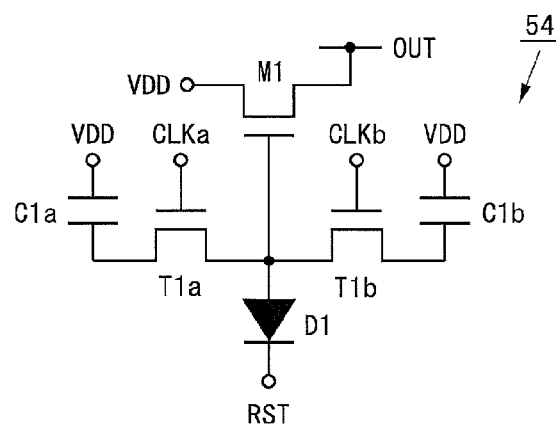
FIG. 39D is a circuit diagram of a sensor pixel circuit according to a fourth modification example of the fifth embodiment.
Figure 40D:
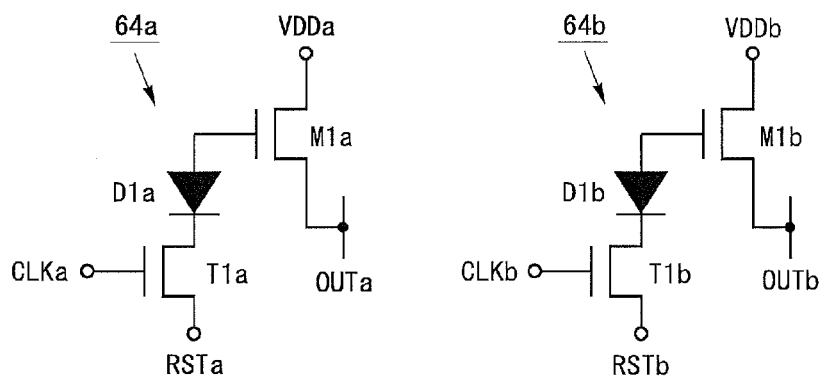
FIG. 40D is a circuit diagram of sensor pixel circuits according to a fourth modification example of the sixth embodiment.
Figure 41D:
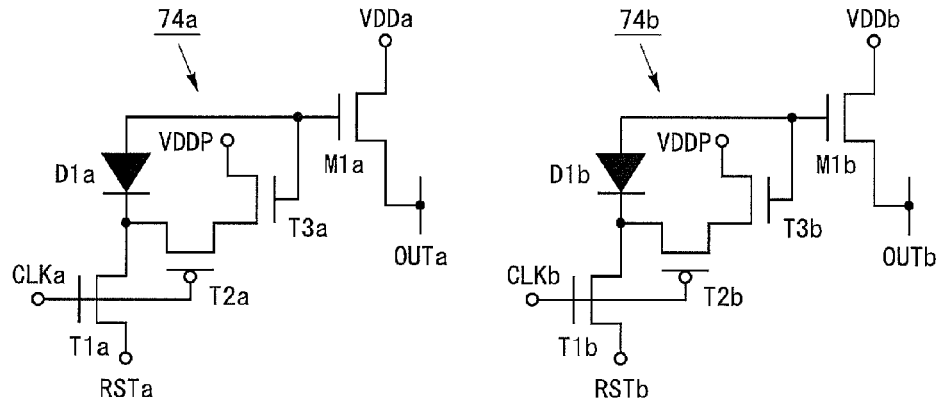
FIG. 41D is a circuit diagram of sensor pixel circuits according to a fourth modification example of the seventh embodiment.

The first pixel circuit 14a shown in FIG. 31D corresponds to the first pixel circuit 10a in which the photodiode D1a is connected in reverse and from which the capacitor C1a is removed. The first pixel circuit 14a is supplied with a reset signal RSTa which is similar to that of the first pixel circuit 13a. However, the reset signal RSTa turns to a HIGH level for read at the time of read. When the reset signal RSTa turns to the HIGH level for read, a potential at an accumulation node (a gate potential at a transistor M1a) rises, and a current corresponding to the potential at the accumulation node flows into the transistor M1a. As described above, the first pixel circuit 14a does not include the capacitor C1a. Accordingly, it is possible to increase an aperture ratio by virtue of the removal of the capacitor C1a, and to improve the sensitivity of the pixel circuit. Pixel circuits 24a and 24b shown in FIG. 36D, a pixel circuit 34 shown in FIG. 37D, a pixel circuit 44 shown in FIG. 38D, a pixel circuit 54 shown in FIG. 39D, pixel circuits 64a and 64b shown in FIG. 40D, and pixel circuits 74a and 74b shown in FIG. 41D are achieved in such a manner that similar modifications are carried out on the second to seventh embodiments.

Figure 31E:
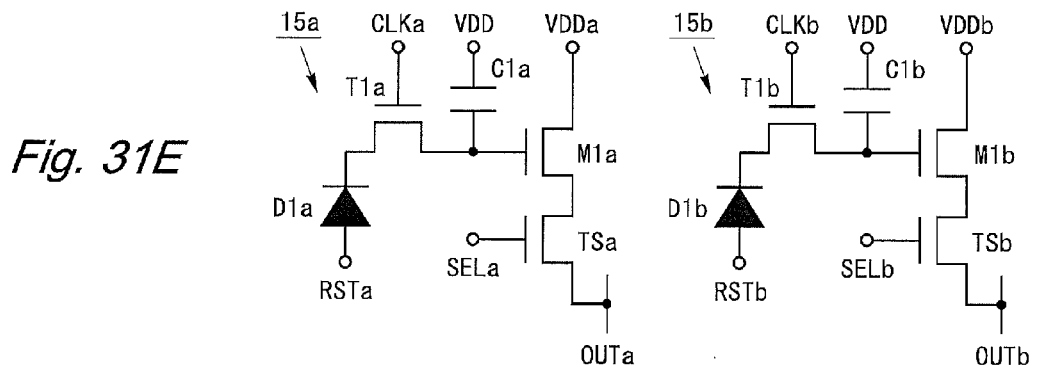
FIG. 31E is a circuit diagram of sensor pixel circuits according to a fifth modification example of the first embodiment.
Figure 36E:
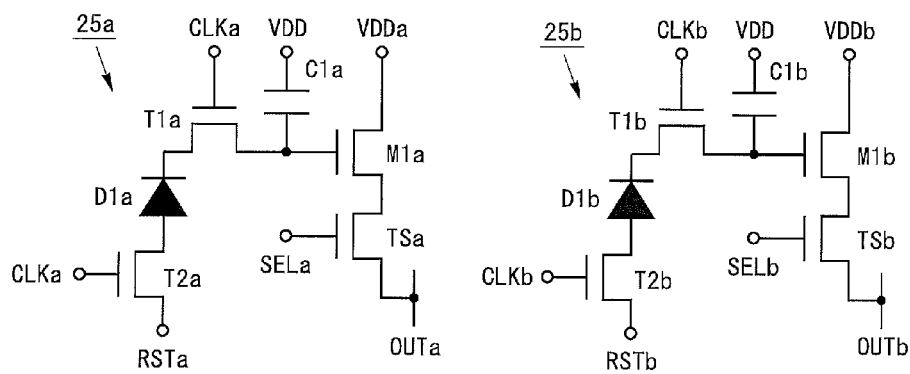
FIG. 36E is a circuit diagram of sensor pixel circuits according to a fifth modification example of the second embodiment.
Figure 37E:
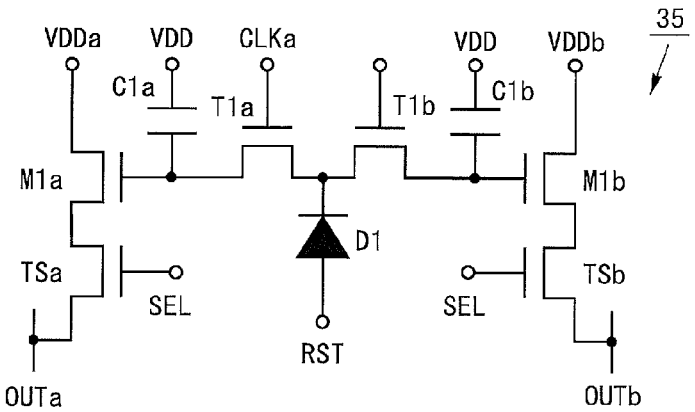
FIG. 37E is a circuit diagram of a sensor pixel circuit according to a fifth modification example of the third embodiment.
Figure 38E:
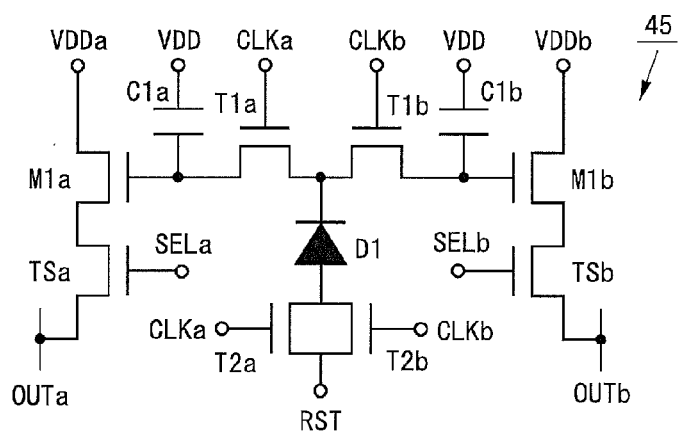
FIG. 38E is a circuit diagram of a sensor pixel circuit according to a fifth modification example of the fourth embodiment.
Figure 39E:
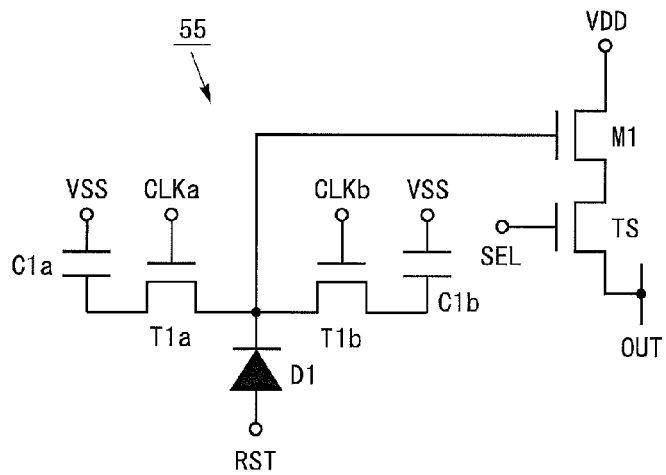
FIG. 39E is a circuit diagram of a sensor pixel circuit according to a fifth modification example of the fifth embodiment.
Figure 40E:
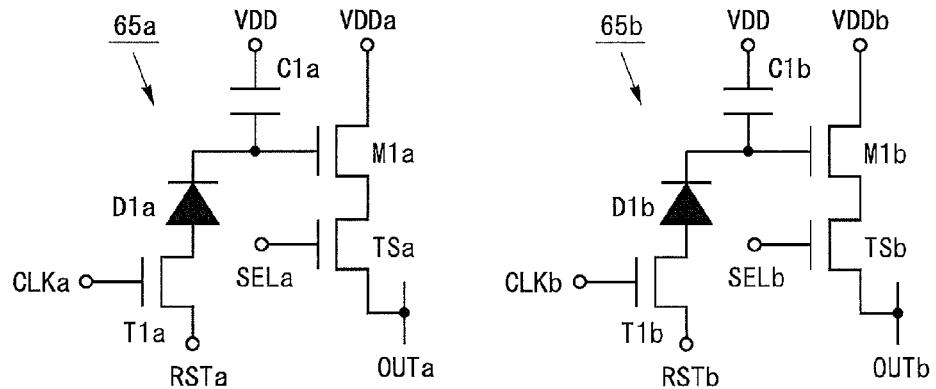
FIG. 40E is a circuit diagram of sensor pixel circuits according to a fifth modification example of the sixth embodiment.
Figure 41E:
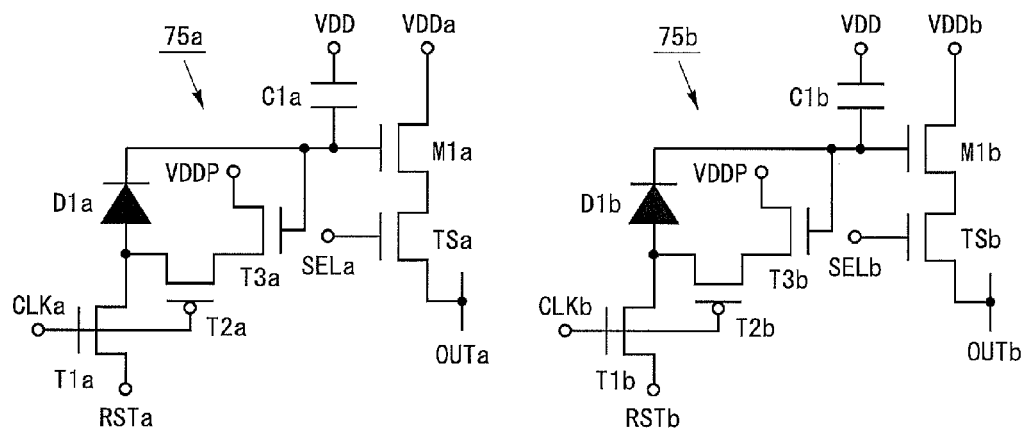
FIG. 41E is a circuit diagram of sensor pixel circuits according to a fifth modification example of the seventh embodiment.

The first pixel circuit 15a shown in FIG. 31E corresponds to the first pixel circuit 10a to which a transistor TSa is added. The transistor TSa is an N-type TFT, and functions as a switching element for selection. With regard to the first pixel circuit 15a, a source of a transistor M1a is connected to a drain of the transistor TSa. In the transistor TSa, a source is connected to an output line OUTa, and a gate is connected to a selection line SELa. A selection signal SELa turns to a HIGH level at the time of read from the first pixel circuit 15a. Thus, it is possible to achieve a variety of pixel circuits. Pixel circuits 25a and 25b shown in FIG. 36E, a pixel circuit 35 shown in FIG. 37E, a pixel circuit 45 shown in FIG. 38E, a pixel circuit 55 shown in FIG. 39E, pixel circuits 65a and 65b shown in FIG. 40E, and pixel circuits 75a and 75b shown in FIG. 41E are achieved in such a manner that similar modifications are carried out on the second to seventh embodiments.

Figure 32:
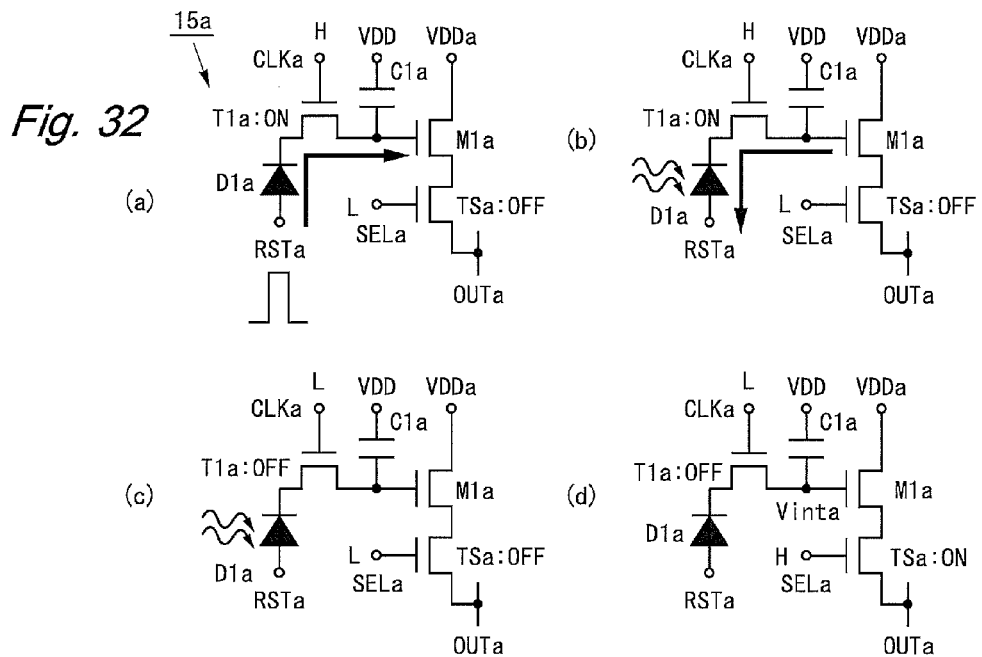
FIG. 32 is a diagram showing operations of the sensor pixel circuit shown in FIG. 31E.
Figure 33:
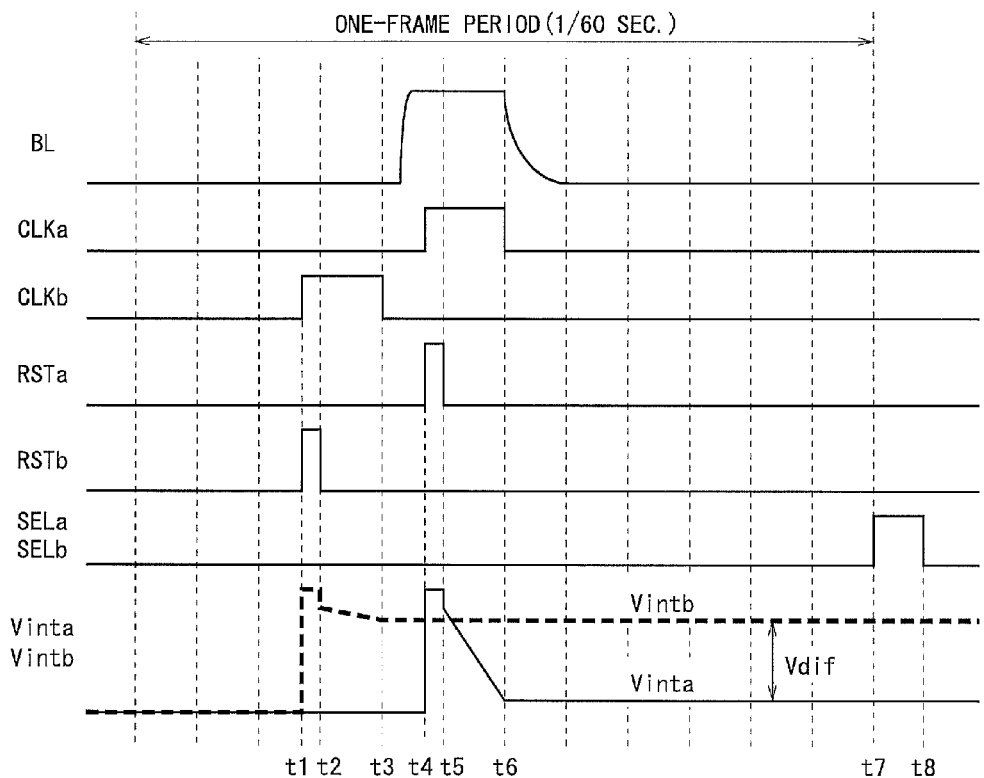
FIG. 33 is a signal waveform diagram of the sensor pixel circuits shown in FIG. 31E.

FIG. 32 is a diagram showing operations of the first pixel circuit 15a in the case of performing one-time drive. FIG. 33 is a signal waveform diagram of the first pixel circuit 15a in the case of performing the one-time drive. During a period other than read, the selection signal SELa turns to a LOW level and the transistor TSa turns off, so that the first pixel circuit 15a operates as in the first pixel circuit 10a (FIG. 32 (a) to (c)). At the time of read, the selection signal SELa turns to the HIGH level, and the transistor TSa turns on. Herein, a current Ia in an amount corresponding to a potential Vinta flows between the drain and the source of the transistor M1a (FIG. 32 (d)).

Figure 31F:
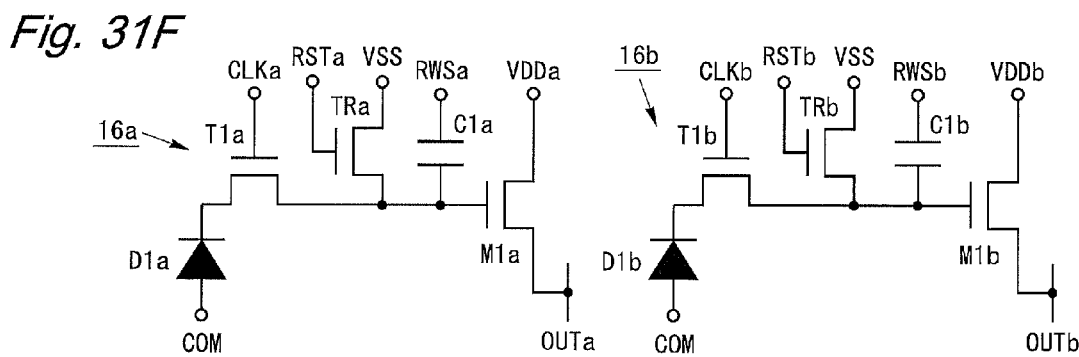
FIG. 31F is a circuit diagram of sensor pixel circuits according to a sixth modification example of the first embodiment.
Figure 36F:
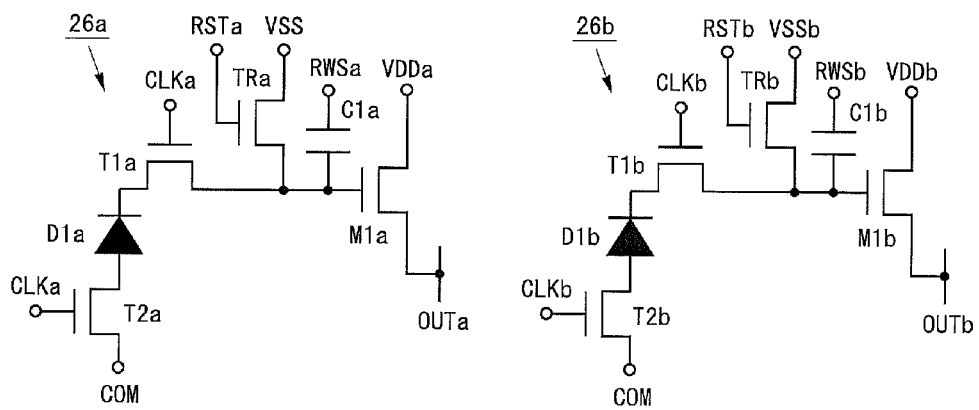
FIG. 36F is a circuit diagram of sensor pixel circuits according to a sixth modification example of the second embodiment.
Figure 37F:
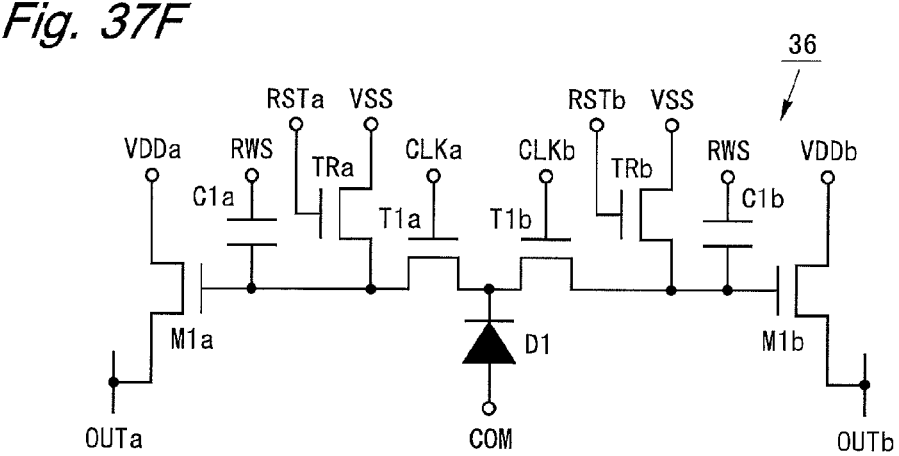
FIG. 37F is a circuit diagram of a sensor pixel circuit according to a sixth modification example of the third embodiment.
Figure 38F:
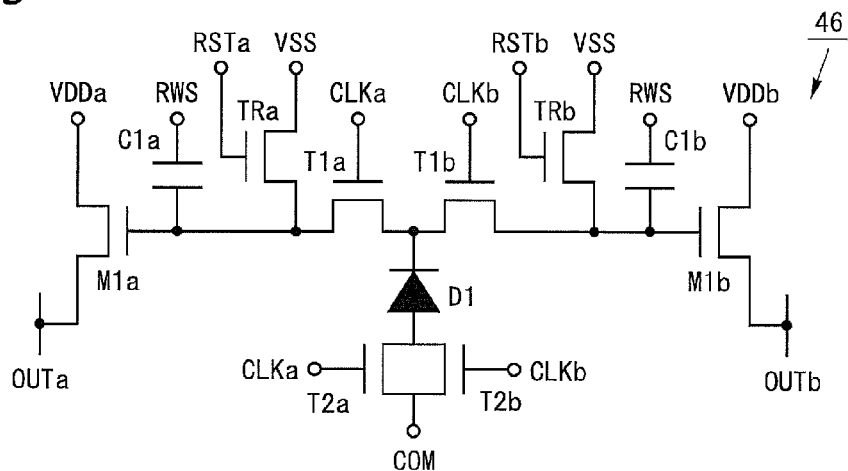
FIG. 38F is a circuit diagram of a sensor pixel circuit according to a sixth modification example of the fourth embodiment.
Figure 39F:
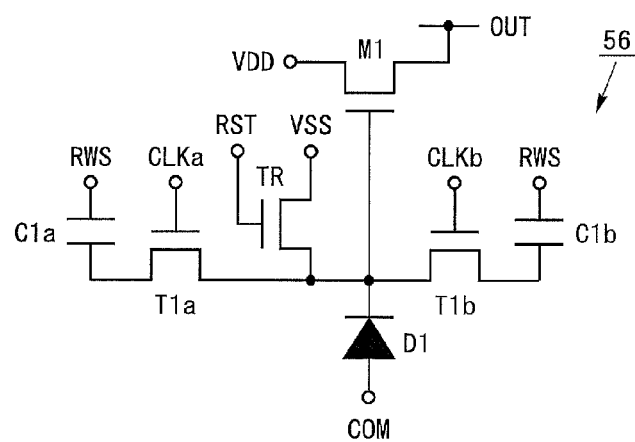
FIG. 39F is a circuit diagram of a sensor pixel circuit according to a sixth modification example of the fifth embodiment.
Figure 40F:
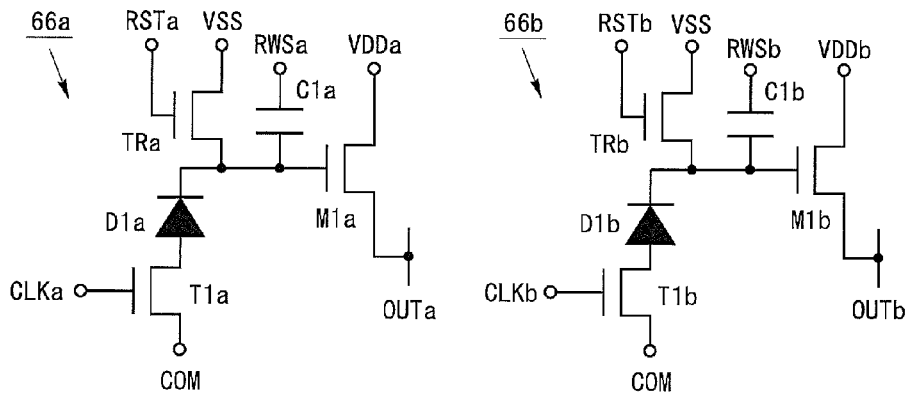
FIG. 40F is a circuit diagram of sensor pixel circuits according to a sixth modification example of the sixth embodiment.
Figure 41F:
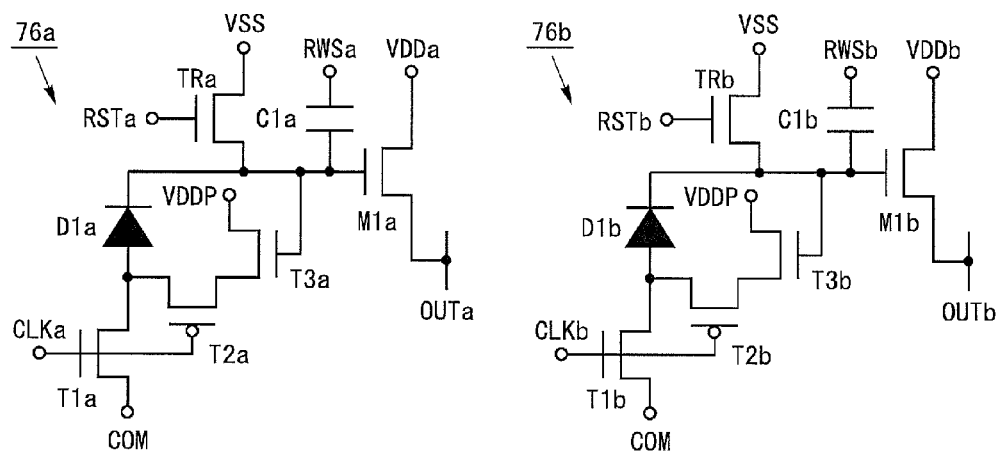
FIG. 41F is a circuit diagram of sensor pixel circuits according to a sixth modification example of the seventh embodiment.

The first pixel circuit 16a shown in FIG. 31F corresponds to the first pixel circuit 10a to which a transistor TRa is added. The transistor TRa is an N-type TFT, and functions as a switching element for reset. With regard to the first pixel circuit 16a, in the transistor TRa, a source is applied with a LOW-level potential VSS, a drain is connected to a gate of a transistor M1a, and a gate is connected to a reset line RSTa. Moreover, an anode of a photodiode D1a is applied with a LOW-level potential COM. Thus, it is possible to achieve a variety of pixel circuits. Pixel circuits 26a and 26b shown in FIG. 36F, a pixel circuit 36 shown in FIG. 37F, a pixel circuit 46 shown in FIG. 38F, a pixel circuit 56 shown in FIG. 39F, pixel circuits 66a and 66b shown in FIG. 40F, and pixel circuits 76a and 76b shown in FIG. 41F are achieved in such a manner that similar modifications are carried out on the second to seventh embodiments.

Figure 34:
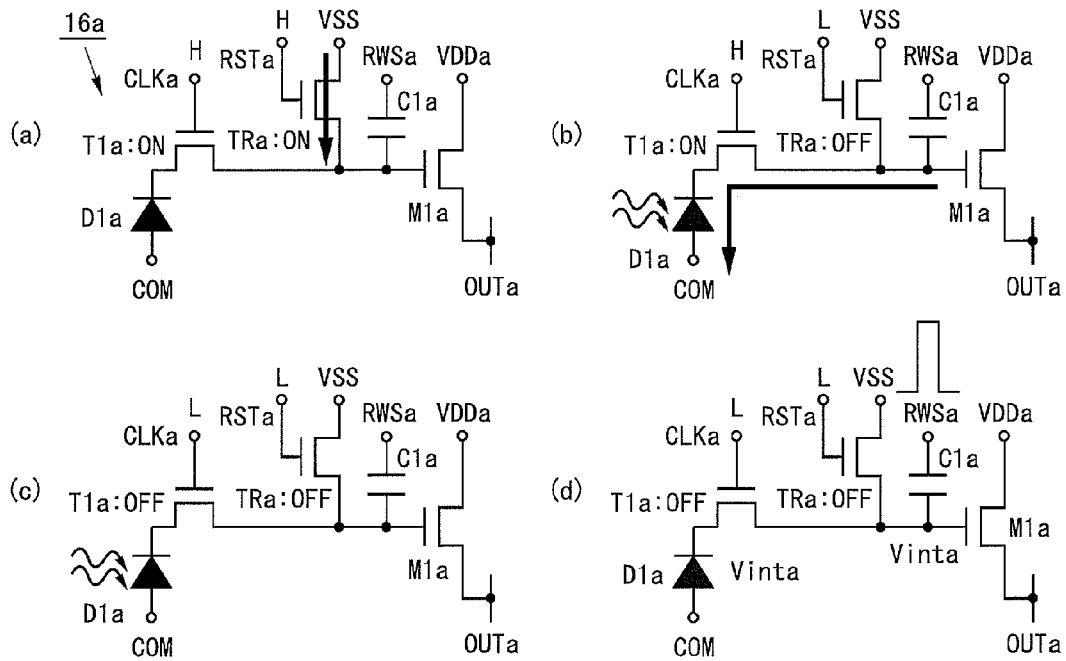
FIG. 34 is a diagram showing operations of the sensor pixel circuit shown in FIG. 31F.

FIG. 34 is a diagram showing operations of the first pixel circuit 16a in the case of performing one-time drive. At the time of reset, a reset signal RSTa turns to a HIGH level, the transistor TRa turns on, and a potential at an accumulation node (a gate potential at a transistor M1a) is reset to a LOW-level potential VSS (FIG. 34 (a)). During a period other than the reset, the reset signal RSTa turns to a LOW level, and the transistor TRa turns off (FIG. 34 (b) to (d)).

Figure 31G:
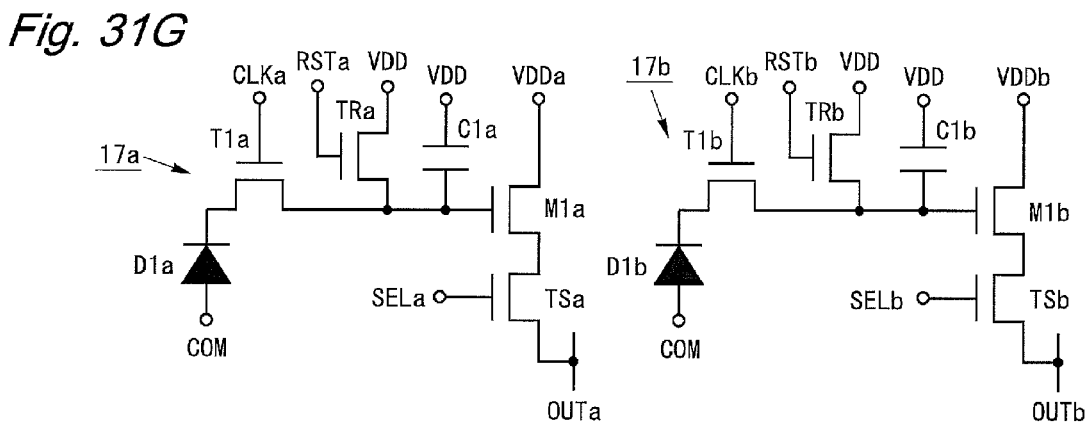
FIG. 31G is a circuit diagram of sensor pixel circuits according to a seventh modification example of the first embodiment.
Figure 36G:
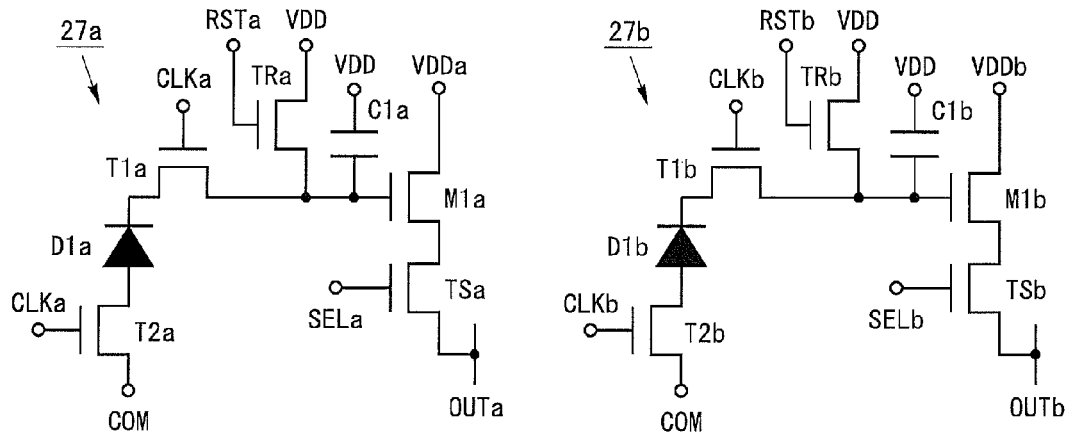
FIG. 36G is a circuit diagram of sensor pixel circuits according to a seventh modification example of the second embodiment.
Figure 37G:
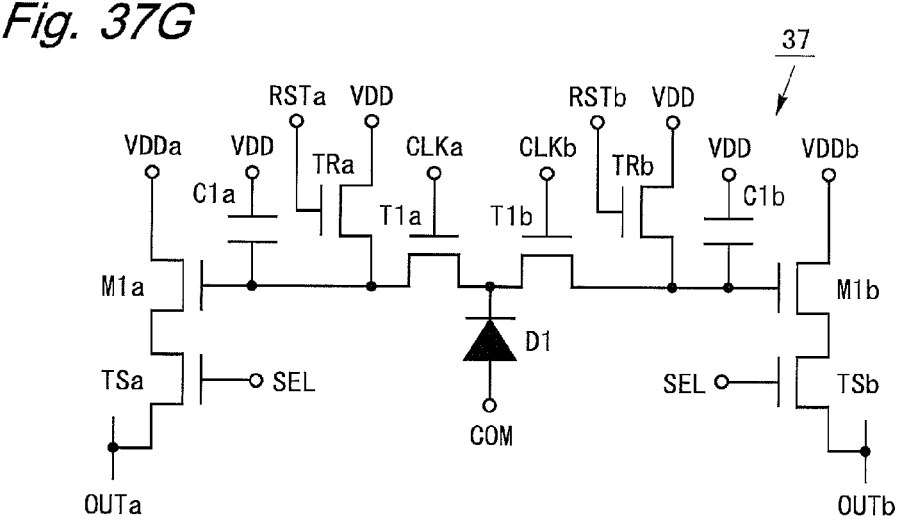
FIG. 37G is a circuit diagram of a sensor pixel circuit according to a seventh modification example of the third embodiment.
Figure 38G:
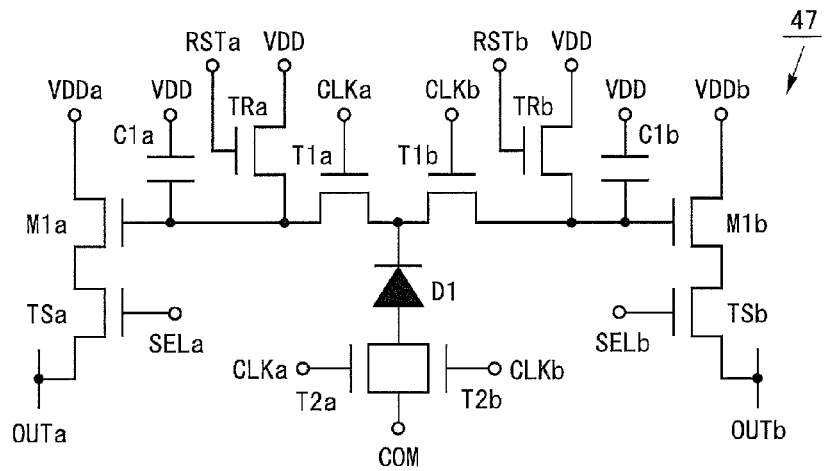
FIG. 38G is a circuit diagram of a sensor pixel circuit according to a seventh modification example of the fourth embodiment.
Figure 39G:
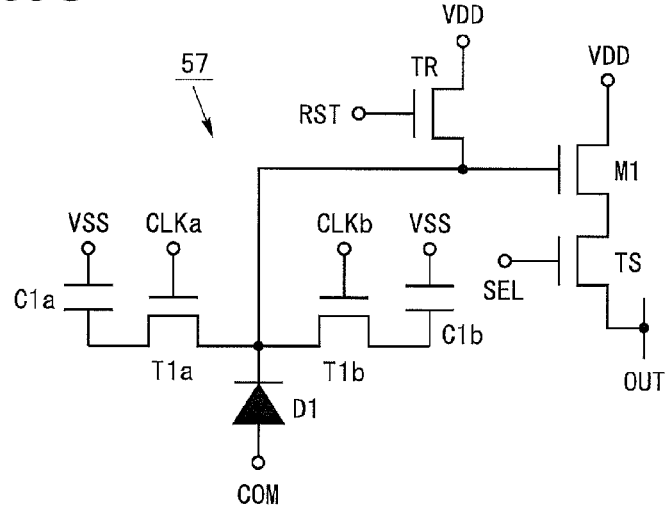
FIG. 39G is a circuit diagram of a sensor pixel circuit according to a seventh modification example of the fifth embodiment.
Figure 40G:
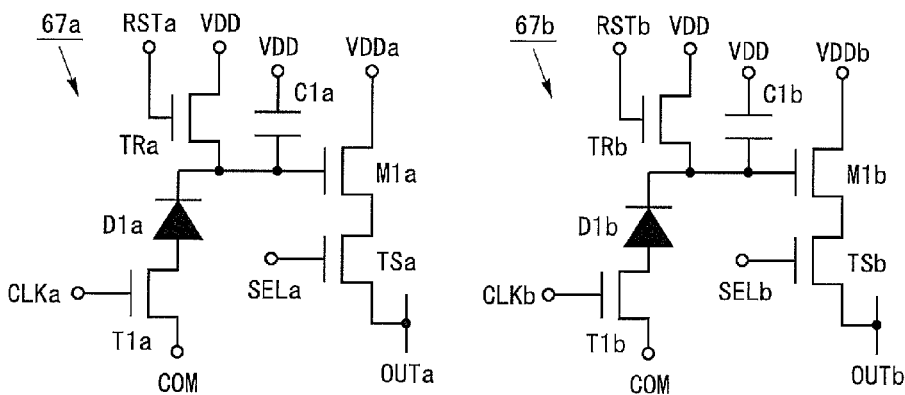
FIG. 40G is a circuit diagram of sensor pixel circuits according to a seventh modification example of the sixth embodiment.
Figure 41G:
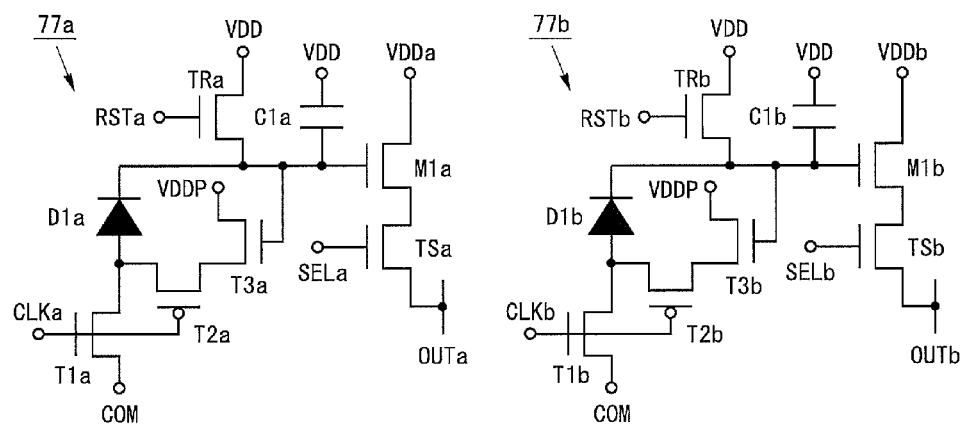
FIG. 41G is a circuit diagram of sensor pixel circuits according to a seventh modification example of the seventh embodiment.

The first pixel circuit 17a shown in FIG. 31G corresponds to the first pixel circuit 10a to which the transistors TSa and TRa described above are added. Connection forms of the transistors TSa and TRa are equal to those in the first pixel circuits 15a and 16a. However, in the first pixel circuit 17a, the drain of the transistor TRa is applied with a HIGH-level potential VDD. Thus, it is possible to achieve a variety of pixel circuits. Pixel circuits 27a and 27b shown in FIG. 36G, a pixel circuit 37 shown in FIG. 37G, a pixel circuit 47 shown in FIG. 38G, a pixel circuit 57 shown in FIG. 39G, pixel circuits 67a and 67b shown in FIG. 40G, and pixel circuits 77a and 77b shown in FIG. 41G are achieved in such a manner that similar modifications are carried out on the second to seventh embodiments.

Figure 35:
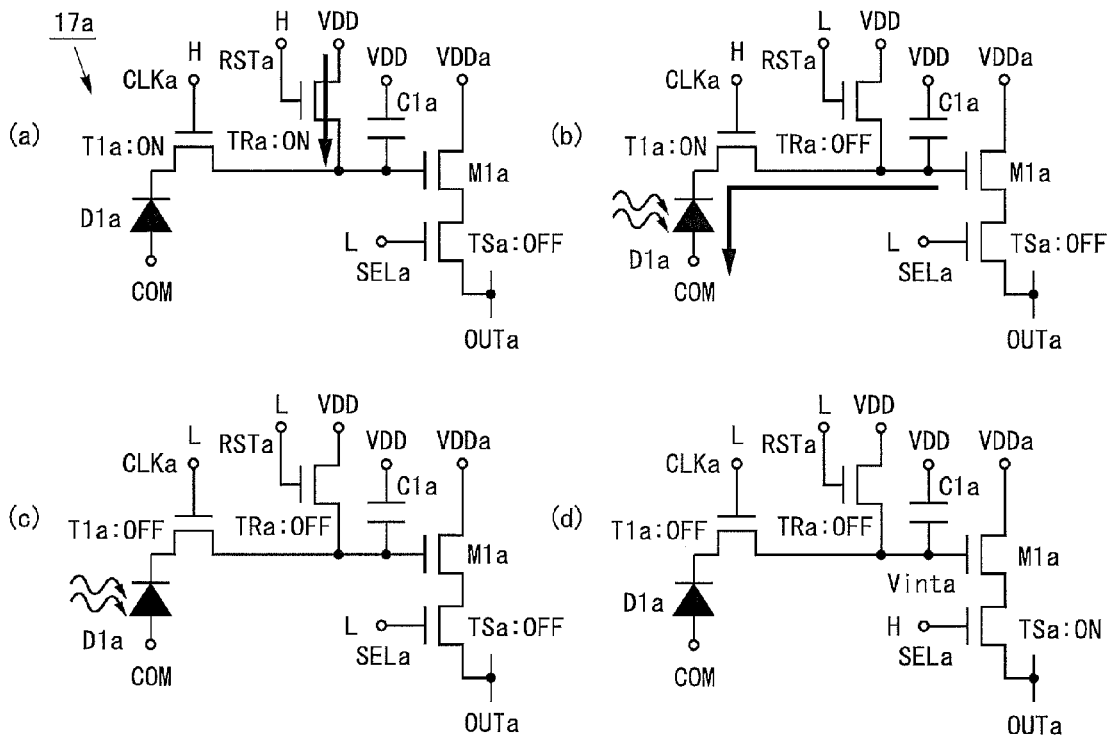
FIG. 35 is a diagram showing operations of the sensor pixel circuit shown in FIG. 31G.

FIG. 35 is a diagram showing operations of the first pixel circuit 17a in the case of performing one-time drive. At the time of reset, a reset signal RSTa turns to a HIGH level, the transistor TRa turns on, and a potential at an accumulation node (a gate potential at a transistor M1a) is reset to a HIGH-level potential VDD (FIG. 35 (a)). At the time of read, a selection signal SELa turns to the HIGH level, and the transistor TSa turns on. Herein, a current Ia in an amount corresponding to a potential Vinta flows between the drain and the source of the transistor M1a (FIG. 35 (d)). During a period other than the reset and the read, the reset signal RSTa and the selection signal SELa turn to a LOW level (FIGS. 35 (b) and (c)).

Figure 31H:
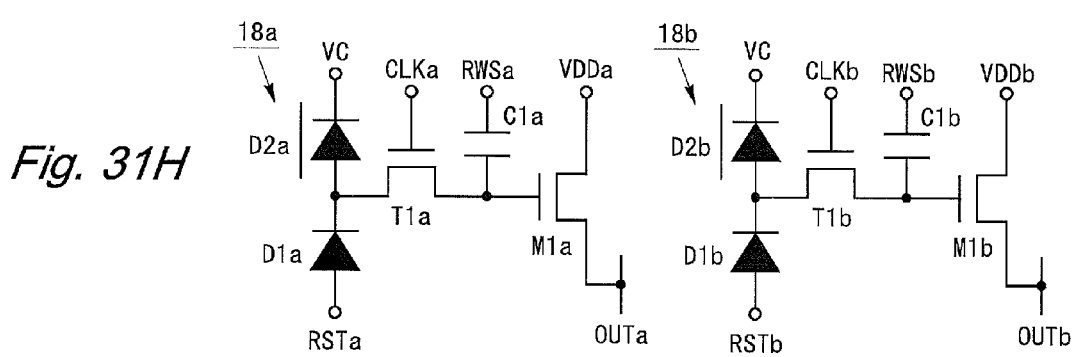
FIG. 31H is a circuit diagram of sensor pixel circuits according to an eighth modification example of the first embodiment.
Figure 37H:
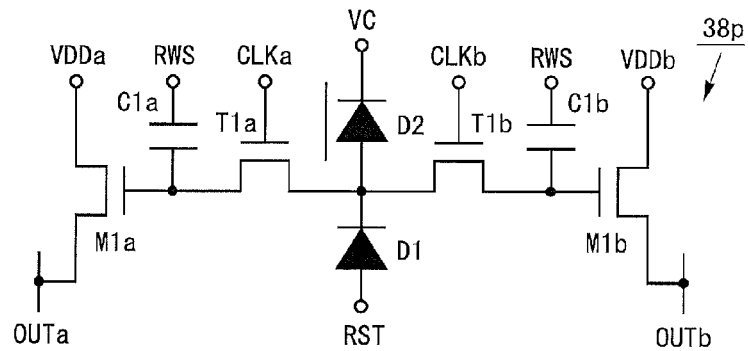
FIG. 37H is a circuit diagram of a sensor pixel circuit according to an eighth modification example of the third embodiment.
Figure 38H:
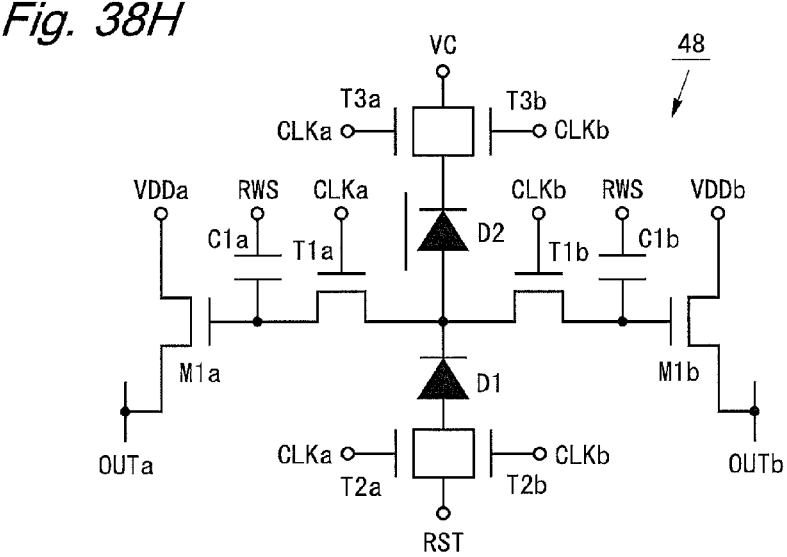
FIG. 38H is a circuit diagram of a sensor pixel circuit according to an eighth modification example of the fourth embodiment.
Figure 39H:
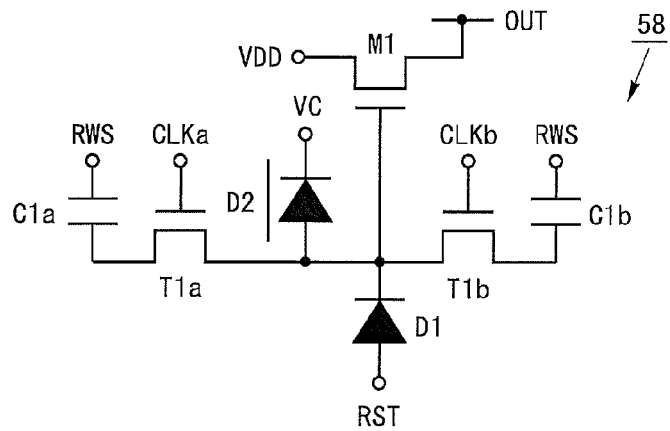
FIG. 39H is a circuit diagram of a sensor pixel circuit according to an eighth modification example of the fifth embodiment.
Figure 40H:
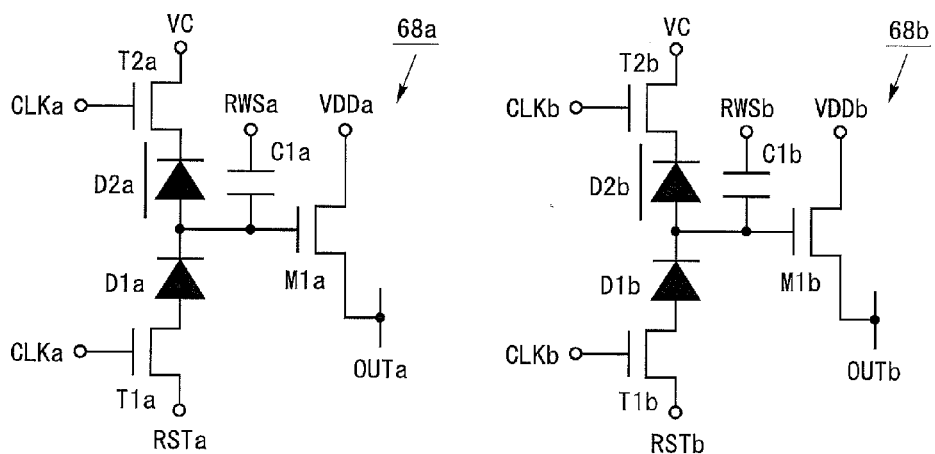
FIG. 40H is a circuit diagram of sensor pixel circuits according to an eighth modification example of the sixth embodiment.
Figure 41H:
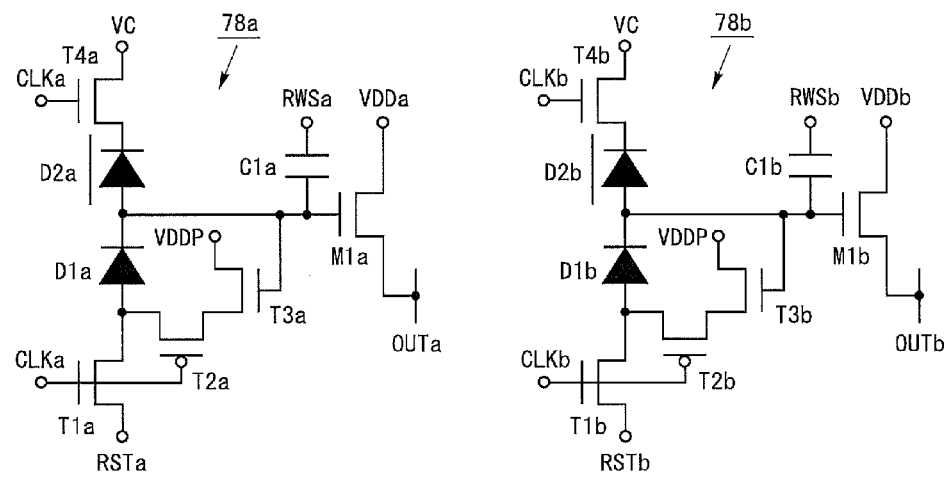
FIG. 41H is a circuit diagram of sensor pixel circuits according to an eighth modification example of the seventh embodiment.
Figure 42:
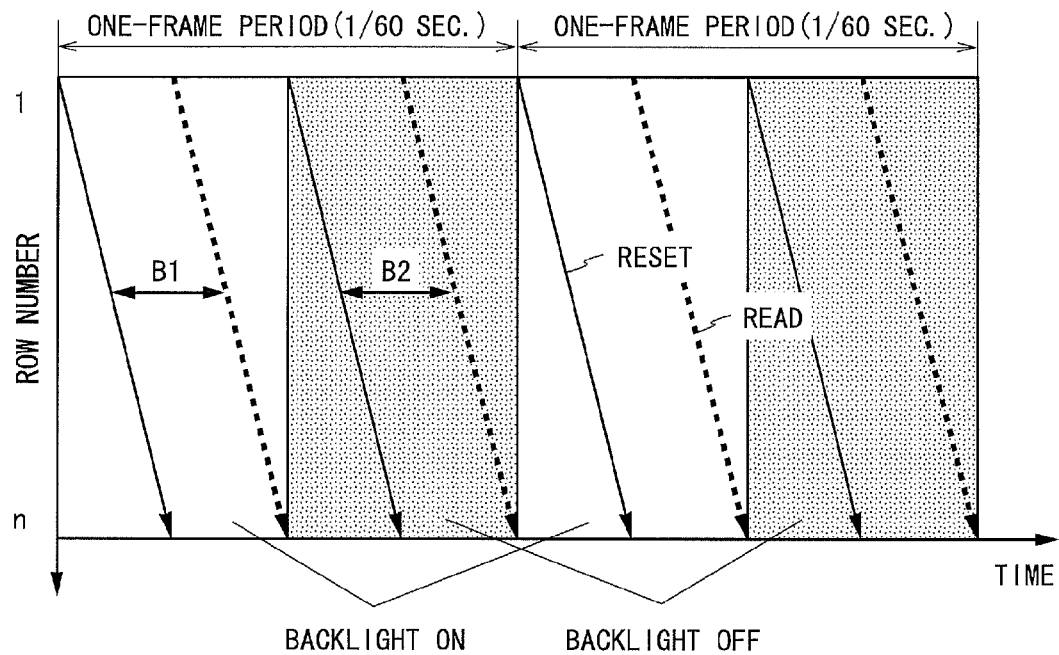
FIG. 42 is a diagram showing turn-on and turn-off timings of a backlight as well as reset and read timings of light receiving elements, in a conventional input/output device.
Figure 43:
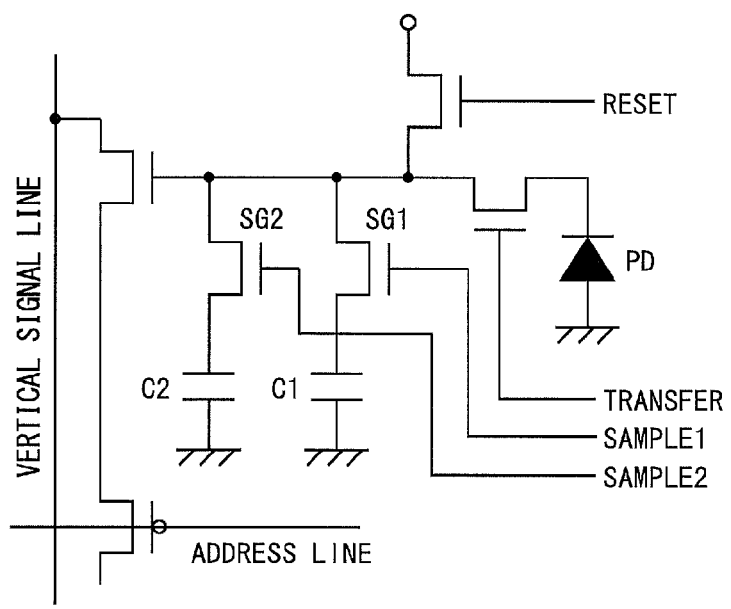
FIG. 43 is a circuit diagram of a unit light receiving section included in a conventional solid-state imaging device.

The first pixel circuit 18a shown in FIG. 31H corresponds to the first pixel circuit 10a to which a photodiode D2a is added. The photodiode D2a is shielded from light, and functions as an optical sensor for reference. In the photodiode D2a, an anode is connected to a cathode of a photodiode D1a and a source of a transistor T1a, and a cathode is applied with a predetermined potential VC. The potential VC is a potential which is higher than a HIGH-level potential for reset. It is possible to perform temperature compensation for a photodiode since a dark current flows through the photodiode D2a. Pixel circuits 28a and 28b shown in FIG. 36H, a pixel circuit 38p shown in FIG. 37H, a pixel circuit 48 shown in FIG. 38H, a pixel circuit 58 shown in FIG. 39H, pixel circuits 68a and 68b shown in FIG. 40H, and pixel circuits 78a and 78b shown in FIG. 41H are achieved in such a manner that similar modifications are carried out on the second to seventh embodiments.

Figure 36H:
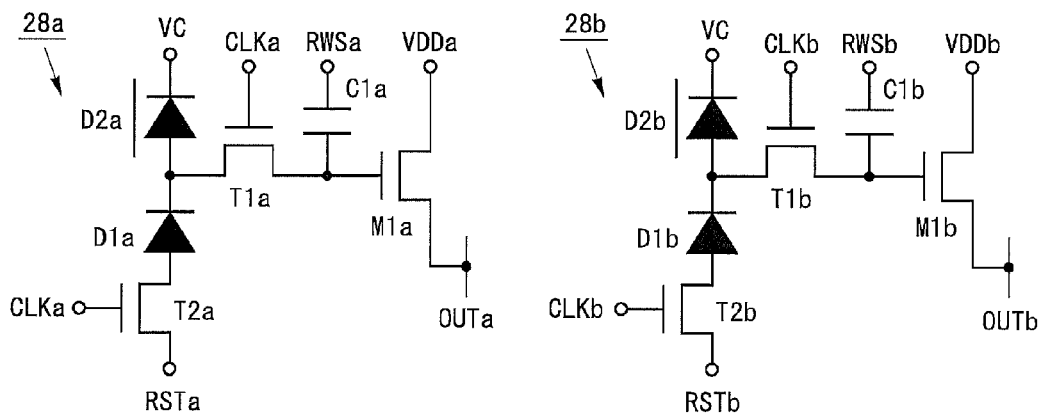
FIG. 36H is a circuit diagram of sensor pixel circuits according to an eighth modification example of the second embodiment.
Figure 36I:
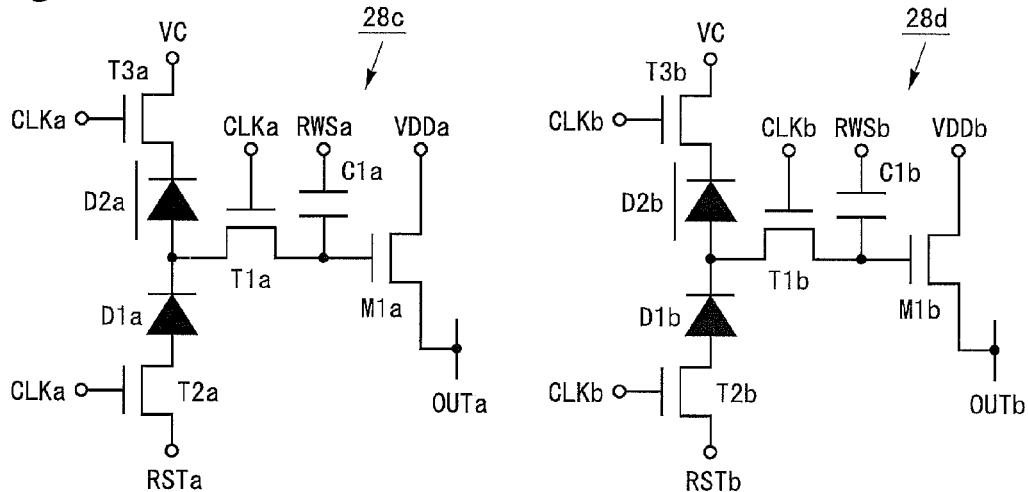
FIG. 36I is a circuit diagram of sensor pixel circuits according to a ninth modification example of the second embodiment.
Figure 37I:
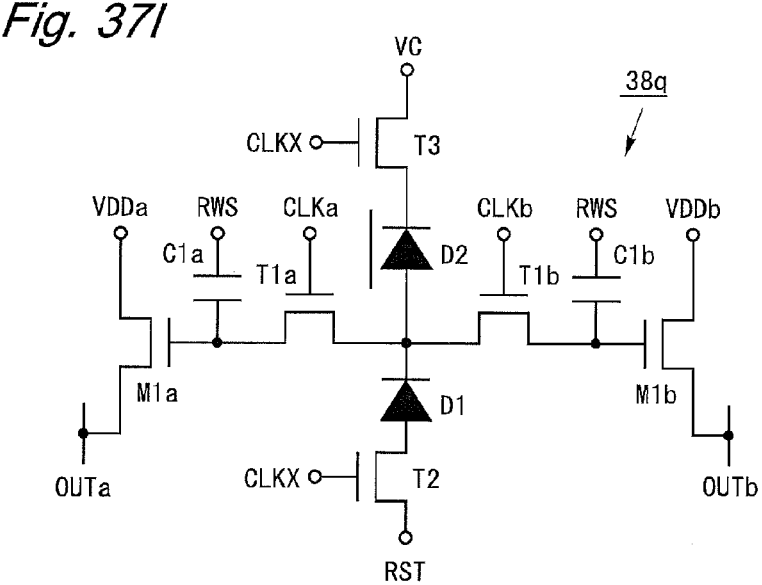
FIG. 37I is a circuit diagram of a sensor pixel circuit according to a ninth modification example of the third embodiment.

Moreover, in the pixel circuits 28a and 28b shown in FIG. 36H, a transistor T3a is additionally provided between the wire having the potential VC and a cathode of the photodiode D2a and a transistor T3b is additionally provided between the wire having the potential VC and a cathode of the photodiode D2b. Thus, it is possible to constitute pixel circuits 28c and 28d shown in FIG. 36I. Moreover, in the pixel circuit 38p shown in FIG. 37H, a transistor T2 is additionally provided between the reset line RST and an anode of the photodiode D1 and a transistor T3 is additionally provided between the wire having the potential VC and a cathode of the photodiode D2. Thus, it is possible to constitute a pixel circuit 38q shown in FIG. 37I. Gates of the transistors T2 and T3 are connected to a clock line CLKX for propagating a signal which turns to a HIGH level when at least one of clock signals CLKa and CLKb is in a HIGH level.

Figure 37J:
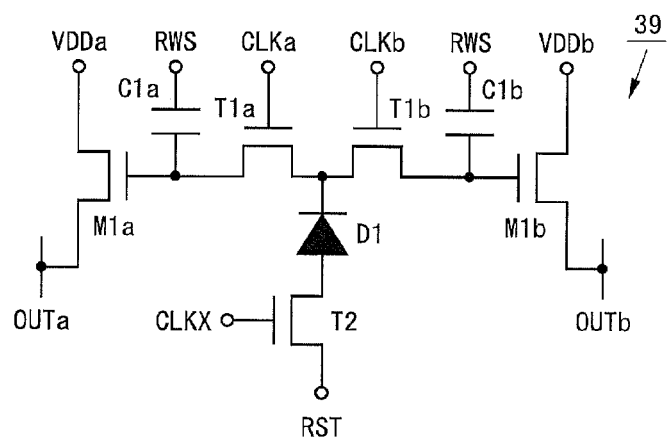
FIG. 37J is a circuit diagram of a sensor pixel circuit according to a tenth modification example of the third embodiment.

The pixel circuit 39 shown in FIG. 37J corresponds to the pixel circuit 30 to which a transistor T2 is added. The transistor T2 is an N-type TFT and functions as a retention transistor. A gate of the transistor T2 is connected to a clock line CLKX for propagating a signal which turns to a HIGH level when at least one of clock signals CLKa and CLKb is in the HIGH level. The pixel circuit 39 is achieved in such a manner that the transistors T2a and T2b are substituted with the transistor T2 in the pixel circuit 41 shown in FIG. 38A, and operates as in the pixel circuit 41.

Moreover, the first to seventh embodiments may employ various modification examples in such a manner that the modifications described above are combined arbitrarily without violating their properties.

As described above, in the display devices according to the embodiments of the present invention and the modification examples of the embodiments, the first sensor pixel circuit that senses light during the sensing period when the backlight is turned on and retains the amount of sensed light otherwise and the second sensor pixel circuit that senses light during the sensing period when the backlight is turned off and retains the amount of sensed light otherwise are provided separately. Thus, it is possible to obtain the difference between the two types of amounts of light at the outside of the sensor pixel circuit, and to detect the difference between the amount of light when the backlight is turned on and the amount of light when the backlight is turned off. Therefore, it is possible to solve the conventional problems, and to give an input function which does not depend on light environments.

It is to be noted that the type of a light source to be provided on the display device is not particularly limited in the present invention. Accordingly, for example, a visible light backlight to be provided for display may be turned on and off once or a plurality of times, respectively, in a one-frame period. Alternatively, an infrared light backlight for light sensing may be provided separately from the visible light backlight for display on the display device. In such a display device, the visible light backlight may always be turned on, and only the infrared light backlight may be turned on and off once or a plurality of times, respectively, in the one-frame period.

INDUSTRIAL APPLICABILITY

The display device according to the present invention is characterized by having an input function which does not depend on light environments, and therefore is applicable to various display devices in which a plurality of optical sensors are provided on a display panel.

EXPLANATION OF REFERENCE SYMBOLS

1: Display control circuit
2: Display panel
3: Backlight
4: Pixel region
5: Gate driver circuit
6: Source driver circuit
7: Sensor row driver circuit
8: Display pixel circuit
9: Sensor pixel circuit
10 to 18, 20 to 28, 30 to 48, 50 to 58, 60 to 68, 70 to 78: Pixel circuit

The invention claimed is:
1. A display device in which a plurality of optical sensors are arranged in a pixel region, the display device comprising:
a display panel including a plurality of display pixel circuits, a plurality of sensor pixel circuits, a plurality of reset lines, a plurality of sensing control lines, a plurality of read lines, a plurality of output lines, and a plurality of power supply lines; and
a drive circuit,
each of the sensor pixel circuits include,
a photodiode having a cathode terminal, the photodiode further including an anode terminal connected to a corresponding reset line,
an accumulation node,
a read transistor having a gate terminal connected to the accumulation node, a drain terminal connected to a corresponding power supply line, and a source terminal connected to a corresponding output line,
a retention transistor having a gate terminal connected to a corresponding sensing control line, a drain terminal connected to the accumulation node, and a source terminal connected to the cathode terminal of the photodiode, and a capacitor provided between a corresponding read line and the accumulation node;

the drive circuit is configured to,
for the sensor pixel circuit, output a reset signal to the corresponding reset line firstly, output a sensing control signal indicating a sensing period to the corresponding sensing control line next, and
output a read signal indicating a read period to the corresponding read line lastly after a retention period, the sensor pixel circuits are classified into first sensor pixel circuits and second sensor pixel circuits, the sensing control lines are classified into first sensing control lines connected to the gate terminal of the retention transistor in the first sensor pixel circuits and second sensing control lines connected to the gate terminal of the retention transistor in the second sensor pixel circuits, the drive circuit is configured to,
output, to the first sensing control lines, a first sensing control signal indicating a first sensing period defined in a period during which a light source is turned on, and
output, to the second sensing control lines, a second sensing control signal indicating a second sensing period defined in a period during which the light source is turned off, in the first sensor pixel circuit, the retention transistor is configured to turn on in the first sensing period in accordance with the first sensing control signal, a potential of the accumulation node changes by current that flow through the photodiode and the retention transistor in the first sensing period, and the potential does not change in a first retention period provided between the first sensing period and the read period, so that the first sensor pixel circuit is configured to sense light during the first sensing period and retain the amount of sensed light in the first retention period, in accordance with the first sensing control signal, and in the second sensor pixel circuit, the retention transistor is configured to turn on in the second sensing period in accordance with the second sensing control signal, a potential of the accumulation node changes by current that flow through the photodiode and the retention transistor in the second sensing period, and the potential does not change in a second retention period provided between the second sensing period and the read period, so that the second sensor pixel circuit is configured to sense light during the second sensing period and retain the amount of sensed light in the second retention period, in accordance with the second sensing control signal.

2. The display device according to claim 1, wherein the output lines are classified into first output lines connected to the source terminal of the read transistor in the first sensor pixel circuits and second output lines connected to the source terminal of the read transistor in the second sensor pixel circuits, and the display device further comprises:
a difference circuit that obtains a difference between an output signal from the first sensor pixel circuit output through the first output line and an output signal from the second sensor pixel circuit output through the second output line.

* * * * *